(12) United States Patent
Nagai

(10) Patent No.: US 11,553,125 B2
(45) Date of Patent: Jan. 10, 2023

(54) CAMERA SYSTEM AND CABLES

(71) Applicant: SONY CORPORATION, Tokyo (JP)

(72) Inventor: Ryuzo Nagai, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 17/250,788

(22) PCT Filed: Aug. 6, 2019

(86) PCT No.: PCT/JP2019/030970
§ 371 (c)(1),
(2) Date: Mar. 3, 2021

(87) PCT Pub. No.: WO2020/054266
PCT Pub. Date: Mar. 19, 2020

(65) Prior Publication Data
US 2021/0337099 A1 Oct. 28, 2021

(30) Foreign Application Priority Data
Sep. 13, 2018 (JP) .............................. JP2018-171891

(51) Int. Cl.
*H04N 5/232* (2006.01)
*H04N 5/225* (2006.01)

(52) U.S. Cl.
CPC ........... *H04N 5/232* (2013.01); *H04N 5/2253* (2013.01)

(58) Field of Classification Search
CPC .... H04N 5/232; H04N 5/2253; H04N 5/2252; H04N 5/23203; H04N 5/23209; H04N 5/2251; G03B 43/00; G03B 17/14
See application file for complete search history.

(56) References Cited

U.S. PATENT DOCUMENTS 6,424,369 B1 7/2002 Adair et al.
6,707,490 B1 * 3/2004 Kido ................. H04N 5/23209
348/E5.073

(Continued)

FOREIGN PATENT DOCUMENTS

AU 7601498 A 12/1998
AU 7004201 A 2/2002

(Continued)

OTHER PUBLICATIONS

International Search Report and Written Opinion of PCT Application No. PCT/JP2019/003097, dated Apr. 23, 2019, 09 pages of ISRWO.

(Continued)

*Primary Examiner* — Padma Haliyur
(74) *Attorney, Agent, or Firm* — Chip Law Group

(57) ABSTRACT

A camera head unit including an image sensor configured to generate an image signal, a main unit configured to perform a signal process to the image signal, and first and second cables are included. Further, a determining section configured to determine whether a connection state is in a first connection state in which the camera head unit and the main unit are connected with each other via a first cable without a second cable or a second connection state in which the camera head unit and the main unit are connected with each other via the first cable and the second cable, and a transmission section configured to transmit the image signal between the camera head unit and the main unit at least via the first cable according to a determination result determined by the determining section are included.

23 Claims, 23 Drawing Sheets

(56) References Cited

U.S. PATENT DOCUMENTS

| | | | |
|---|---|---|---|
| 6,947,092 B1 | 9/2005 | Nagata et al. | |
| 9,413,959 B2* | 8/2016 | Yokomitsu | H04N 5/23241 |
| 2001/0009441 A1 | 7/2001 | Ishida | |
| 2002/0163578 A1 | 11/2002 | Adair et al. | |
| 2002/0171733 A1 | 11/2002 | Takami et al. | |
| 2005/0237068 A1* | 10/2005 | Nakashita | H04B 3/56 |
| | | | 324/539 |
| 2018/0191985 A1 | 7/2018 | Yin et al. | |
| 2018/0205836 A1* | 7/2018 | Odagaki | H04N 1/00127 |
| 2020/0221023 A1* | 7/2020 | Ono | A61B 1/00009 |

FOREIGN PATENT DOCUMENTS

| | | |
|---|---|---|
| CN | 106331531 A | 1/2017 |
| DE | 10222421 A1 | 11/2002 |
| DE | 69928157 T2 | 6/2006 |
| EP | 0948199 A2 | 10/1999 |
| EP | 1120961 A2 | 8/2001 |
| EP | 1310090 A1 | 5/2003 |
| EP | 3316569 A1 | 5/2018 |
| ES | 2248964 T3 | 3/2006 |
| JP | 10-32747 A | 2/1998 |
| JP | 11-344756 A | 12/1999 |
| JP | 2001-211365 A | 8/2001 |
| JP | 2004-536467 A | 12/2004 |
| JP | 4312800 B2 | 8/2009 |
| JP | 2012-163495 A | 8/2012 |
| JP | 2014-153162 A | 8/2014 |
| JP | 2014-211846 A | 11/2014 |
| WO | 98/054893 A2 | 12/1998 |
| WO | 2002/015567 A1 | 2/2002 |
| WO | 2017/000507 A1 | 1/2017 |

OTHER PUBLICATIONS

Extended European Search Report of EP Application No. 19860639.4, dated Oct. 4, 2021, 08 pages.

* cited by examiner

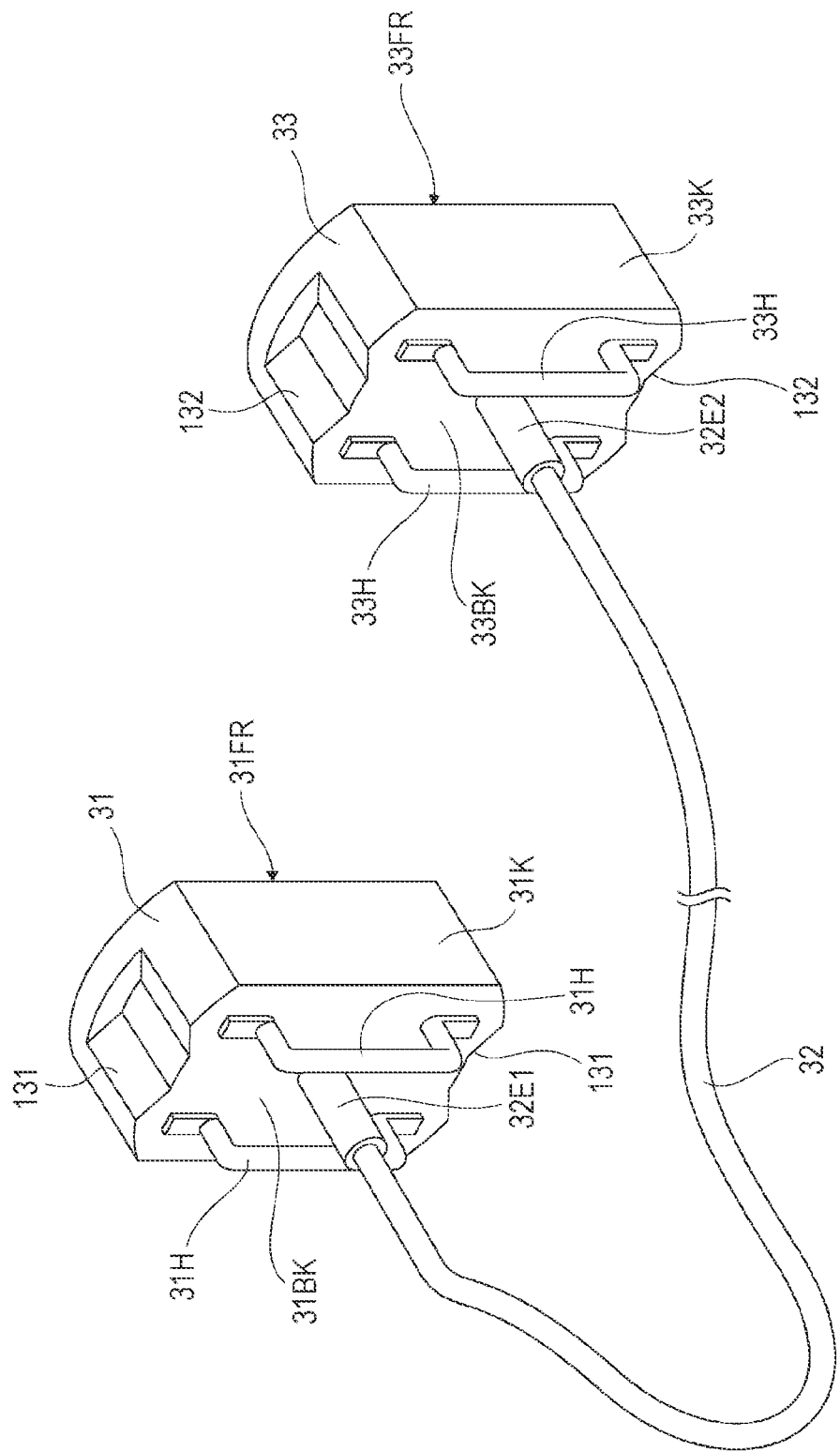

FIG. 11A   EXTENSION CABLE 20
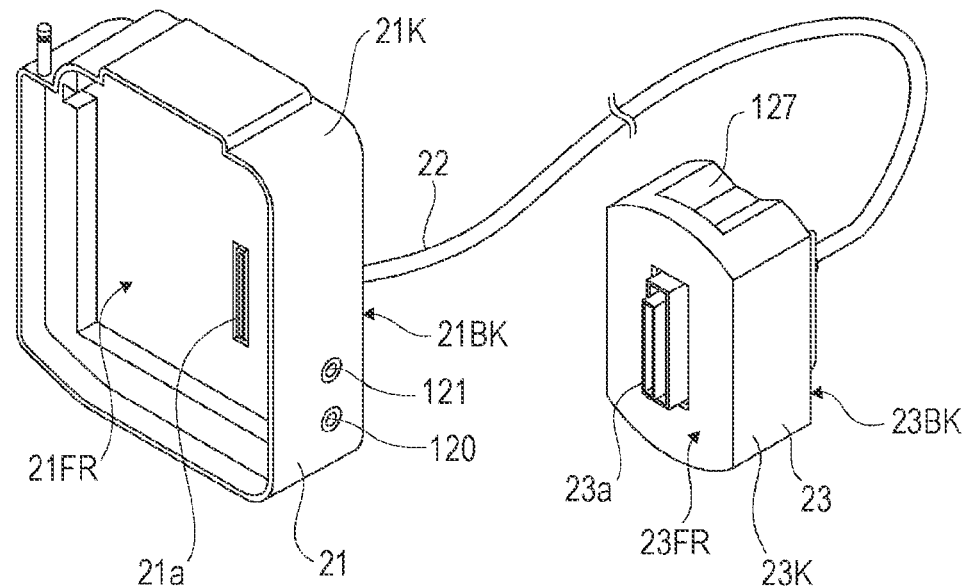
FIG. 11B   ADDITIONAL EXTENSION CABLE 30
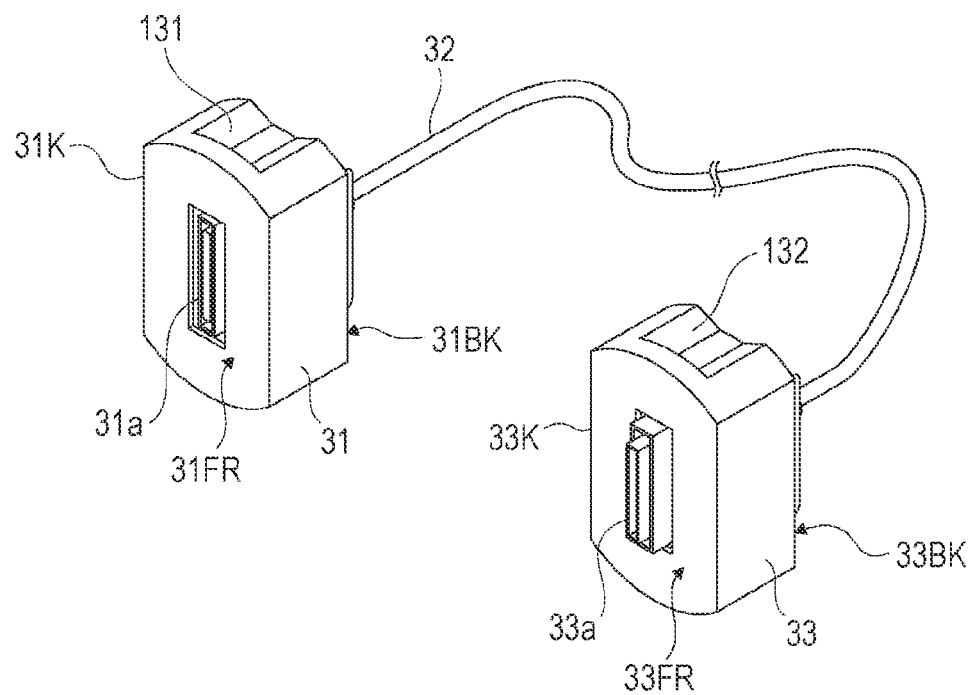

FIG. 13
FIG. 13A  BASIC STATE
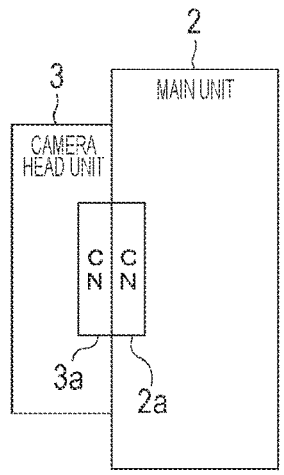
FIG. 13B  EXTENSION STATE
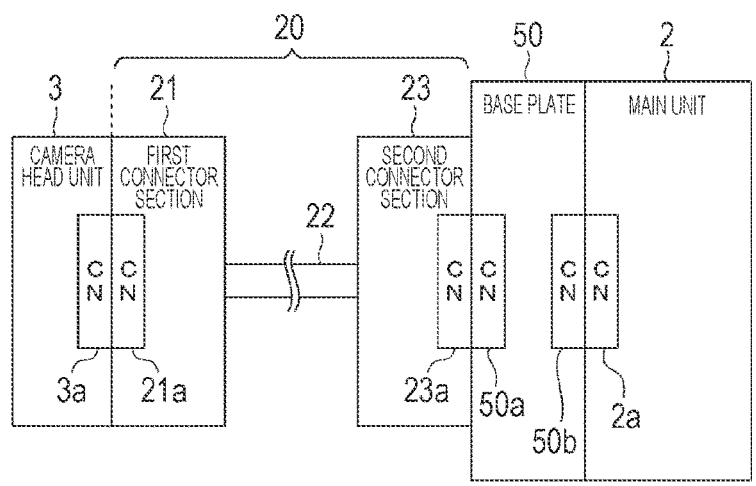
FIG. 13C  ADDITIONAL EXTENSION STATE
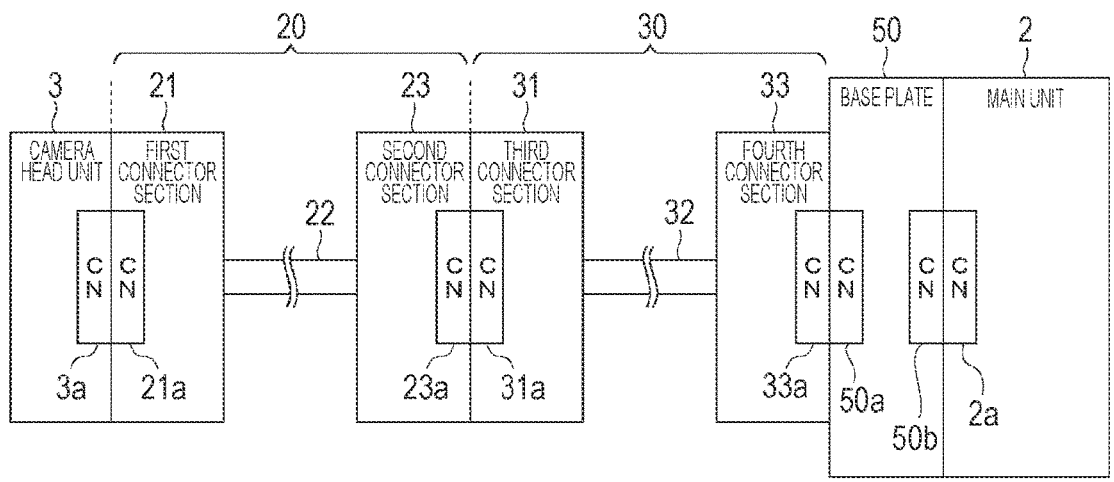

CAMERA SYSTEM AND CABLES

CROSS REFERENCE TO RELATED APPLICATIONS

This application is a U.S. National Phase of International Patent Application No. PCT/JP2019/030970 filed on Aug. 6, 2019, which claims priority benefit of Japanese Patent Application No. JP 2018-171891 filed in the Japan Patent Office on Sep. 13, 2018. Each of the above-referenced applications is hereby incorporated herein by reference in its entirety.

TECHNICAL FIELD

The present technology relates to a camera system and cables, and more specifically to a technology applicable to cases where a camera is used with a main unit and a camera head unit of the camera detached from each other.

BACKGROUND ART

As disclosed in Patent Document 1 listed below, a camera system has been known, which is configured to capture an image with such a camera that a camera head unit including an image sensor (camera head unit) and a main unit of the camera are detached from each other but connected via a cable.

CITATION LIST

Patent Document

Patent Document 1: Japanese Patent Application Laid-Open No. H10-32747

SUMMARY OF THE INVENTION

Problems to be Solved by the Invention

By the way, as an improvement to the configuration in which a camera can be used with the camera head unit and the main unit of the camera connected with each other simply via such a cable connection, it has been desired to realize greater flexibility to ways of usage and more appropriate usability such as cable length extendibility, and it has been desired to perform appropriate signal transmission in such a case.

In view of this, an object of the present technology is to provide a camera system capable of performing appropriate signal transmission in a case where the camera system can be used with cable extension.

Solutions to Problems

A camera system according to the present technology includes a camera head unit including an image sensor configured to generate an image signal, a main unit configured to perform a signal process to the image signal, a determining section configured to determine whether a connection state is in a first connection state in which the camera head unit and the main unit are connected with each other via a first cable without a second cable or a second connection state in which the camera head unit and the main unit are connected with each other via the first cable and the second cable, and a transmission section configured to transmit the image signal between the camera head unit and the main unit at least via the first cable according to a determination result determined by the determining section.

Both of the first cable and the second cable are cables for electrical connection. For example, the first cable may be a cable for connecting the main unit and a camera head unit with each other. The second cable may be a cable provided in addition to the first cable to thereby make it possible to further extend a distance between the main unit and the camera head unit.

The camera system configured as above is, for example, capable of having a basic state in which the camera head unit is mounted on the main unit, a first connection state that is an extension state in which the main unit and the camera head unit are connected via the first cable, and a second connection state that is an additional extension state in which the main unit and the camera head unit are connected via the first cable and the second cable. In this case, the camera system is configured such that, for example, signal process scheme is switched over depending on how the first cable, the second cable, and the main unit are connected.

In the camera system according to the present technology described above, it is conceivable that depending on whether or not the first cable is connected with the second cable, the determining section performs the determination as to whether the connection state is in the first connection state or in the second connection state.

In other words, the camera system is so configured that the signal process is switched over depending on whether the connection state is in the first connection state or in the second connection state.

In the camera system according to the present technology described above, it is conceivable that in a case where the determining section determines that the connection state is in the second connection state, the transmission section amplifies the image signal and transmits the image signal to the main unit.

In other words, the image signal is amplified in a case where the extension is further extended by the use of the second cable.

In the camera system according to the present technology described above, it is conceivable that according to a logic level at a determining terminal of a connector section of the first cable, the determining section performs the determination as to whether the connection state is in the first connection state or in the second connection state.

The determining terminal is configured such that a different logical value is obtained according to whether the connection state is in the first connection state or in the second connection state, by referring to whether or not an open state in which the connector section is not connected.

In the camera system according to the present technology described above, it is conceivable that a base plate attachable to the main unit is included, in which the connector section of the first cable is detachably attachable to the base plate, the base plate is configured to supply a voltage of a first logic level to the determining terminal, and the second cable is configured to supply a voltage of a second logic level to the determining terminal in a case where the second cable is connected with the connector section of the first cable.

The base plate is provided as a structure provided to the main unit, and configured to connect the first cable or the second cable to the main unit.

In the camera system according to the present technology described above, it is conceivable that the transmission section is provided inside a connector section of the first cable.

The transmission section is a transmission section configured to transmit a signal from the connector section toward the main unit.

In the camera system according to the present technology described above, it is conceivable that the transmission section is provided inside a connector section of the first cable, the transmission section includes a compensation processing unit configured to perform a compensation process with respect to a signal characteristic change caused through cable transmission, and an amplification processing unit configured to perform a process for amplifying a signal in advance in consideration of fading caused through the cable transmission, the transmission section performs the process of the compensation processing unit and outputs a transmission signal, in a case where it is determined that the connection state is in the first connection state, and the transmission section performs the processes of the compensation processing unit and the amplification processing unit and outputs a transmission signal in a case where it is determined that the connection state is in the second connection state.

The transmission section is configured to selectively perform the compensation process that has passed through the cable(s) and the amplification process to be transmitted through the cable(s).

In the camera system according to the present technology described above, it is conceivable that the determining section is provided inside the connector section of the first cable.

The determining section is provided in the connector section of the first cable and configured to switch over the processes performed by the transmission section.

In the camera system according to the present technology described above, it is conceivable that the main unit transmits a clock signal to the camera head unit in such a way that, in a case where the determining section determines that the connection state is in a third connection state in which the camera head unit is directly attached to the main unit, the main unit sets a frequency of the clock signal to be higher compared with a case where the determining section determines that the connection state is in the first connection state or the second connection state.

In other words, the frequency of the clock signal is switched over according to whether the camera head unit is mounted on the main unit, or the camera head unit is detached from the main unit but connected with the main unit via one of the first cable or the second cable or via both of the first cable and the second cable.

In the camera system according to the present technology described above, it is conceivable that the main unit transmits a clock signal to the camera head unit in such a way that, in a case where the determining section determines that the connection state is in the first connection state, the main unit sets a frequency of the clock signal to be lower compared with a case where the determining section determines that the connection state is in the second connection state.

In other words, the frequency of the clock signal is switched over according to whether the connection state is in the first connection state or in the second connection state.

In the camera system according to the present technology described above, it is conceivable that the determining section is provided in the main unit.

The determining section is provided in the main unit and configured to detect the connection states of the camera head unit and the extension cables or the like.

In addition, in the camera system according to the present technology described above, it is conceivable to include a base plate attachable to the main unit, in which the first cable and the second cable are detachably attachable to the base plate, the base plate is configured to supply a voltage of a particular logic level to a determining terminal of a connector of the main unit, and the determining section determines the connection state by voltage detection at the determining terminal.

The base plate is provided as a structure for attaching the first cable or the second cable to the main unit.

In the camera system according to the present technology described above, it is conceivable that the main unit is further configured to forward, to the camera head unit, driving power for the camera head unit.

For example, even in the case where the camera head unit is detached from the main unit and the extension cable is used, the power is supplied to the camera head unit just as in the case where the camera head unit is mounted on the main unit.

In the camera system according to the present technology described above, it is conceivable that the signal process is a process for generating a monitor image signal, and the main unit is capable of transmitting the monitor image signal to the camera head unit side.

The main unit is configured to generate a monitor image signal. This monitor image signal is transmitted to the camera head unit detached from the main unit, thereby making it possible to view the monitor image on the camera head unit side.

Further, in the camera system according to the present technology described above, it is conceivable to include a base plate attachable to the main unit, in which the first cable and the second cable are detachably attachable to the base plate, and the monitor image signal outputted from the video output terminal of the main unit is inputted in the video input terminal provided on the base plate, so as to be transmitted to the camera head unit side at least via the first cable from the base plate.

As a structure for attaching the first cable or the second cable to the main unit, a base plate provided with a monitor image signal input terminal is provided.

Moreover, it is conceivable to configure the camera system according to the present technology described above in such a way that the first cable configured to be attachable to the camera head unit is provided with a video output terminal configured to output the monitor image signal therefrom.

The video output terminal of the first cable may be configured to be attachable to a monitor device.

In the camera system according to the present technology described above, it is conceivable to include a base plate attachable to the main unit, in which the first cable and the second cable are detachably attachable to the base plate, each of the base plate and the camera head unit includes an input section to which a same function predetermined is assigned, and the main unit detects, as an input signal for a same function, input information of the input section of the base plate and input information of the input section of the camera head unit.

The base plate may be also provided with the input section so as to perform input via the main unit as via the input section of the camera head unit, in a case where the camera head unit is detached from the main unit.

In the camera system according to the present technology described above, it is conceivable that the signal process is a process for compressing the image signal, and the system includes a recording unit configured to record the image signal thus compressed.

For example, the main unit may be provided with a recording unit, thereby recording therein an image signal thus compressed.

In the camera system according to the present technology described above, it is conceivable that the main unit is configured such that it is not possible to turn on the main unit in a connection state in which connection is established between the main unit and the camera head unit via the first cable and a predetermined number or more of the second cables.

For example, the camera system may be so configured that the camera system is not operable if the camera head unit, the first cable, the second cable, the second cable, and the main unit are connected in this order.

A cable according to the present technology is a cable for use in a camera system including a camera head unit including an image sensor configured to generate an image signal, and a main unit configured to perform a signal process to the image signal, the cable including a transmission section configured to transmit the image signal between the camera head unit and the main unit at least via the cable itself, according to a determination result determined by a determining section as to whether a connection state is in a first connection state in which the camera head unit and the main unit are connected via the cable itself without another cable, or a second connection state in which the camera head unit and the main unit are connected via the cable itself and the another cable.

Further, it is conceivable that the another determining section is further provided.

Effects of the Invention

According to the present technology, it becomes possible to perform appropriate signal transmission in a case where the camera head unit is usable via extension from the main unit by using the first cable and/or the second cable, thereby facilitating stability of operation.

Note that, the effect described here is not necessarily limited, and can be any effect described in the present disclosure.

BRIEF DESCRIPTION OF DRAWINGS

FIG. 10 is a perspective view illustrating an additional extension cable according to the embodiment.

FIGS. 11A and 11B are an explanatory view illustrating terminal surfaces of the extension cable and the additional extension cable according to the embodiment.

FIGS. 13A, 13B and 13C are an explanatory view illustrating a connection structure in the basic state, the extension state, and the additional extension state according to the embodiment.

MODE FOR CARRYING OUT THE INVENTION

In the following, one embodiment will be explained in the following order.
<1. Structure of Camera System>
<2. Extension Usage Form>
<3. Additional Extension State>
<4. Connector Connection>
<5. Electric Connection Structure in Each State>
<6. Amplification Process and Signal Compensation Process>
<7. Clock Control>
<8. Power Supply Control in Connection State>
<9. Summary and Modifications>
<1. Structure of Camera System>

To begin with, a structure of an image capturing device 1 as a camera system according to one embodiment will be explained, referring to FIGS. 1 to 5.

The embodiment described later is an embodiment in which a camera system according to the present technology is applied to the image capturing device 1 as a video camera.

It should be noted that the application scope of the present technology is not limited to such a video camera described as an example. The present technology may be widely applicable to a great range of image capturing devices such as, for example, video cameras, still cameras, cameras having a special image capturing function such as an infrared camera and a particular wavelength camera, and cameras for various uses such as professional, general, and monitoring uses.

In the following explanation, frontward, rearward, upward, downward, rightward, and leftward directions refer to directions viewed based on the standpoint of a photographer in capturing an image with the video camera.

That is, a front side refers to where an object is located, and a rear side refers to where an image surface is located.

It should be noted that the frontward, rearward, upward, downward, rightward, and leftward directions referred in the following explanation are just for the sake of easy explanation, and the present technology is not limited to these directions in practice.

Moreover, a lens group mounted on the camera system may include a single lens, a plurality of lenses, or a combination of a single lens or a plurality of lenses and another optical element such as a diaphragm and an iris.

The image capturing device 1 includes a main unit 2 and a camera head unit 3 that is attachable to and detachable from the main unit 2 (see FIGS. 1 to 5).

It should be noted that the main unit 2 may be provided as an external device for the camera head unit 3, and in this case, the camera head unit 3 is configured to be attachable to and detachable from the external device. Moreover, the camera head unit 3 may be provided as an independent image capturing device.

Figure 2:
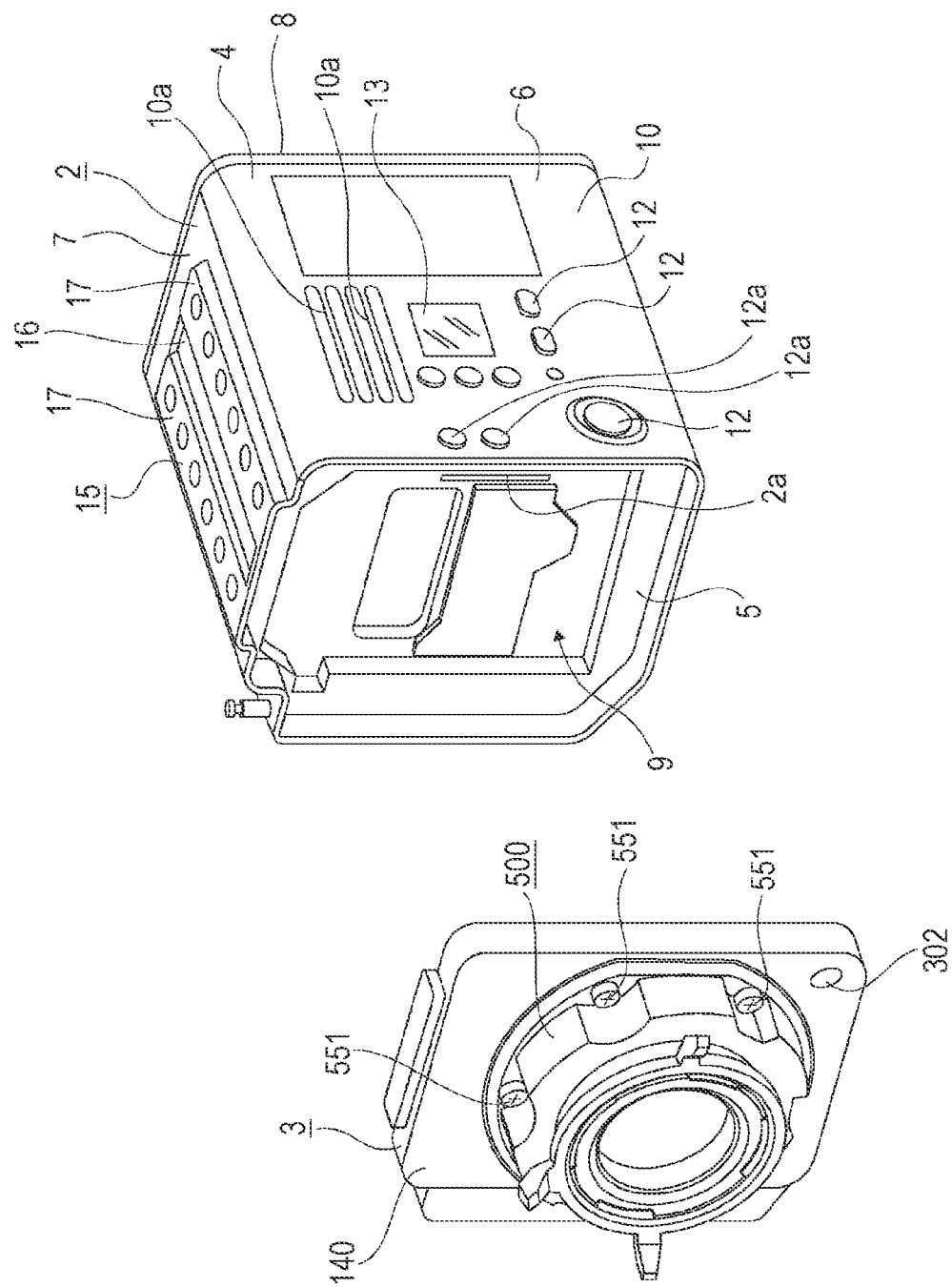
FIG. 2 is a perspective view illustrating a state in which a camera head unit is detached from a main unit according to the embodiment.

The main unit 2 includes an external panel 4 and an external housing 5 covered with the external panel 4 (see FIG. 2).

The external panel 4 includes a base panel section 6, an upper panel section 7, and a rear panel section 8. The base panel section 6 has a bottom surface section that faces the upward direction and the downward direction, and a pair of side surface sections 10 and 11 located on right and left edges of the bottom surface section 9 in such a manner that the side surface sections 10 and 11 are separated from each other while being continuous with either the right or left edge of the bottom surface section 9 (see FIGS. 1 and 4).

The base panel section 6 is provided with various operation sections 12 on the side surface sections 10 and 11. The operation sections 12 may include, for example, a power button, a recording button, a zoom knob, a mode switching knob, and the like.

Each of the side surface sections 10 and 11 is provided with a display section 13 thereon, which may be a liquid crystal panel or the like.

The side surface section 10 has inlet holes 10a in an upper region, the inlet holes 10a being, for example, extended longitudinally in a length direction thereof and aligned in the upward and downward direction thereof. The side surface section 11 has outlet holes 11a in a lower region, the outlet holes 11a being, for example, extended longitudinally in the upward and downward direction and aligned in the length direction thereof.

These constitute a flow path of a heat releasing mechanism formed by a fan being provided inside.

Figure 4:
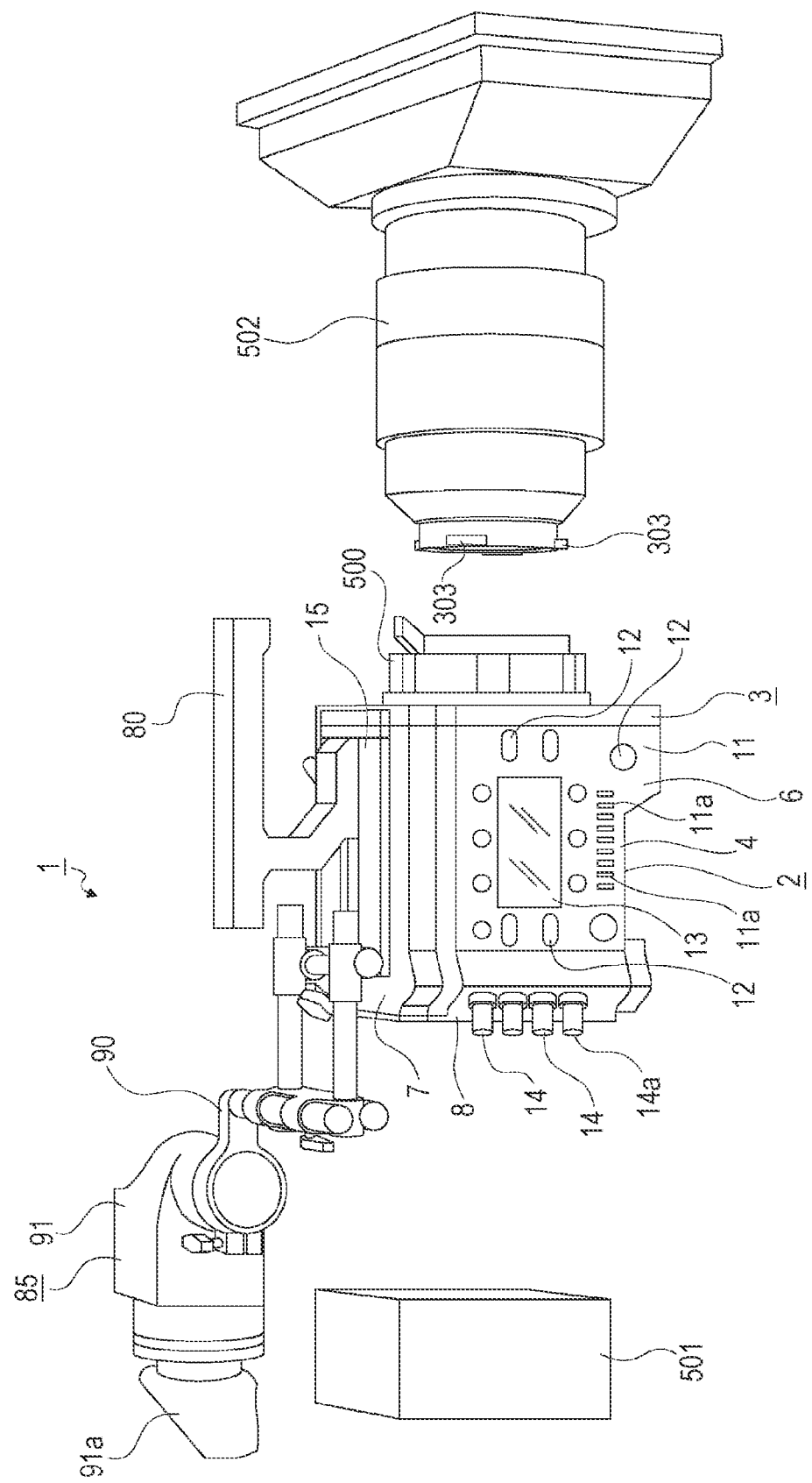
FIG. 4 is an explanatory view illustrating a case where an interchangeable lens and a finder unit are attached to the main unit according to embodiment.
Figure 5:
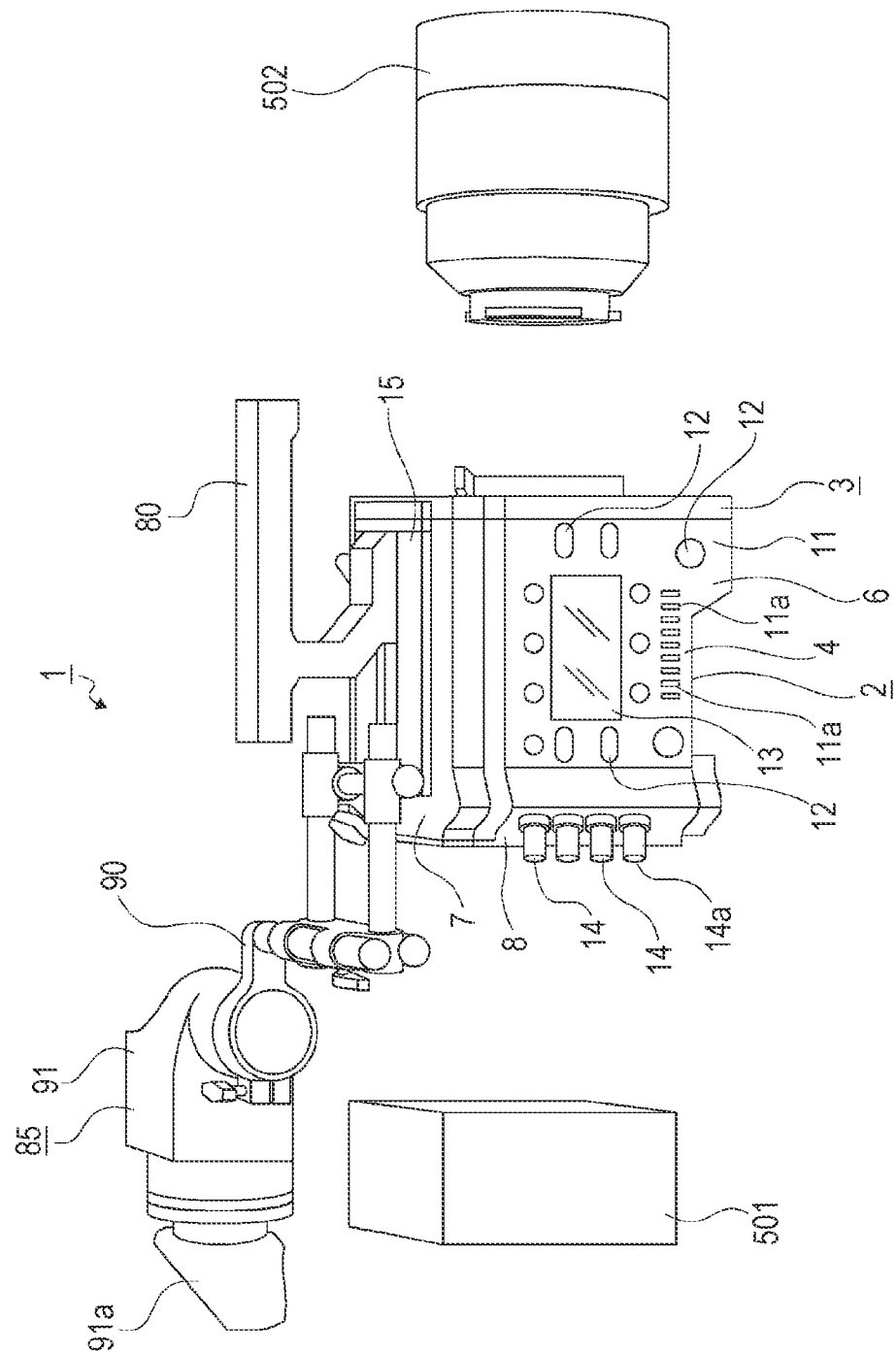
FIG. 5 is an explanatory view illustrating a case where an interchangeable lens and a finder unit are attached to the main unit according to embodiment.

The rear panel section 8 is provided with, on one side portion, connection terminals 14 aligned in the upward and downward direction (see FIGS. 4 and 5). The connection terminals 14 are connected with a cable (not illustrated) for power supply, signal transmission and reception, or the like.

As described later, one of the connection terminals 14 is a video output terminal 14a configured to output a monitor image signal. The monitor image signal is an image signal for real-time display of an image of an object that is being captured by the image capturing device 1, so that the photographer can check the image of the object. That is, the monitor image signal is a signal for a so-called "through-the-lens image". By connecting the video output terminal 14a with a monitor device via the cable (not illustrated), it becomes possible for a user to see the image of the object that is being image-captured or is stand-by for image capturing.

Figure 1:
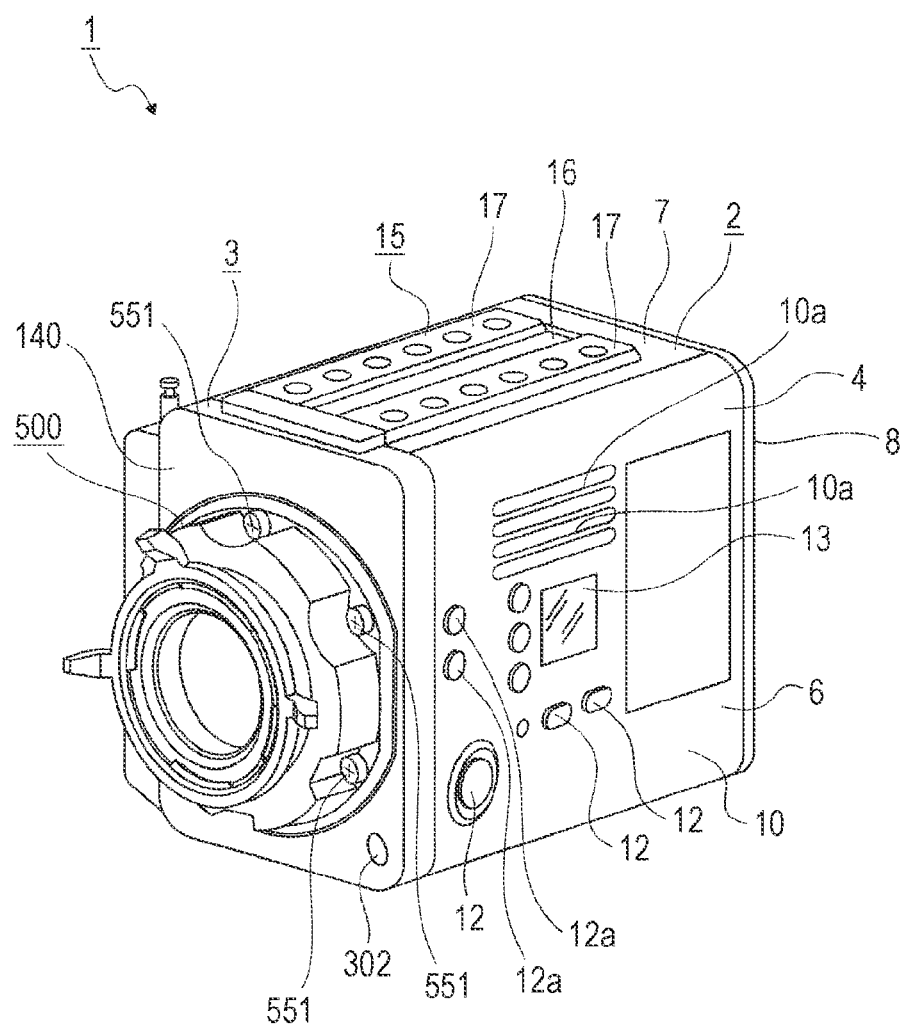
FIG. 1 is a perspective view illustrating a basic state of a camera system according to one embodiment of the present technology.

The upper panel section 7 has a plate-like shape facing in the upward and downward direction, and has a right edge portion and a left edge portion, which are attached to upper edge portions of the side surface sections 10 and 11, respectively (see FIGS. 1 and 2).

The rear panel section 8 has a plate-like shape facing in the frontward and rearward direction, and has an external circumferential portion attached to a rear edge portion of the base panel section 6 and a rear edge portion of the upper panel section 7.

As described above, the external panel 4 is constituted by attaching the upper panel section 7 to the side surface sections 10 and 11 and attaching the rear panel section 8 to the base panel section 6 and the upper panel section 7, thereby covering the external housing 5 with the external panel 4 in the upward, downward, rightward, leftward, and rearward directions (see FIG. 2).

On an upper surface of the upper panel section 7, a leveling mount 15 is provided (see FIGS. 1 and 2). The leveling mount has a longitudinal rectangular shape and has a groove section 16 in a middle in the rightward and leftward direction. Portions of the leveling mount 15 on the right and left sides of the groove section 16 are leveling sections 17.

The leveling mount 15 is so configured that a handle 80 is detachably attachable to the leveling mount 15 (see FIGS. 4 and 5).

Moreover, a finder unit 85 is also detachably attachable to the leveling mount 15, beside the handle 80. The finder unit 85 includes a rotation arm 90 and a view main body 91.

The view main body 91 includes a finder section 91a on one end portion, and the user can see a monitor image, an operation screen, or the like on the finder section 91a.

On a rear side of the main unit 2, a battery 501 is mounted (see FIGS. 4 and 5).

The battery 501 is a power supply for supplying a power supply voltage to each of the parts of the main unit 2 and the camera head unit 3.

On a front side of the main unit 2, the camera head unit 3 is mounted (see FIG. 1). The camera head unit 3 is detachably attached to the main unit 2, so that the camera head unit 3 can be detached from the main unit 2 (see FIG. 2).

Figure 3:
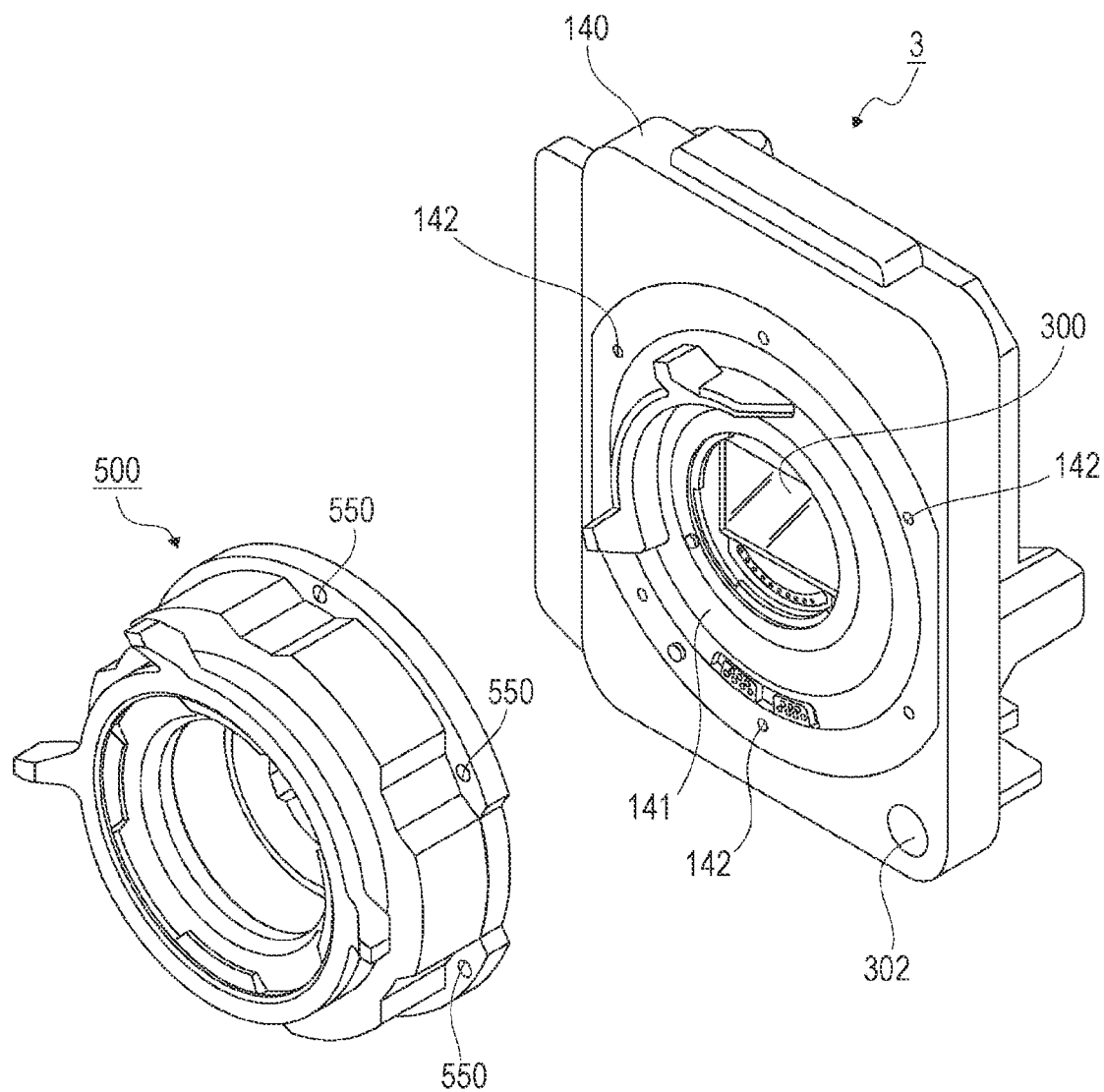
FIG. 3 is a perspective view illustrating a state in which an adaptor is detached from the camera head unit according to the embodiment.

It should be noted that FIGS. 1 and 2 illustrate an adaptor 500 additionally attached to the camera head unit 3, but as illustrated in FIG. 3, the adaptor 500 is detachably attachable to the camera head unit 3.

The adaptor 500 is used for mounting a different interchangeable lens. For example, an interchangeable lens 502 illustrated in FIG. 5 can be mounted on the camera head unit 3 without mounting the adaptor 500.

On the other hand, with the adaptor 500 mounted on the camera head unit 3, a different type of interchangeable lens 502 illustrated in FIG. 4 can be mounted thereon.

The camera head unit 3 includes a housing 140 having a substantially rectangular and a substantially plate-like shape, and has a front side being a mounting surface 141 configured to mount the adaptor 500 or the interchangeable lens 503 thereon (see FIG. 3).

The camera head unit 3 is such that a plurality of screw holes 142 is provided at predetermined positions. The screw holes 142 are located at positions corresponding to positions of a plurality of screw holes 550 provided in the adaptor 500, so that the adaptor 500 can be attached to the camera head unit 3 by screwing down with screws 551 as illustrated in FIG. 1.

The camera head unit 3 includes an image sensor 300, optical elements such as a neutral density (ND) filter and iris mechanism (not illustrated), and a circuit board on which necessary circuits are mounted (see FIG. 2).

Moreover, the camera head unit 3 is provided with an assignable button 302.

The assignable button 302 is an operation input element to which the user can assign an operation function as desired. For example, the main unit 2 is also configured such that some buttons of the operation sections 12 are assignable button 12a.

The user can assign, to the assignable button 12a or 302, an operation function as desired according to the user's needs and convenience, such as recording start/stop operation, reproduction operation, and menu operation, for example.

By providing the assignable button 302 to the camera head unit 3 as well, it becomes possible for the user to perform necessary operation on the camera head unit 3 side via the assignable button 302 even in a case where the camera head unit 3 is used while the camera head unit 3 is detached from the main unit 2 as described later, thereby facilitating the convenience in usage.

As described above, the camera head unit 3 is detachably attached to the external housing 5 of the main unit 2 (see FIGS. 1 and 2).

The main unit 2 includes a mounting section 9, so that the camera head unit 3 is mounted on the mounting section 9 via an appropriate mechanism (see FIG. 2).

The mechanism for mounting may be screwing-on via screw holes provided circumferentially in the housing 140 of the camera head unit 3 and in the mounting section 9 correspondingly to each other. However, for example, the mechanism may be such that an engagement mechanism and a disengagement mechanism for releasing engagement are provided, so that the camera head unit 3 can be easily attached and detached without using the screws. Especially, assuming an extension usage form described later, it is desirable that the camera head unit 3 be easily attachable and detachable from the main unit 2 without using the screws.

Figure 12A:
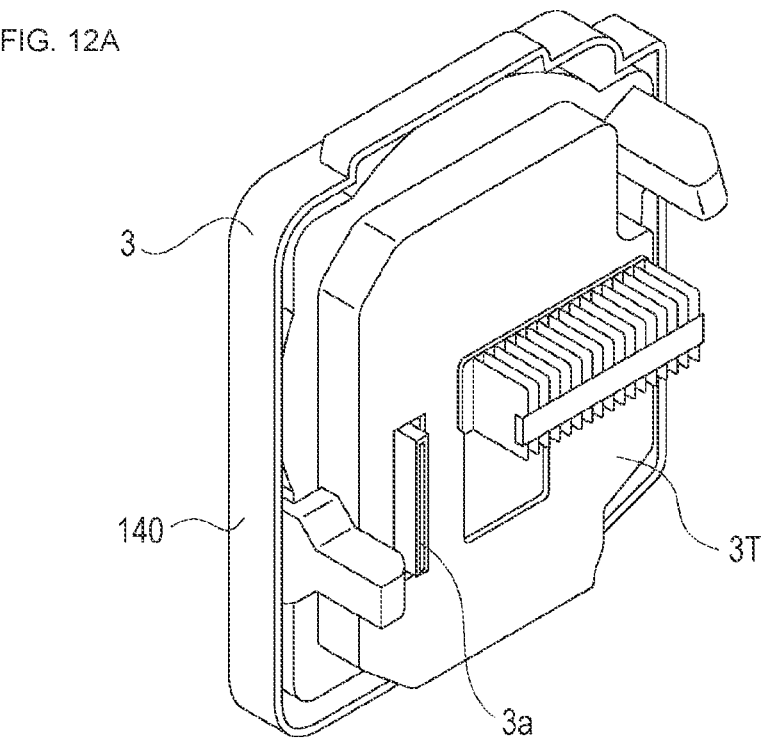
FIGS. 12A and 12B are an explanatory view illustrating terminal surfaces of the camera head unit and the base plate according to the embodiment.

The camera head unit 3 has a terminal surface 3T on a rear side thereof being opposite to the mounting surface 141 as illustrated in FIG. 12A, and a connector 3a is provided on the terminal surface 3T.

To correspond to this, the mounting section 9 of the main unit 2 is provided with a connector 2a.

In a state in which the camera head unit 3 is attached to the main unit 2, the connectors 2a and 3a joint with each other, thereby making it possible to transmit various signals between the main unit 2 and the camera head unit 3.

<2. Extension Usage Form>

The image capturing device 1 with the structure as above is used basically in such a way that the camera head unit 3 is mounted on the main unit 2. In the present embodiment, it is configured such that the camera head unit 3 can be used in such a way that the camera head unit 3 is detached from the main unit 2. In this case, the following points are also taken into consideration.

As illustrated in FIGS. 1 to 5, a structure in which the camera head unit 3 is incorporated in the main unit 2 for use does not assume in general that only the camera head unit 3 is detached from the main unit 2 for use. Furthermore, it is usually assumed that the signal from the camera head unit 3 (especially the image sensor 300), which is a signal of a subtle level, requires a large-scale circuit or the like in order to actively use the camera head unit 3 in such a detached form.

On the other hand, the present embodiment can realize stable signal transmission without such an additionally large-scale circuit structure for the signal process even with such a main unit 2 that does not especially assume the use of the camera head unit 3 detached therefrom.

Moreover, a boundary structure between the camera head unit 3 and the main unit 2, which makes it possible to attach and detach the camera head unit 3 from the main unit 2, is defined as a simple connector structure. By introducing a mechanism that enables stable signal transmission in this section, it becomes possible to allow cable extension in a practical range.

Especially, with a cable structure configured to perform level adjustment of amplification and device attachment notice to a control mechanism, feeding-back to various control is also realized.

Moreover, the present technology is realized such that all functions of the camera head unit 3 side such as operation modes of the image sensor 300, frequencies, the ND filter function, and lens communication can be normally operable in a case where the camera head unit 3 detached is used, thereby avoiding performance deterioration when the camera head unit 3 is used with extension.

In the following, a structure for the usage with extension will be explained firstly.

Note that, terms "basic state," "extension state," and "additional extension state" will be used herein.

The term "basic state" refers to a state in which the camera head unit 3 is attached to the main unit 2. That is, it is the usage form illustrated in FIGS. 1, 4, and 5.

The term "extension state" refers to a first connection state in which the camera head unit 3 is detached from the main unit 2, and connected with the main unit 2 via an extension cable 20.

The term "additional extension state" refers to a second connection state in which the camera head unit 3 is detached from the main unit 2, and connected with the main unit 2 via the extension cable 20 and an additional extension cable 30.

Note that, what are meant by an expression "main unit 2 side" and an expression "camera head unit 3 side", which are accompanied with the word "side," are portions including the jointing portion for jointing with the main unit 2 or the camera head unit 3.

That is, in the extension state or the additional extension state, the "main unit 2 side" includes a base plate 50 described later.

Moreover, in the extension state or the additional extension state, the "camera head unit 3 side" includes a first connector section 21 described later.

Both of the extension cable 20 and the additional extension cable 30 described later are cables for electrical connection. Further, the extension cable 20 may be a cable for connection between the main unit 2 and a camera head unit 3. The additional extension cable 30 may be a cable provided in addition to the extension cable 20 to thereby make it possible to further extend a distance between the main unit 2 and the camera head unit 3.

The extension cable 20 and the additional extension cable 30 may be any cables capable of connecting the camera head unit 3 and the main unit 20, and may be relatively soft cables covered with insulator such as vinyl or hard tubes (cylinder tube).

It should be noted that, the connection state of the extension cable 20 and the additional extension cable 30 will be described hereinbelow, a connection order and a connection direction thereof are merely an example. The other examples will be described later.

To begin with, the form of extension state will be described, referring to FIGS. 6, 7, 8, 11A, 12A, and 12B.

Figure 6:
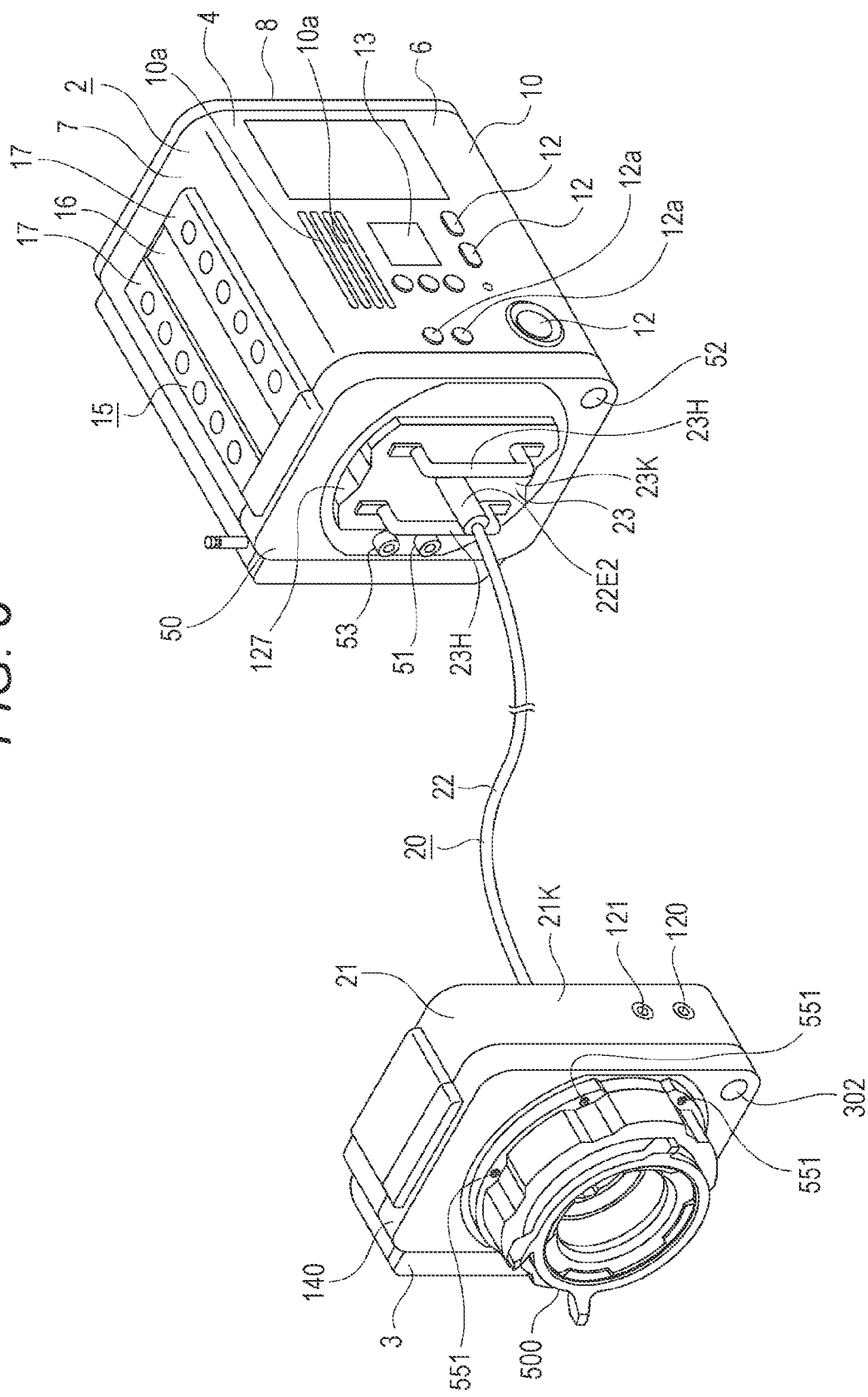
FIG. 6 is a perspective view illustrating an extension state according to the embodiment.

FIG. 6 illustrates a state in which the camera head unit 3 is detached from the main unit 2 and connected with the main unit 2 connected via the extension cable 20.

Figure 7:
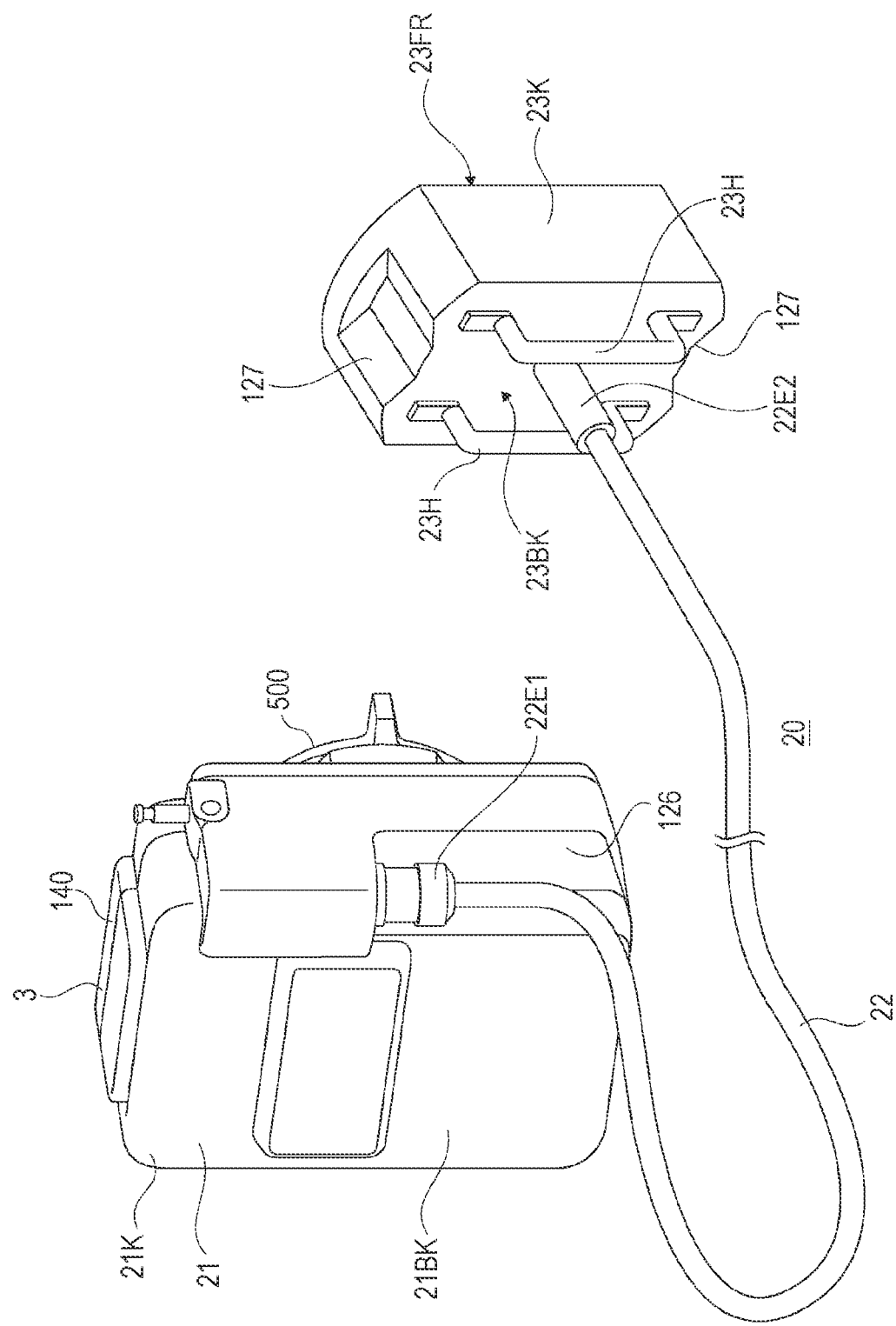
FIG. 7 is a perspective view illustrating an extension cable according to the embodiment.

The extension cable 20 includes a first connector section 21, a cable 22, and a second connector section 23 (see FIGS. 6, 7, and 11A).

The first connector section 21 is a connector section provided at one end side of the cable 22, is to be connected with the camera head unit 3.

The second connector section 23 is another connector section provided at the other end side of the cable 22, is to be connected with the main unit 2 side.

The cable 22 is configured to transmit signals between the first connector section 21 and the second connector section 23, and includes a predetermined number of transmission paths for electric signals.

The extension cable 20 may be about 3 m in length, for example, that is, the extension state as illustrated in FIG. 6 makes it possible to perform image-capturing with the camera head unit 3 detached and distanced from the main unit 2 by 3 m for example in the front direction.

The first connector section 21 is configured to joint with the terminal surface 3T (see FIG. 12A) on the rear side of the camera head unit 3 as illustrated in FIG. 7.

A housing 21K of the first connector section 21 has a terminal 21FR (see FIG. 11A) having, for example, a contour substantially identically shaped and sized with the terminal surface 3T of the housing 140 of the camera head unit 3. With this configuration, when the housing 140 of the camera head unit 3 joints with the housing 21K of the first connector section 21 in such a way that the terminal surface 3T and the terminal surface 21FR face each other, the housing 140 of the camera head unit 3 and the housing 21K of the first connector section 21 are integrated as if a single box is formed with the housing 140 and the housing 21K, as illustrated in FIGS. 6 and 7.

Especially, because the housing 140 of the camera head unit 3 has such a relatively thin plate-like shape, it is difficult for the housing 140 to stand alone. Moreover, the weight of the adaptor 500 worsens balance of the housing 140. On the other hand, when the first connector section 21 is attached to the camera head unit 3, it becomes easier for the camera head unit 3 to stand alone.

Moreover, the relatively thin plate-like shape of the housing 140 of the camera head unit 3 makes it difficult for the user to stably hold the camera head unit 3 toward an object of image-capturing when the camera head unit 3 is alone. By having an additional thickness due to the housing of the first connector section 21, the camera head unit 3 detached from the main unit 2 can become easier to hold with a hand and to handle.

To a rear side 21BK of the housing 21K of the first connector section 21, a cable end 22E1 of the cable 22 is fixedly attached (see FIG. 7).

The cable end 22E1 is mounted in such a way that the cable end 22E1 is extended downwardly from where the cable end 22E1 is fixed to the housing 21K along a cutout portion 126 of the housing 21K.

By providing the cable end 22E1 within the cutout portion 126, external stress is hardly applied on the cable end 22E1, thereby facilitating protection of the cable end 22E1.

Moreover, by extending the cable 22 downwardly from the cable end 22E1, it becomes easier to keep the camera head unit 3 standing as illustrated in FIG. 7.

On the terminal surface 3T of the camera head unit 3, a connector 3a is provided (see FIG. 12A). Moreover, on the terminal surface 21FR of the first connector section 21, a connector 21a is provided (see FIG. 11A).

As illustrated in FIG. 6, in the state in which the camera head unit 3 and the first connector section 21 joint with each other, the connectors 3a and 21a joint with each other, thereby making it possible to transmit signals between the extension cable 20 and the camera head unit 3.

The first connector section 21 is provided with a video output terminal 121, thereby making it possible to connect a monitor device thereto, for example.

Moreover, the first connector section 21 is provided with an external power supply output terminal 120, thereby making it possible for an external power supply to provide a power supply voltage to a device requiring such power supply.

The second connector section 23 at the other end side of the cable 22 includes a housing 23K having a substantially cuboid shape whose top and bottom are curved.

The housing 23K has a recess section 127 on each of an upper surface and a bottom surface thereof.

A rear surface 23BK of the housing 23K is provided with a pair of handles 23H attached thereto. The handles 23H and the recess sections 127 make it easier to handle the second connector section 23.

At the other end side of the cable 22, a cable end 22E2 is fixed in such a way that the cable end 22E2 protrudes perpendicularly to the rear surface 23BK.

Especially, since the cable end 22E2 is fixed at a substantially center of the rear surface 23BK and the pair of handles 23H is located at both sides of the cable end 22E2, external stress by the pair of handles is hardly applied onto a portion to which the cable end 22E2 joints. That is, the cable end 22E2 is protected by the pair of handles 23H.

The second connector section 23 is detachably attachable to the main unit 2 side. Especially, in the present embodiment, the second connector section 23 is detachably attachable to the main unit 2 with the base plate 50 is mounted on the main unit 2. In other words, the base plate 50 is provided as a structure on the main unit 2 side, and is configured to make it possible to connect the extension cable 20 to the main unit 2.

Figure 8:
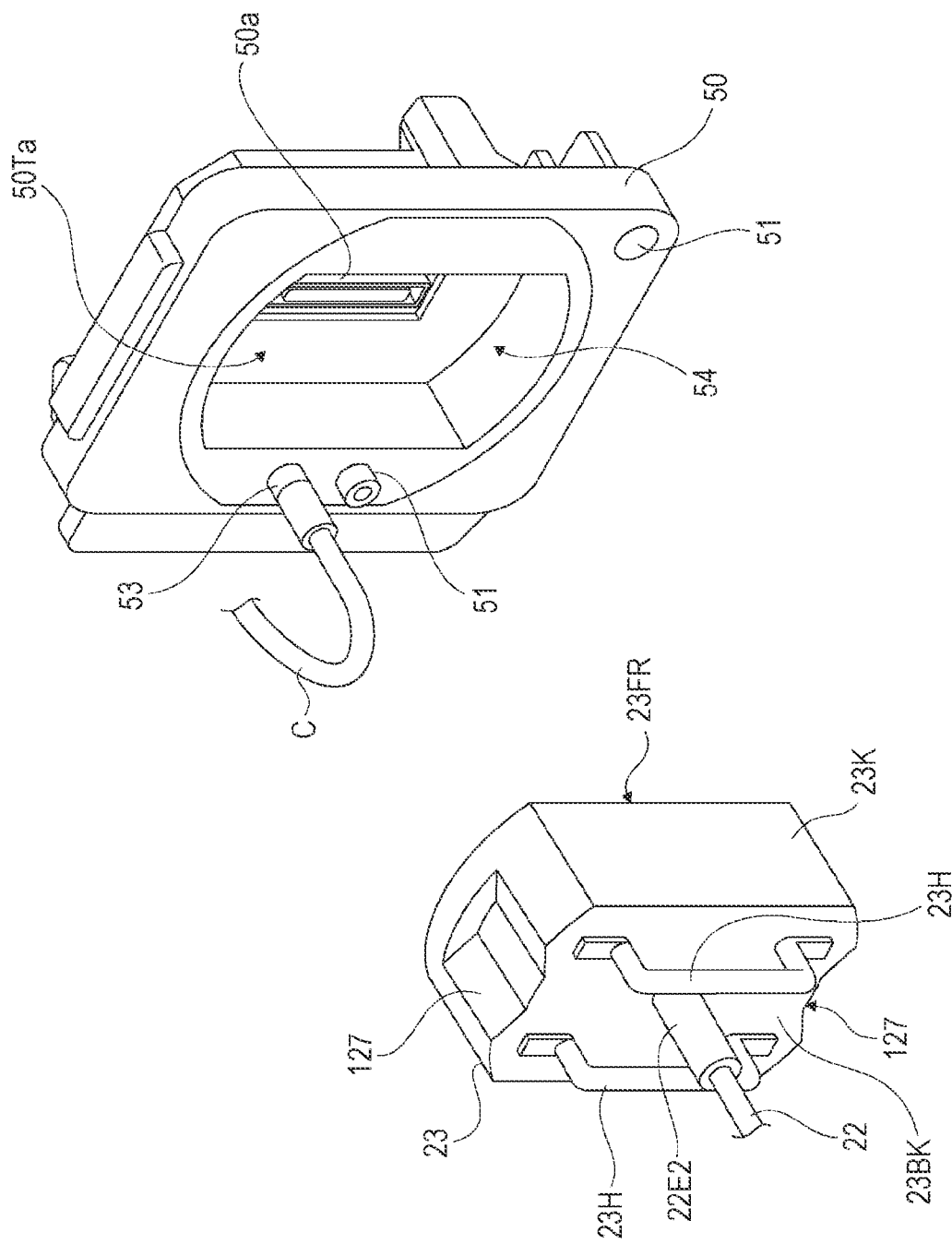
FIG. 8 is a perspective view illustrating a state in which a second connector section is detached from a base plate according to the embodiment.
Figure 12B:
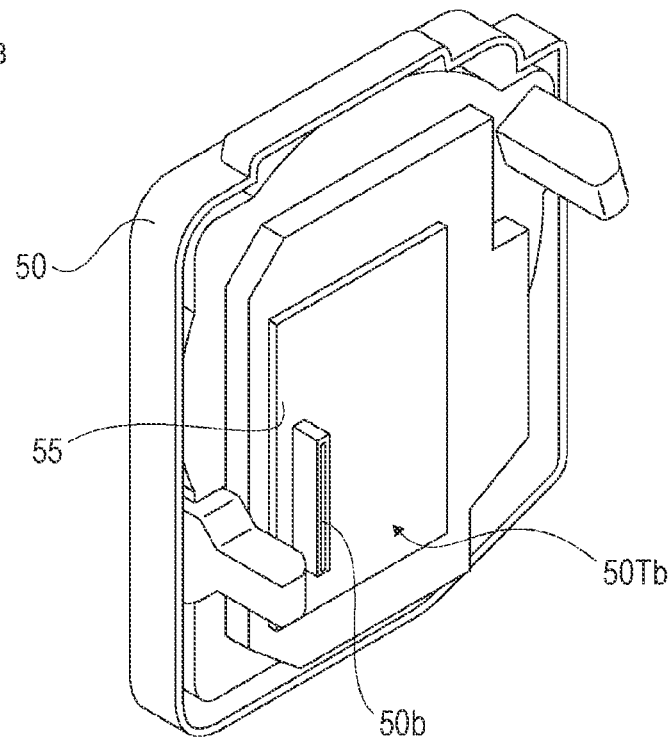

FIG. 8 illustrates a front side (terminal surface 50Ta) of the base plate 50. Moreover, FIG. 12B illustrates a rear side (terminal surface 50Tb) of the base plate 50.

The base plate 50 has a recess section 54 for mounting the second connector section 23 at a center on the terminal surface 50Ta.

The recess section 54 is sized to embed the housing 23K of the second connector section 23 therein.

FIG. 6 illustrates a state in which the second connector section 23 is embedded in the recess section 54. As illustrated in FIG. 6, the housing 23K of the second connector section 23 is embedded into the recess section 54 in such a way that the housing 23K contacts substantially closely with sides of the recess section 54 with only a small portion of the housing 23K being protruded from the recess section 23K. In the engaged state, recess sections 127 of the housing 23K are left as a gap between the housing 23K and the recess section 54. By having the recess sections 127 in an upper portion and a lower portion of the housing 23K, attaching and detaching of the housing 23k can be easily performed without excess friction between the housing 23K and the recess section 54.

Moreover, it becomes easier for the user to attach and detach the second connector section 23 to the base plate 50 by utilizing the handles 23H.

Moreover, the majority of the second connector section 23 is embedded into the base plate 50, thereby reducing the protrusion caused as a result of the jointing the second connector section 23 to the base plate 50. That is, even though both of the base plate 50 and the second connector section 23 are attached to the main unit 2, sizes of the base plate 50 and the second connector section 23 in a thickness direction do not become the protrusion from the main unit 2 as it is, thereby facilitating downsizing of the main unit 2 side in the frontward and rearward direction in the extension state.

On a bottom surface of the recess section 54 of the base plate 50, a connector 50a is provided (see FIG. 8). Moreover, on a terminal surface 23FR of the second connector section 23, a connector 23a is provided (see FIG. 11A).

In the state in which the second connector section 23 is attached to the base plate 50 as illustrated in FIG. 6, the connectors 50a and 23a joint with each other, thereby making it possible to transmit signals between the extension cable 20 and the base plate 50.

The base plate 50 has a surface facing to the main unit 2, and the surface is referred to as a terminal surface 50Tb (see FIG. 12B).

The base plate 50 is attachable to and detachable from the mounting section 9 of the main unit 2. That is, it is possible to attach the base plate 50 to the mounting section 9 that is protruded in the state in which the camera head unit 3 is detached from the main unit 2 (see FIG. 2).

Therefore, as illustrated in FIGS. 12A and 12B, it is not necessary that the terminal surface 50Tb of the base plate 50 and the terminal surface 3T of the camera head unit 3 be perfectly identical in shape, but both of the terminal surface 50Tb of the base plate 50 and the terminal surface 3T of the camera head unit 3 is attachable to the mounting section 9.

The terminal surface 50Tb of the base plate 50 is provided with a connector 50b thereon. The connector 50b is a connector capable of jointing with the connector 2a of the mounting section 9 (see FIG. 2), and is provided at a position at which the connector 50b faces and joints with the connector 2a with the base plate 50 attached to the mounting section 9. Therefore, when the base plate 50 is attached to the main unit 2, it becomes possible to transmit signals between the main unit 2 and the base plate 50 via the connectors 50b and 2a.

Moreover, the connector 50b is attached to one side of the substrate 55 and the connector 50a is provided on the other side of the substrate 55. The substrate 55 is provided with wirings connecting each of the pins of the connector 50a with each of the pins of the connector 50b, thereby forming a transmission path to the connector 50a side.

As illustrated in FIG. 6, the base plate 50 is provided with an external power supply input terminal 51. Correspondingly to the external power supply input terminal 51, the first connector section 21 of the camera head unit 3 side includes the external power supply output terminal 120.

As described later, a line for external power source supply is provided as a path formed by the connectors 50a and 23a, the cable 22, and the connector 21a.

With this configuration, a power supply device (such as power supply adaptor) is connected to the external power supply input terminal 51 to provide the power supply to the main unit 2 side, whereby the camera head unit 3 side receives the power supply voltage via the external power supply output terminal 120 and is enabled to drive devices as necessary.

For example, some of the interchangeable lens 502 and the like require external power supply for lens driving. For such an interchangeable lens 502, this configuration can provide power supply voltage via the external power supply output terminal 120 provided in the second connector section 23. That is, the camera head unit 3 side detached from the main unit 2 can utilize the external power supply voltage without requiring another power supply wiring.

Moreover, the base plate 50 is provided with a video input terminal 53, and the first connector section 21 is provided with a video output terminal 121 corresponding to the video input terminal 53.

As described later, a transmission line between the video input terminal 53 and the video output terminal 121 is formed as a path formed by the connectors 50a and 23a, the cable 22, and the connector 21a. Thus, by connecting a monitor device to the video output terminal 121, it is possible to supply an image signal supplied from the main unit 2 side to the monitor device for displaying. For example, the user on the camera head unit 3 side can see a monitor image signal (through-the-lens image) generated on the main unit 2.

As described above, the camera head unit 3 is provided with the assignable button 302. Corresponding to this configuration, the base plate 50 is provided with an assignable button 52.

The assignable button 52 is an operation input element having a same function as the assignable button 302, but is provided on the base plate 50, thereby making it possible to perform the same function on the main unit 2 side as on the camera head unit 3 side.

<3. Additional Extension State>

Next, referring to FIGS. 9, 10, 11B, and 12B, a form of the additional extension state will be described.

Figure 9:
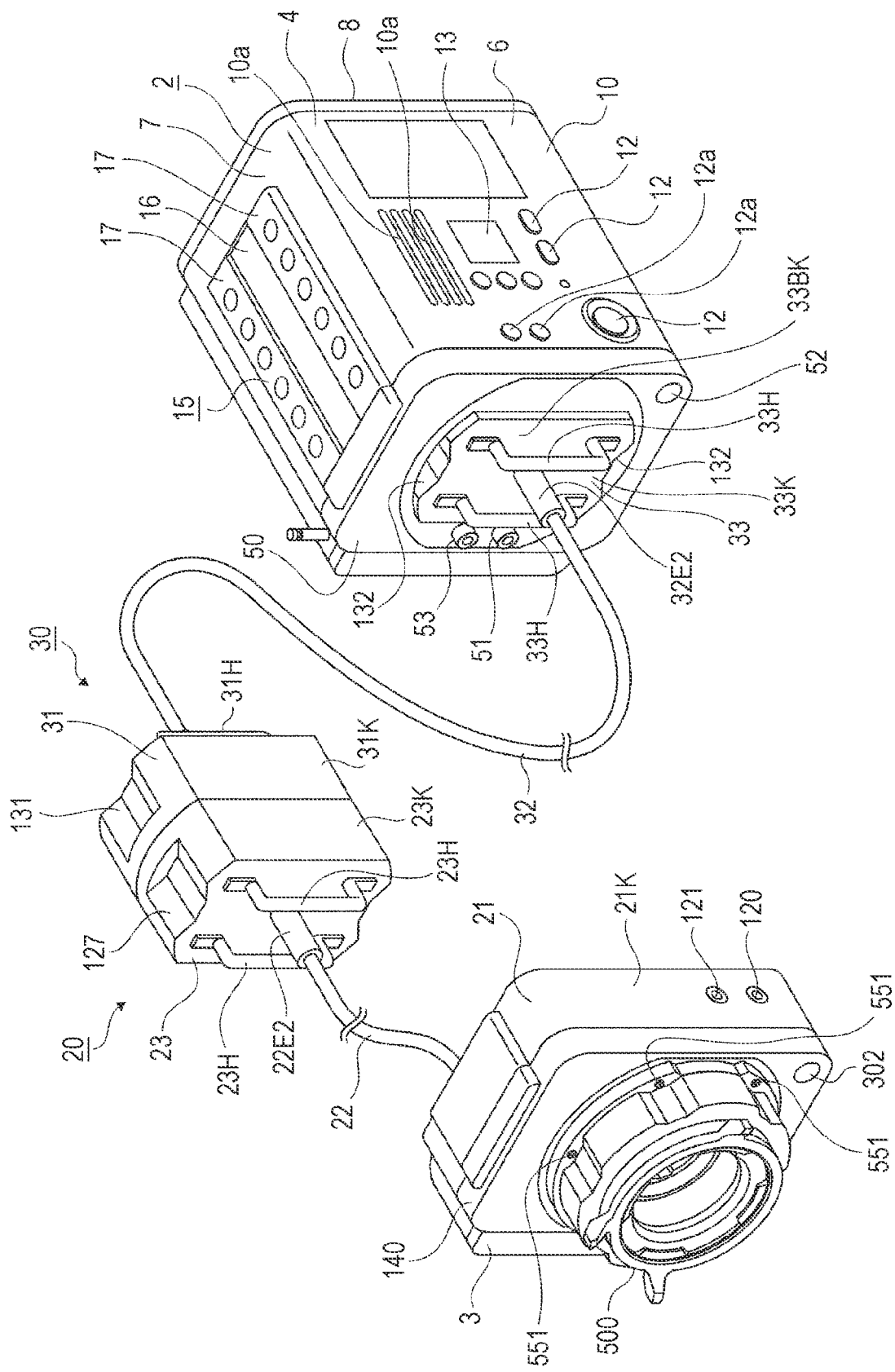
FIG. 9 is a perspective view illustrating an additional extension state according to the embodiment.

FIG. 9 illustrates a state in which the camera head unit 3 is detached from the main unit 2 and connected with the main unit 2 via two cables, namely, the extension cable 20 and an additional extension cable 30.

The additional extension cable 30 may be about 3 m in length, for example, that is, the additional extension state as illustrated in FIG. 9 makes it possible to perform image-capturing with the camera head unit 3 detached and distanced from the main unit 2 by 6 m for example in the front direction.

The additional extension cable 30 includes a third connector section 31, a cable 32, and a fourth connector section 33 (FIGS. 9, 10, and 11B).

The third connector section 31 is a connector section at one end side of the cable 32 and is configured to be connectable with the second connector section 23 of the extension cable 20.

The fourth connector section 33 is a connector section at the other end side of the cable 32 and is configured to be connectable with the main unit 2 side (base plate 50).

It should be noted that "third" or "fourth" shown in the third connector section 31 and the fourth connector section 33 are denoted just for being distinguishable from the first connector section 21 and the second connector section 23 of the extension cable 20, and the additional extension cable 30 is not such that the first and second connectors are provided thereto.

The cable 32 is configured to transmit signals between the third connector section 31 and the fourth connector section 33, and includes a predetermined number of transmission paths for electric signals.

The third connector section 31 is configured to be connectable with the second connector section 23 of the extension cable 20, as illustrated in FIG. 9. A housing 31 K of the third connector section 31 has a shape substantially identical with that of the housing 23K of the second connector section 23, and the third connector section 31 joints with the second connector section 23 in such a way that a terminal surface 31FR and the terminal surface 23FR (see FIGS. 11A and 11B) face to each other. Thus, in the connection state, as illustrated in FIG. 9, the housings 23K and 31 K are integrated as if forming a single box. Especially, with the configuration that the housings 23K and 31 K are substantially identical in terms of outer circumferential shape, a connection boundary will be levelled off when the housings 23K and 31 K joint with each other as illustrated in FIG. 9, thereby making it easier for the user to handle this portion (a center portion of the cable of 6 m in length).

The housing 31K has a recess section 131 on each of an upper surface and a bottom surface thereof.

A rear surface 31BK of the housing 31K is provided with a pair of handles 31H attached thereto. The handles 31H and the recess sections 131 make it easier to handle the third connector section 31.

At one end side of the cable 32, a cable end 32E1 provided thereto is fixed to a rear surface 31BK of the third connector section 31 in such a way that the cable end 32E1 protrudes perpendicularly to the rear surface 31BK (see FIG. 10).

With the configuration in which the cable end 32E1 is fixed at a substantially center of the rear surface 31BK and the pair of handles 31H is positioned on right and left sides with respect to the cable end 32E1, external stress by the pair of handles 31H is hardly applied to a joint portion of the cable end 32E1. That is, the cable end 32E1 is protected by the pair of handles 31H.

On a terminal surface 3T of the third connector section 31, a connector 31a is provided (see FIG. 11B). This connector 31a is a connector corresponding to the connector 23a on the terminal surface 23FR of the second connector section 23. That is, the connector 31a is a connector identical with the connector 50a of the base plate 50. Therefore, the second connector section 23 is connectable with either of the third connector section 31 and the base plate 50.

As illustrated in FIG. 9, in the state in which the second connector section 23 and the third connector section 31 joint with each other, the connectors 23a and 31a joint with each other, thereby making it possible to transmit signals between the additional extension cable 30 and the extension cable 20.

The fourth connector section 33 at the other end side of the cable 32 of the additional extension cable 30 includes a housing 33K having a shape identical with that of the housing 23K of the second connector section 23 of the extension cable 20. Note that the housings 23K and 33K need not have a completely identical shape. It is only required that both of the housings 23k and 33k be at least shaped to be attachable to the base plate 50 by being embedded into the recess section 54. However, the configuration in which the housings 23k and 33K (as well as the housing 31K) have an identical shape would facilitate efficiency of manufacturing.

The housing 33K has a recess section 132 on each of an upper surface and a bottom surface thereof.

A rear surface 33BK of the housing 33K is provided with a pair of handles 33H attached thereto. The handles 33H and the recess sections 132 make it easier to handle the fourth connector section 33.

At the other end side of the cable 32, a cable end 32E2 provided thereto is fixed to a rear surface 33BK of the housing 33K in such a way that the cable end 32E2 is perpendicular to the rear surface 33BK.

Especially, with the configuring in which the cable end 32E2 is fixed at a substantially center of the rear surface 33BK and the pair of handles 33H is located at either sides with respect to the cable end 32E2, external stress by the pair of handles 33H is hardly applied to a joint portion of the cable end 32E2. That is, the cable end 32E2 is protected by the pair of handles 33H in this way.

The fourth connector section 33 is detachably attachable to the main unit 2 side. That is, the fourth connector section 33 is detachably attachable to the base plate 50.

As in the connection state in which the second connector section 23 and the base plate 50 joint with teach other as described above, the fourth connector section 33 joints with the base plate 50 by being embedded in the recess section 54 of the base plate 50.

Recess sections 132 of the fourth connector section 33 are left as gaps between the housing 33k and the recess section 54 when the fourth connector section 33 is embedded in the recess section 54 (see FIG. 9). This configuration avoids excess friction between the housing 33K and the recess section 54, thereby achieving easy attachment.

Moreover, it becomes easier for the user to attach and detach the fourth connector section 33 to the base plate 50 by utilizing the handles 33H.

Moreover, as in the case of the second connector section 23, the fourth connector section 33 is also configured such that a majority of the fourth connector section 33 is embedded in the recess section 54 of the base plate 50, thereby reducing protrusion of the fourth connector section 33 from the main unit 2 when the fourth connector section 33 joints with the main unit 2. Therefore, this configuration can reduce a size increase of the main unit 2 side in the frontward and rearward direction in the additional extension state.

As described above, on a bottom surface of the recess section 54 of the base plate 50, a connector 50a is provided (see FIG. 8). Meanwhile, on a terminal surface 33FR of the fourth connector section 33, a connector 33a is provided (see FIG. 11B).

In the state in which the fourth connector section 33 is attached to the base plate 50 as illustrated in FIG. 9, the connectors 50a and 33a joint with each other, thereby making it possible to transmit signals between the additional extension cable 30 and the base plate 50.

<4. Connector Connection>

The connector connections in the basic state, the extension state, and the additional extension state described above will be described.

In the above, the following connectors are described.

The connector 3a of the camera head unit 3

The connector 21a of the first connector section 21 of the extension cable 20

The connector 23a of the second connector section 23 of the extension cable 20

The connector 31a of the third connector section 31 of the additional extension cable 30

The connector 33a of the fourth connector section 33 of the additional extension cable 30

The connector 50a on the terminal surface 50Ta of the base plate 50

The connector 50*b* on the terminal surface 50Tb of the base plate 50

The connector 2*a* of the main unit 2

These connectors correspond at least as below.

The connector 3*a* of the camera head unit 3 is connectable with either of the connectors 2*a* and 21*a*.

The connector 21*a* of the first connector section 21 of the extension cable 20 is connectable with the connector 3*a*.

The connector 23*a* of the second connector section 23 of the extension cable 20 is connectable with the connectors 31*a* and 50*a*.

The connector 31*a* of the third connector section 31 of the additional extension cable 30 is connectable with the connector 23*a*.

The connector 33*a* of the fourth connector section 33 of the additional extension cable 30 is connectable with the connector 50*a*.

The connector 50*a* on the terminal surface 50Ta of the base plate 50 is connectable with either of the connectors 23*a* and 33*a*.

The connector 50*b* on the terminal surface 50Tb of the base plate 50 is connectable with the connector 2*a*.

The connector 2*a* of the main unit 2 is connectable with either of the connectors 3*a* and 50*b*.

FIGS. 13A, 13B and 13C illustrate the connector connections in each of the states. Note that, "CN" in the drawings described later indicates a connector.

FIG. 13A illustrates the basic state. The camera head unit 3 is attached to the main unit 2 with the connectors 2*a* and 3*a* jointing with each other, thereby enabling the signal transmission between the main unit 2 and the camera head unit 3.

FIG. 13B illustrates the extension state.

The base plate 50 is attached to the main unit 2. Further, the extension cable 20 is attached between the camera head unit 3 and the base plate 50.

In this case, the connectors 2*a* and 50*b* joint with each other, the connector 50*a* and 23*a* joint with each other, and the connectors 21*a* and 3*a* joint with each other. This configuration enables the signal transmission between the main unit 2 and the camera head unit 3 via the base plate 50 and the extension cable 20.

FIG. 13C illustrates the additional extension state.

The base plate 50 is attached to the main unit 2. Further, the additional extension cable 30 and the extension cable 20 are attached between the camera head unit 3 and the base plate 50.

In this case, the connectors 2*a* and 50*b* joint with each other, the connectors 50*a* and 33*a* joint with each other, the connectors 31*a* and 23*a* joint with each other, and the connectors 21*a* and 3*a* joint with each other. This configuration enables the signal transmission between the main unit 2 and the camera head unit 3 via the base plate 50, the additional extension cable 30, and the extension cable 20.

It should be noted that all or some of these connectors are mounted on a board, thereby being provided as a board-to-board (B to B) connector.

These connectors are not particularly limited as to how many pins each of the connectors includes (the number of terminals), but these connectors may include 100 pins or more, for example.

<5. Electric Connection Structure in Each State>

In the following, electric connection configurations in each state will be described, but firstly configurations of signal process systems inside each unit/section will be described to facilitate the explanation of the electric connection configurations.

Figure 14:
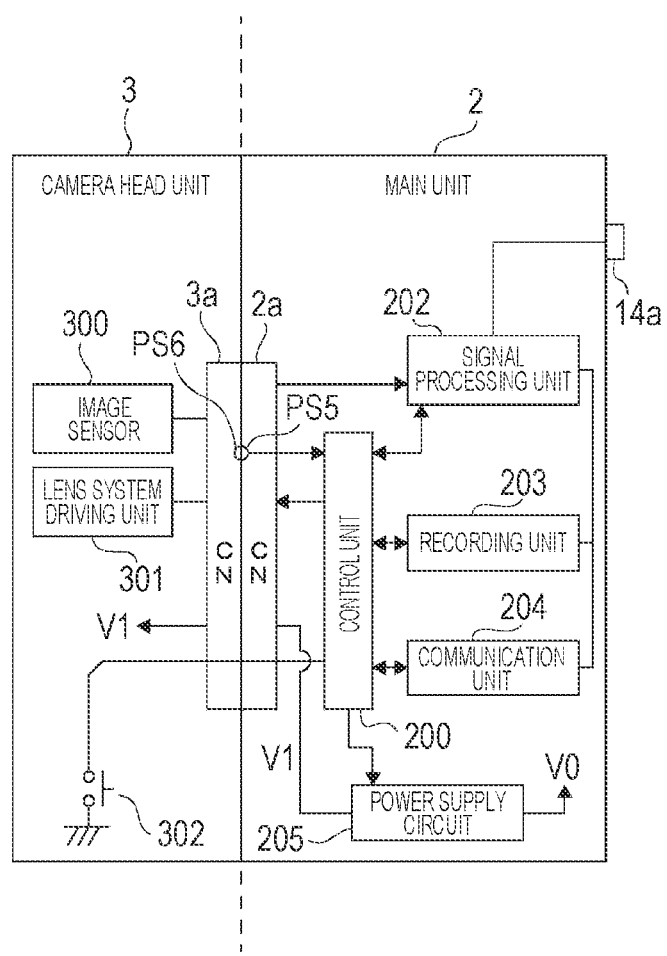
FIG. 14 is an explanatory view illustrating a connection structure in the basic state according to the embodiment.

FIG. 14 illustrates an electric connection state in the basic state. Referring to FIG. 14, main configurations of the main unit 2 and the camera head unit 3 will be described.

The main unit 2 includes a control unit 200, a signal processing unit 202, a recording unit 203, a communication unit 204, and a power supply circuit 205. It should be noted that, the main unit 2 includes other elements necessary as a camera main unit such as a display control unit, a display unit, and an operation section, but these are omitted from the illustration in order to avoid complication of drawings while still clearly illustrating correspondences between FIGS. 14, 15, and 16.

The camera head unit 3 includes an image sensor 300, a lens system driving unit 301, and the assignable button 302. The camera head unit 3 also includes other constitution elements but these are omitted from the illustration for the similar reason.

The image sensor 300 includes an image capturing element including optical-electric conversion pixels such as Charge Coupled Devices (CCDs) and Complementary Metal Oxide Semiconductors (CMOSs), arranged in matrix. By an optical system (not illustrated), light from an object is focused on the image sensor 300.

Here, the optical system may be, for example, a lens such as a cover lens, a zoom lens, and a focus lens, a focusing mechanism, and an optical filter. These can be provided inside the camera head unit 3, in the adaptor 500, and/or the interchangeable lens 502 or 503.

The image sensor 300 is configured to perform, for example, Correlated Double Sampling (CDS), Automatic Gain Control (AGC), and/or the like to an electric signal obtained by the optical-electric conversion performed by the image capturing element, and further to perform Analog/Digital (A/D) conversion process. After that, the image sensor 300 outputs a captured-image image signal to the main unit 2 side in a form of digital data. The image sensor 300 outputs, for example, an image signal as so-called RAW data.

The lens system driving unit 301 is configured to drive, under control by the control unit 200, the focusing lens, the zoom lens, the focusing mechanism, the optical filter mechanism, and the like of the optical system.

The signal processing unit 202 of the main unit 2 is constituted as an image processing processor by, for example, a digital signal processor (DSP) or the like. The signal processing unit 202 is configured to perform various signal process to the captured-image image signal from the image sensor 300.

For example, the signal processing unit 202 is configured to perform a clamp processing for clamping black levels of R, G, and B to predetermined levels, a correcting process between color channels of R, G, and B, a demosaic process for causing image data of each pixel to have all color components of R, G, and B, a process for generating (separating) a luminance (Y) signal and a color (C) signal, and other process.

Furthermore, the signal processing unit 202 is configured to perform a resolution conversion process necessary for the image data that has been subjected to the various signal processes, for example, resolution conversion for recording, communication output, or monitor imaging. Moreover, the signal processing unit 202 is configured to perform, for example, compressing process for recording or communication, encoding process, and/or the like to the image data subjected to the resolution conversion.

It should be noted that the signal processing unit 202 is configured to perform a process for generating a monitor image signal for captured-image monitor display (through-to-lens display), and supply the monitor image signal to the video output terminal 14a. With this configuration, the monitor image can be viewed by connecting an external monitor device to the video output terminal 14a.

The control unit 200 includes a microcomputer (computing device) including a central processing unit (CPU), a read only memory (ROM), a random access memory (RAM), a flash memory, and the like.

The CPU is configured to execute programs stored in the ROM, the flash memory, or the like, thereby integrally controlling the whole image capturing device 1.

The RAM is used to temporally store data, programs, and/or the like as a working area for various data processing performed by the CPU.

The ROM and the flash memory (non-volatile memory) are used for storing an operation system (OS) for the CPU controlling the units and sections, and content files such as image files, as well as application programs for various operations, firmware, and the like.

Such a control unit 200 is configured to control operation of each unit and section necessary for parameter control of various signal processing performed by the signal processing unit 202, operations performed according to user's operation such as image capturing operation, recording operation, reproduction operation of an image fail recorded, image-capturing operation of the image sensor 300, cameral operation as such zooming, focusing, and user interface operation, and the like.

For this control, the control unit 200 transmits a control signal to the image sensor 300 and the lens system driving unit 301. For example, the control unit 200 transmits a control signal for a shutter speed, a frame rate, and the like for the image sensor 300, a clock signal, or a control signal for the lens system driving unit 301 to the camera head unit 3 side.

The recording unit 203 includes, for example, a non-volatile memory and functions as a storage area for storing image files (content files) such as still image data and video image data, attribute information of the image files, thumb nail images, and the like.

The recording unit 203 may be embodied in various ways. For example, the recording unit 203 may be a flash memory provided in the main unit 2, may be constituted by a memory card (for example, a portable flash memory) detachably attachable to the main unit 2 and a card recording and reproducing unit configured to reading and reproduction access to the memory card. Moreover, the recording unit 203 is embodied as a hard disk drive (HDD) or the like provided in the main unit 2 in some cases.

The communication unit 204 is configured to perform data communication or network communication with an external device in a wired or wireless manner.

For example, the communication unit 204 is configured to perform communication of a captured-image image data (still image file or video image file) with an external display device, a storage device, a reproduction device, or the like. Moreover, the communication unit 204 may be, as a network communication unit configured to, for example, perform communication via a network of various kinds such as the Internet, a home network, and a local area network (LAN), thereby performing various data transmission and reception with a server and a terminal on the network.

The power supply circuit 205 is configured to generate a necessary power supply voltage V0 and supply the power supply voltage V0 to each unit and section in the main unit 2, using for example, a battery 501 as a power source.

Moreover, the power supply circuit 205 is also configured to generate a power supply voltage V1 to be supplied to the camera head unit 3 side, and supply the power supply voltage V1 to the camera head unit 3.

The control unit 200 controls the power supply circuit 205 as to whether to supply the power supply voltage.

Operation information of the assignable button 302 provided on the camera head unit 3 is detected by the control unit 200 via the connectors 3a and 2a.

In response to the detection of the operation of the assignable button 302, the control unit 200 controls the operation assigned to the assignable button 302. For example, the control unit 200 controls start of recording.

In the basic state illustrated in FIG. 14, each of the units and sections operate cooperatively in the main unit 2 and the camera head unit 3 so as to perform image-capturing, recording, communication, and the like of a video image or a still image.

It should be noted that, terminals PS6 and PS5 indicate determining terminals of the connectors 3a and 2a, respectively, and the control unit 200 determines the connection state on the basis of a voltage state at the terminal 2a.

Next, referring to FIG. 15, a configuration of the extension cable 20 will be described.

Figure 15:
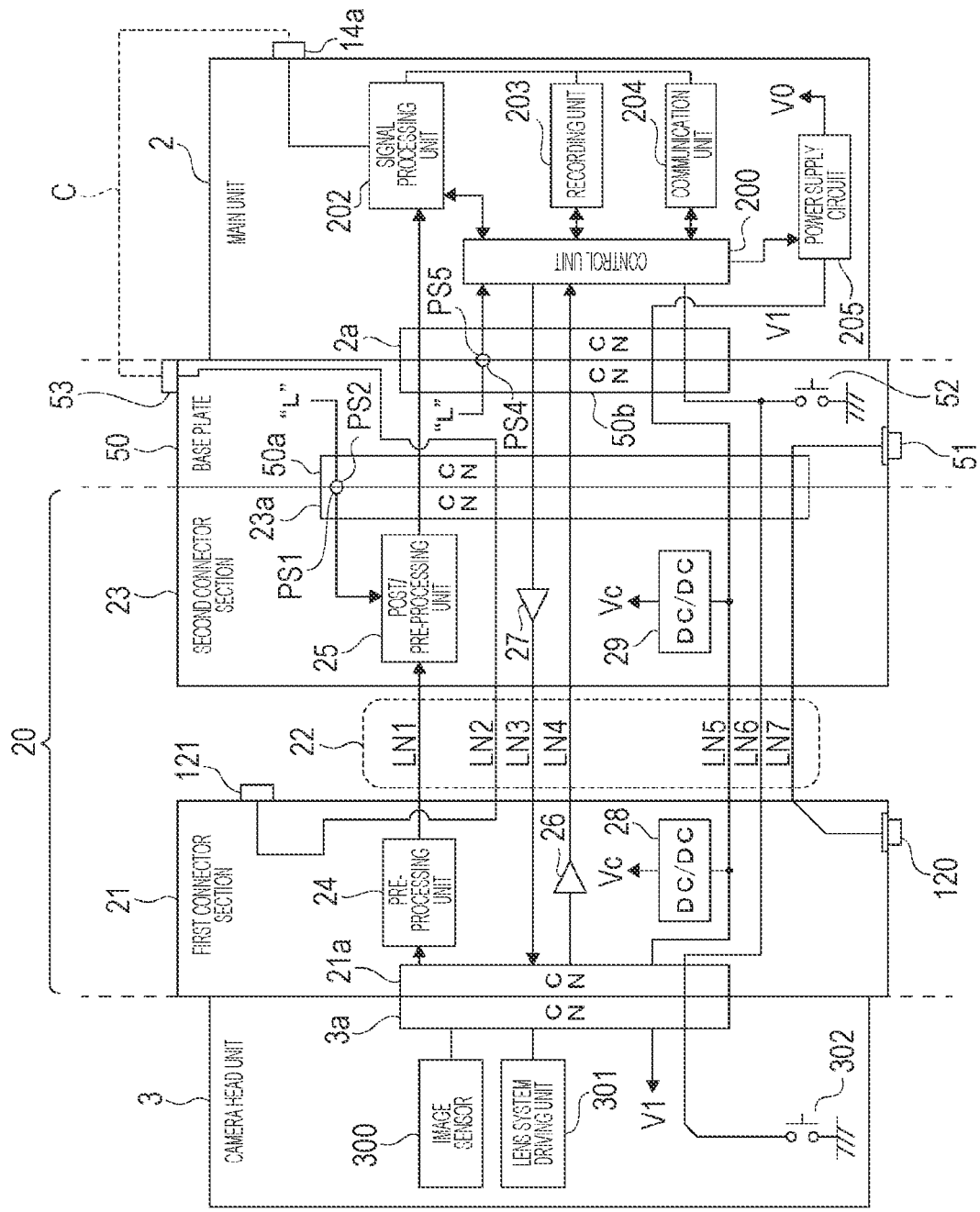
FIG. 15 is an explanatory view illustrating a connection structure in the extension state according to the embodiment.

FIG. 15 illustrates a state in which the main unit 2, the base plate 50, the extension cable 20, and the camera head unit 3 are connected, as the extension state.

In this configuration, as transmission paths for the signal transmission between the main unit 2 side and the camera head unit 3 side, lines LN (LN1 to LN7) are provided.

Even though not illustrated in FIG. 14, each of the following lines LN (except the video signal line LN2) is provided also in the basic state illustrated in FIG. 14.

The transmission paths LN1 to LN7 each is not necessarily one transmission path, but is illustrated integrally in terms of functions and only typical transmission paths are illustrated. In practice, much more lines LN are provided, including lines LN8 and LN9 described later.

Each line LN is as follows.

LN1: image signal line

The image signal line LN1 is a line for transmitting an image signal from the image sensor 300 to the main unit 2.

LN2: image signal line

The image signal line LN2 is a line for connecting the video input terminal 53 of the base plate 50 and the video output terminal 121 of the first connector section 21, and is a line for transmitting, for example, the monitor image signal.

It should be noted that, in the state illustrated in FIG. 14, the image signal line LN2 is not provided. For this reason, the wiring is formed by using pins (terminals) of the connectors 50a and 23a corresponding to empty pins of the connectors 2a and 3a, so that a video signal line LN2 is provided inside the extension cable 20, for example. Needless to say, the number of pins of the connectors 50a and 23a may be greater than the number of pins of the connectors 2a and 3a, and in such a case, additional pins may be provided.

LN3: control line

The control line LN3 is representative of a plurality of signal line paths used for transmission of the control signal from the control unit 200 to the camera head unit 3 and the clock signal.

LN4: control line

The control line LN4 is representative of a plurality of signal line paths used for signal transmission from the camera head unit 3 to the control unit 200. For example, the control line LN4 is used for transmission of a state detection signal, response signal to the control signal, or the like from the camera head unit 3.

LN5: power supply line

The power supply line LN5 is a line for supplying, to the camera head unit 3 side, the power supply voltage V1 generated by the power supply circuit 205 of the main unit 2.

LN6: assignable button line

The assignable button line LN6 is a line for connecting the assignable buttons 302 and 52 as a wired-or configuration, and enabling the control unit 200 to detect an operation made to the assignable buttons 302 and 52.

LN7: external power supply line

The external power supply line LN7 is a line for connecting the external power supply input terminal 51 of the base plate 50 and the external power supply output terminal 120 of the first connector section 21.

It should be noted that, even though not illustrated for the sake of avoiding complication of the illustration, a ground line is also provided. With this configuration, a common ground is provided for the main unit 2, the base plate 50, the extension cable 20, the additional extension cable 30, and the camera head unit 3.

The extension cable 20 including these lines LN as above includes a pre-processing unit 24, a buffer amplifier 26, and a DC/DC converter 28 in the first connector section 21.

Moreover, in the second connector section 23, a post/pre-processing unit 25, a buffer amplifier 27 and a DC/DC converter 29 are provided.

The pre-processing unit 24 is provided for the image signal line LN1 and is configured to perform amplification process (pre-emphasis process) to the image signal (RAW image data) outputted from the image sensor 300. The pre-emphasis process is a process for boosting the image signal in advance to compensate fading corresponding to signal fading expected in the transmission through the extension cable 20 of 3 m.

The post/pre-processing unit 25 is also provided for the image signal line LN1. The post/pre-processing unit 25 is capable of performing signal compensation process as waveform shaping and an amplification process (pre-emphasis process) similar to that of the pre-processing unit 24.

The waveform shaping (signal compensation) herein is an equalizing process for compensating frequency characteristics changed (deteriorated) as a result of the transmission through the extension cable 20 of 3 m.

The buffer amplifier 27 is provided for the control line LN3, and is configured to perform an amplification process to a signal that should be amplified, among the various control signals and the clock signal transmitted from the control unit 200.

The buffer amplifier 26 is provided for the control line LN4, and is configured to perform an amplification process to a signal that should be amplified, among the various control signals transmitted from the camera head unit 3.

The amplification processes performed by the buffer amplifiers 26 and 27 are also countermeasures for the fading that would occur during the cable transmission through the extension cable 20.

The DC/DC converter 28 is configured to receive a direct current voltage V1, which is supplied to the power supply line LN5, from the power supply circuit 205 and perform voltage conversion to the direct current voltage V1, to thereby generate a power supply voltage Vc necessary in the first connector section 21, and supply the power supply voltage Vc to the pre-processing unit 24 and the buffer amplifier 26.

The DC/DC converter 29 is also configured to receive a direct current voltage V1, which is supplied to the power supply line LN5, from the power supply circuit 205 and perform voltage conversion to the direct current voltage V1, to thereby generate a power supply voltage Vc necessary in the second connector section 23, and supply the power supply voltage Vc to the post/pre-processing unit 25 and the buffer amplifier 27.

It should be noted that a terminal PS1 is a determining terminal of the connector 23a, and a terminal PS2 is a determining terminal of the connector 50a, and are configured to joint with each other. Moreover, a terminal PS4 is a determining terminal of the connector 50a and is configured to joint with a terminal PS5 of the connector 2a. This configuration will be described later.

Next, referring to FIG. 16, a configuration of the additional extension cable 30 will be described.

Figure 16:
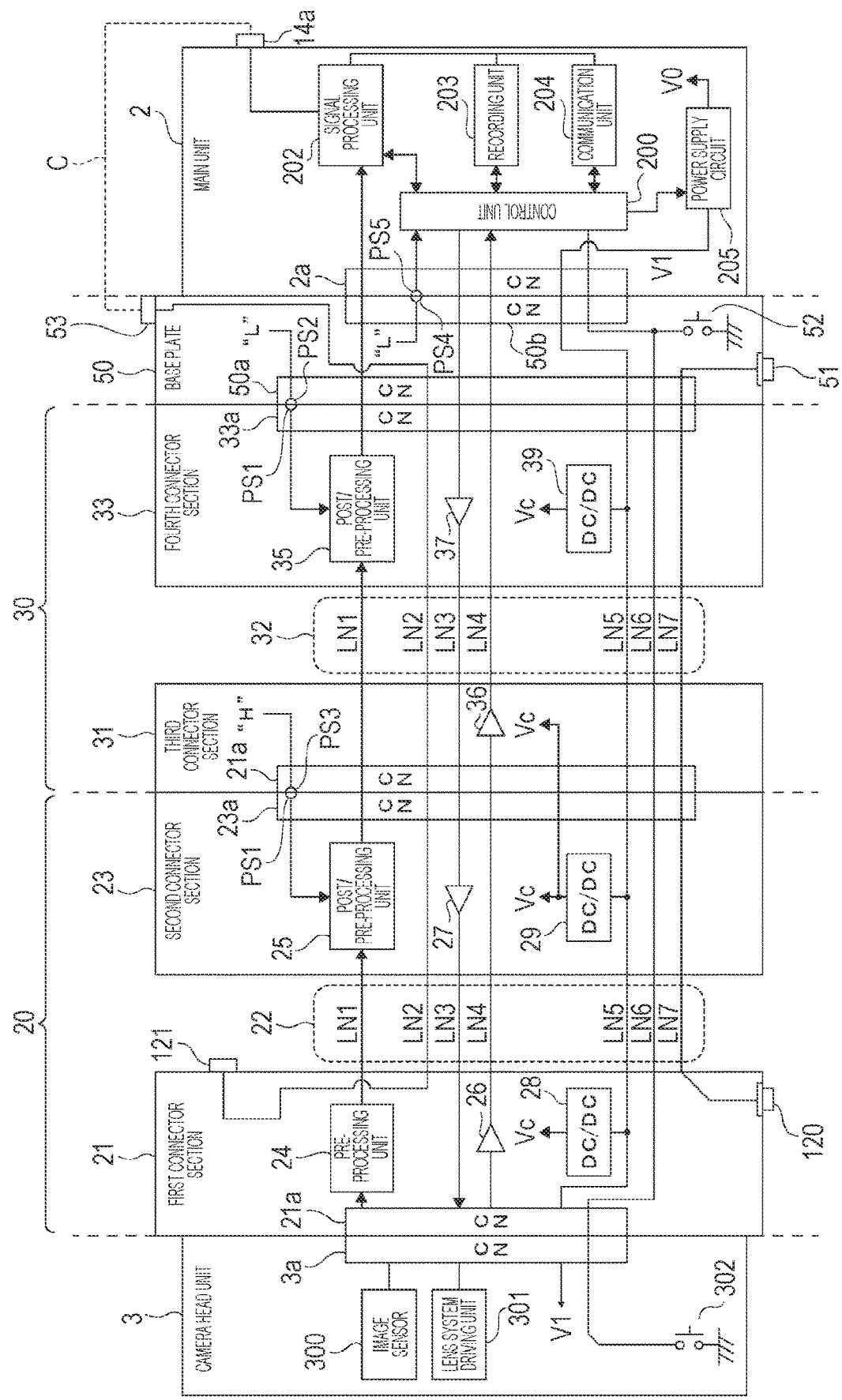
FIG. 16 is an explanatory view illustrating the connection structure in the additional extension state according to the embodiment.

FIG. 16 illustrates a state in which the main unit 2, the base plate 50, the additional extension cable 30, the extension cable 20, and the camera head unit 3 are connected, as the additional extension state.

Again, in this case, lines LN (LN1 to LN7) are provided as communication paths, similarly to the configuration illustrated in FIG. 15.

The additional extension cable 30 includes a buffer amplifier 36 inside the third connector section 31.

Moreover, in the fourth connector section 33, a post/pre-processing unit 35, a buffer amplifier 37 and a DC/DC converter 39 are provided.

The post/pre-processing unit 35 is a circuit similar to the post/pre-processing unit 25 of the extension cable 20.

The buffer amplifier 37 is provided for the control line LN3, and is configured to perform amplification process to a signal that should be amplified, among the various control signals and the clock signal transmitted from the control unit 200.

The buffer amplifier 36 is provided for the control line LN4, and is configured to perform amplification process to a signal that should be amplified, among the various control signals transmitted from the camera head unit 3.

The amplification processes performed by the buffer amplifiers 36 and 37 are also countermeasures for the fading that would occur during the cable transmission through the additional extension cable 30.

The DC/DC converter 39 is configured to receive a direct current voltage V1, which is supplied to the power supply line LN5, from the power supply circuit 205 and perform voltage conversion to the direct current voltage V1, to thereby generate a power supply voltage Vc necessary in the fourth connector section 33, and supply the power supply voltage Vc to the post/pre-processing unit 35 and the buffer amplifier 37.

In this example, the third connector section 31 does not include a DC/DC convertor, but is configured to receive the power supply voltage Vc for the buffer amplifier 36 from the DC/DC converter 29 of the second connector section 23 to be connected. That is, via certain terminals of the connectors 23a and 21a, the power supply voltage Vc from the DC/DC converter 29 of the second connector section 23 is supplied to the third connector section 31. However, it is also conceivable to configure such that the third connector section 31 also includes a DC/DC converter.

Here, it is described above that the fourth connector section 33 of the additional extension cable 30 has a shape similar to that of the second connector section 23 of the extension cable 20. As illustrated in FIG. 16, the fourth connector section 33 of the additional extension cable 30 has an internal circuit configuration similar to that of the second connector section 23 of the extension cable 20 as well. This means that the second connector section 23 and the fourth connector section 33 may be manufactured as identical parts for the sake of attaining effective manufacturing.

It should be noted that the terminal PS3 of the third connector section 33 is a determining terminal of the connector 31*a*, and is configured to joint with the terminal PS1 of the connector 23*a*. Moreover, the terminal PS1 of the connector 33*a* of the fourth connector section 33 is a terminal identical with the terminal PS1 of the connector 23*a* of the second connector section 23 having a same configuration. These will be described later.

It can be understood from FIGS. 15 and 16 as described above, the lines LN are provided either in the extension state or the additional extension state, in order to enable necessary signal transmission between the main unit 2 and the camera head unit 3.

That is, the image signal line LN1 transmits the image signal obtained by the image sensor 300 to the main unit 2. The extension state and the additional extension state result in a transmission path length such as 3 m or 6 m, and because of this, the signal becomes weaker. With this configuration in which such a weaker signal is amplified and transmitted by the pre-processing unit 24 or the post/pre-processing unit 25, it is possible to perform appropriate signal transmission.

The image signal line LN2 enables transmission of the monitor image signal. That is, the video output terminal 14*a* of the main unit 2 is connected with the video input terminal 53 of the base plate 50 via a cable C (see FIG. 8). Moreover, a monitor device is connected to the video output terminal 121 of the first connector section 21. This makes it possible to transmit to the monitor device a monitor image signal generated by the signal processing unit 202, so that the user at the camera head unit 3 side can view a through-to-lens image on the monitor device.

It should be noted that the image signal line LN2 is not limited to the transmission of the monitor image signal and may be used for various image signal transmissions. That is, the image signal line LN2 is a line capable of transmitting an image signal inputted in the video input terminal 53 to the camera head unit 3 side.

The control lines LN3 and LN4 are for performing transmission of the clock signal and the control signal between the control unit 200 and the camera head unit 3. In this case, appropriate signal amplification is performed by the buffer amplifiers 26, 27, 36, and 37, so that the transmission signal is received appropriately at the destination.

Therefore, even in the state in which the camera head unit 3 is detached from the main unit 2, the operation of the camera head unit 3 can be controlled by the control unit 200 as in the case of the basic state illustrated in FIG. 14.

Furthermore, this eliminates the need of additionally providing a control device such as CPU to the camera head unit 3, thereby facilitating simplification of the structure and avoidance of a cost increase.

The assignable button line LN6 is connected with the control unit 200 with the assignable buttons 302 and 52 in wired-or connection, as illustrated in FIGS. 15 and 16.

The assignable buttons 302 and 52 include a switch for turning on and off the connection between the assignable button line LN6 and the ground as illustrated.

With this configuration, it becomes possible for the control unit 200 to detect an operation of either the assignable button 302 or 52 when a connection terminal of the assignable button line LN6 becomes a ground level.

Therefore, the operation assigned to the assignable button 302 of the camera head unit 3 can become available for the user on the main unit 2 side via the assignable button 52 in the extension state or the additional extension state.

The power supply line LN5 enables the supply of the power supply voltage V1 from the power supply circuit 205 to the camera head unit 3, the extension cable 20, and the additional extension cable 30.

With this configuration, it becomes unnecessary for the camera head unit 3, the extension cable 20, and the additional extension cable 30 to be provided with a battery or the like individually.

Moreover, with the configuration in which the power source line LN5 is provided in the extension cable 20 and the additional extension cable 30, it becomes unnecessary to additionally have a cable for power supply, thereby making it possible to attain a simple cable configuration. That is, it is not necessary to use a plurality of cables.

The external power supply line LN7 enables the supply of the external power supply voltage from the main unit 2 side (base plate 50) to the camera head unit 3 side (the first connector section 21).

With this configuration, it become unnecessary to configure such that the camera head unit 3 is provided with an external power supply individually so as to receive power supply.

Moreover, with the configuration in which the power source line LN7 is provided in the extension cable 20 and the additional extension cable 30, it becomes unnecessary to additionally have a cable for external power supply, thereby making it possible to attain a simple cable configuration. That is, it is not necessary to use a plurality of cables, neither.

Needless to say, the power supply voltage supplied via the external power supply line LN7 may be used for any device. For example, apart from a device relating to an image-capturing operation, the power supply voltage may be a power supply for an illuminating device, a communication device, an image editing device, an information processing device, a cooling device, a fan, a heating device, or the like device.

The example described above is configured such that, in the extension state or the additional extension state, the base plate 50 is attached to the main unit 2, so that the extension cable 20 or the additional extension cable 30 can be connected to the main unit 2 via the base plate 50.

Thus, the base plate 50 has the following functions.

The base plate 50 makes it possible to connect the extension cable 20 (or the additional extension cable 30) to the main unit 2 having a structure not connectable with the extension cable 20, thereby making it possible to use the camera head unit 3 with extension.

The base plate 50 provides the connectors 50*a* and 50*b* for interfacing, thereby causing the connector 2*a* of the main unit 2 to be compatible with the connectors 23*a* or 33*a* for the extension cable 20 or the additional extension cable 30.

When the camera head unit 3 is detached from the main unit 2, a front side of the main unit 2 is exposed. The base plate 50 covers the exposed portion, thereby maintaining good appearance of the device while protecting an internal mechanism of the main unit 2 and attaining a duct contamination preventing effect.

The base plate 50 makes it possible to provide the assignable button 52 suitable for the case where the camera head unit 3 detached is used.

The base plate 50 makes it possible to provide the external power supply input terminal 51 for supplying external power suitable for the case where the camera head unit 3 detached is used.

The base plate 50 makes it possible to provide the video input terminal 53 for transmission of the monitor image signal suitable for the case where the camera head unit 3 detached is used.

With the configuration in which the base plate 50 is provided, it becomes possible to realize or provide the functional constituents suitable for the use in the extension state or additional extension state, without providing the functional constituents in the main unit 2.

<6. Amplification Process and Signal Compensation Process>

Here, the pre-processing unit 24 and the post/pre-processing units 25 and 35 will be described.

Figure 17A:
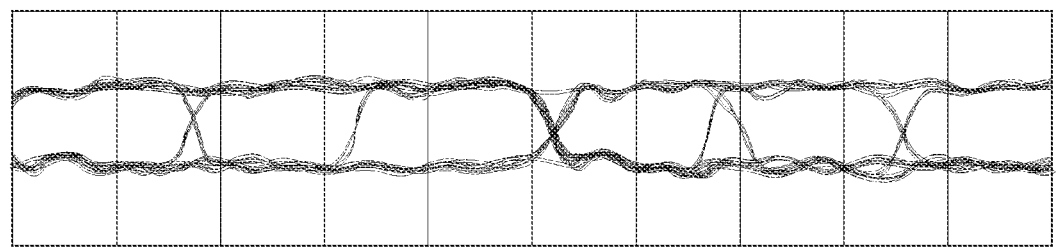
FIGS. 17A and 17B are an explanatory view illustrating a pre-emphasis process according to the embodiment.

As described above, the pre-processing unit 24 is configured to perform the pre-emphasis in consideration of the facing of the image signal during the transmission through the cable 22 of about 3 m in length, for example. FIG. 17A illustrates an image signal waveform. The image signal from the image sensor 300 is RAW image data in the form of digital data, for example. This RAW image data is transmitted after demodulated with a carrier. FIG. 17A illustrates the image signal waveform by an eye pattern of this signal.

Figure 17B:
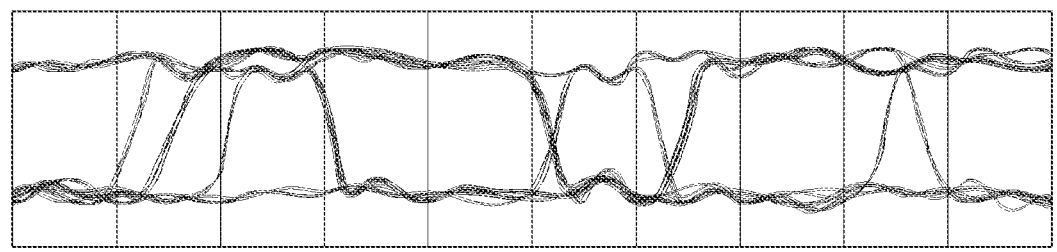

In a case where an image signal as illustrated in FIG. 17A is supplied from the camera head unit 3 to the first connector section 21, the pre-processing unit 24 performs signal amplification thereto as illustrated in FIG. 17B. For example, the pre-processing unit 24 amplifies a waveform amplitude such as from 600 mVp-p to 1100 mVp-p.

With this configuration, a sufficient amplitude level can be attained on the second connector section 23 side even if the fading occurs through the cable transmission.

The post/pre-processing unit 25 is configured to transmit the image signal to the main unit 2 thereafter in the extension state, whereas the post/pre-processing unit 25 is configured to transmit the image signal to the additional extension cable 30 thereafter in the additional extension state.

In the case where the image signal is transmitted to the additional extension cable 30, fading through the cable of about 3 m should be further taken into consideration.

Therefore, the post/pre-processing unit 25 is configured to switch over, between the extension state and the additional extension state, processes that the post/pre-processing unit 25 performs to the image signal.

Figure 18:
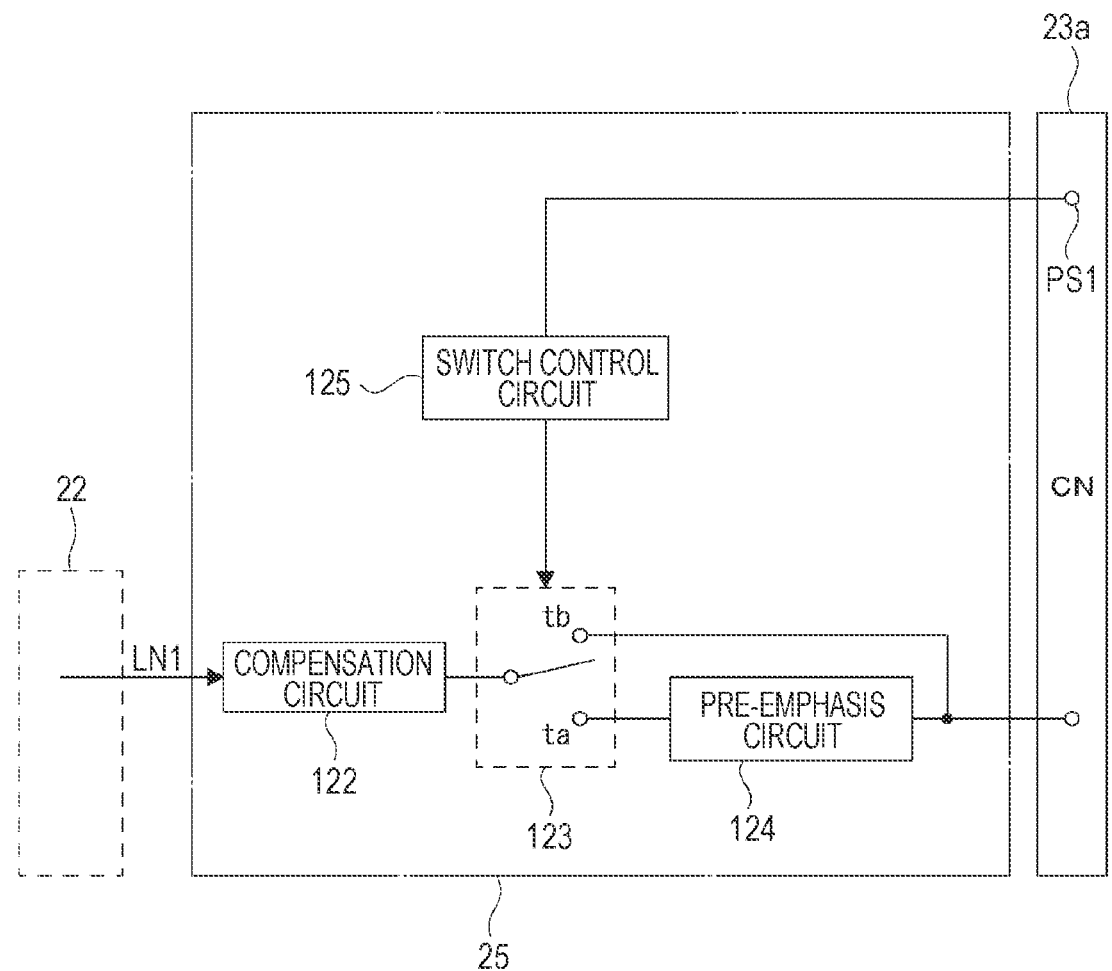
FIG. 18 is a block diagram illustrating a post/pre-processing unit according to the embodiment.

The post/pre-processing unit 25 is configured as illustrated in FIG. 18, for example.

For example, the post/pre-processing unit 25 includes a compensation circuit 122, a switch 123, a pre-emphasis circuit 124, and a switch control circuit 125.

The compensation circuit 122 is a circuit configured to perform compensation process to the image signal deteriorated through the cable transmission, and may be a circuit (equalizer) configured to perform a compensation process for frequency characteristics, for example.

The compensation circuit 122 performs the compensation process to the image signal transmitted via the image signal line LN1 thereto and supplies the image signal to the switch 123.

The switch 123 is a switch configured to switch over the terminals ta and tb, where the terminal ta is connected with the pre-emphasis circuit 124 and the terminal tb is connected to a path bypassing the pre-emphasis circuit 124.

In the extension state in which the connector 23a is connected with the connector 50a of the base plate 50, the terminal tb of the switch 123 is connected, so that the image signal thus subjected to the compensation process is directly outputted from the connector section 23a to the base plate 50 side (the main unit 2 side) as such.

On the other hand, in the additional extension state in which the connector 23a is connected to the connector 31a of the additional extension cable 30, the terminal ta of the switch 123 is connected, so that the image signal thus subjected to the compensation process is further subjected to the pre-emphasis process by the pre-emphasis circuit 124 and outputted from the connector 23a to the additional extension cable 30.

That is, it is configured such that the process by the pre-emphasis circuit 124 is carried out in a case where it is necessary to take a countermeasure to the fading due to the additional extension cable 30.

In order to carry out such switching-over of the processing, the switch control circuit 125 switches over the switch 123.

The switch control circuit 125 is configured to control which terminal of the switch 123 is to be connected, referring to a voltage state of the determining terminal PS1 of the connector 23a.

As illustrated in FIG. 15, in the extension state, the determining terminal PS1 of the connector 23a joints with the determining terminal PS2 of the connector 50a of the base plate 50. The determining terminal PS2 is constantly supplied with a voltage of an "L" level via the wiring in the base plate 50 (for example, the determining terminal PS2 is connected to the ground).

Moreover, as illustrated in FIG. 16, in the additional extension state, the determining terminal PS1 of the connector 23a joints with determining terminal PS3 of the connector 31a of the third connector section 31 of the additional extension cable 30. The determining terminal PS3 is constantly supplied with a voltage of an "H" level via the wiring in the third connector section 31 (for example, the determining terminal PS3 is connected to a predetermined voltage line).

Therefore, the switch control circuit 125 of the post/pre-processing unit 25 is configured to connect the terminal tb of the switch 123 if the terminal voltage of the determining terminal PS1 is "L," and to connect the terminal to of the switch 123 if the terminal voltage of the determining terminal PS1 is "H."

Such a configuration can be realized with a simple hardware circuit, a logic circuit, or the like.

It should be noted that the logic of "H" and "L" is merely an example, and the "H" and "L" can be assigned vice versa, as a matter of course.

Here, it has been described above that the fourth connector section 33 may be a part identical with the second connector section 23. This means that the fourth connector section 33 includes a post/pre-processing unit 35 as well in this case (see FIG. 16).

In this case, the switch control circuit 125 of the post/pre-processing unit 35 switches over a switch 123 according to a voltage state of a determining terminal PS1 of the connector 33a (a terminal identical with the determining terminal PS1 of the connector 23a).

When to use the additional extension cable 30 is the additional extension state, in which the fourth connector section 33 is connected with the base plate 50. In this case, because the determining terminal PS2 connected with the determining terminal PS1 is supplied with the L level, the switch control circuit 125 connects the terminal tb of the switch 123, so that the image signal is outputted from the connector 33a, bypassing the pre-emphasis circuit.

That is, even if the fourth connector section 33 of the additional extension cable 30 is a part identical with the second connector section 23, the operation can be carried out without problems.

Moreover, because the second connector section 23 and the fourth connector section 33 are configured to perform the switching-over of the signal process as above a control device such as a CPU for performing control suitable for the connection determination, for example, does not need to be provided and therefore, the second connector section 23 and the fourth connector section 33 can be realized as a low-cost structure with a very simple circuit configuration.

Moreover, one idea is such that if a pre-processing unit (pre-emphasis circuit) is additionally provided in the third connector section 31 in the state as illustrated in FIG. 16, the second connector section 23 only need to include only a post-processing unit (compensation circuit), and in such a case, the switching-over as above would not be required.

However, the configuration in which the second connector section 23 includes the pre-emphasis circuit 124 as well has some advantages. At the connection boundary between the second connector section 23 and the third connector section 31, the terminal connection between the connectors 23a and 31a is made. However, this connector connection portion causes a relatively large signal fading. Especially, in the case of B-to-B connectors, the signal fading at the boundary is large. Further, in the case of the additional extension state, there are more connector connection portions, and therefore the additional extension state would be disadvantageous in terms of signal fading in this regard.

For this reason, before the connection point between the connectors 23a and 31a, the amplification is carried out with the pre-emphasis circuit 124 in consideration of the increase of the signal fading caused due to the increase of the connection points. With this configuration, even in the additional extension state with more connector connection points, the signal fading of the image signal finally supplied to the main unit 2 can be reduced as low as possible. For this reason, such a configuration is more desirable that the post/pre-processing unit 25 is provided and the signal process is switched over depending on the connection state.

Note that, it is also one idea that a pre-emphasis circuit (pre-processing unit) is provided further in the third connector section 31 in addition to providing the post/pre-processing unit 25 as illustrated in FIG. 16. In this case, it is expected that more optimized amplification effect can be obtained.

It should be noted that the configuration of the post/pre-processing unit 25 as illustrated in FIG. 18 is not limited to the configuration in which the components are individually constituted as different hardware circuit units, and can be realized as a device functioning as a single signal processing processor. For example, the configuration of the post/pre-processing unit 25 can be realized by employing a device having the compensation processing function and the pre-emphasis processing function, which can be selectively performed.

<7. Clock Control>

The clock control by the control unit 200 will be explained.

As described above, the control unit 200, which transmits the control signal and the clock signal via the control line LN3, is configured to perform control to change a frequency of the clock signal depending on whether the state is in the basic state, the extension state, or the additional extension state.

This is because, the use of the extension cable 20 (or the extension cable 20 and the additional extension cable 30) extends the path length of the transmission path, thereby causing a greater signal delay, which would highly possibly result in failure of attaining appropriate data reception in a case where the frequency is high.

Figure 19A:
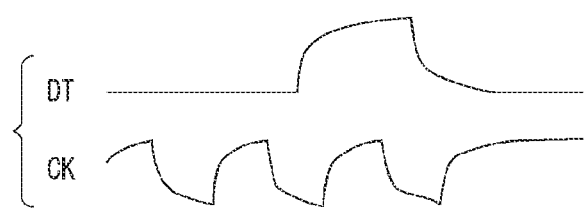
FIGS. 19A and 19B are an explanatory view illustrating clock control according to the embodiment.

FIG. 19A illustrates a waveform in a case where a clock signal transmitted, for example, in the extension state has a same frequency as in the basic state. In FIG. 19A, a waveform of a data signal DT as the control signal and a clock signal CK are illustrated.

In the extension or the additional extension state, the path length is significantly extended, for example, by 3 m or 6 m. Considering that the control lines LN3 and LN4 provide a two-way path, the transmission path thus formed in total is 6 m or 12 m.

The delay caused through such a long transmission path would possibly result in disturbing synchronicity between the data signal DT and the clock signal CK as illustrated, thereby making it impossible for the camera head unit 3 side to appropriately perform data decoding (decoding of the received control signal) or making it impossible for the control unit 200 side to accurately recognize the state of the camera head unit 3.

To address this problem, in the extension state and the additional extension state, the control unit 200 lowers the frequency of the clock signal CK to be transmitted.

Figure 19B:
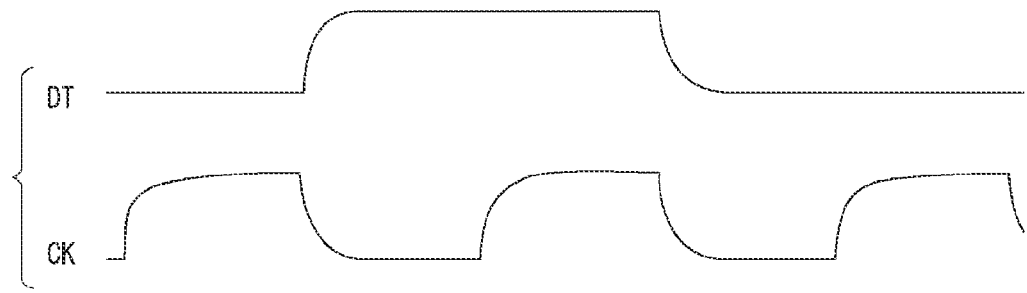

FIG. 19B illustrates a signal waveform in this case, illustrating that the synchronicity between the data signal DT and the clock signal CK is maintained, thereby, in this case, making it possible for the camera head unit 3 side to perform appropriate decoding of the control signal.

How much the frequency of the clock signal CK is lowered can be set in consideration of relationship between duration of the delay according to the length of the transmission path and the frequency.

Figure 20:
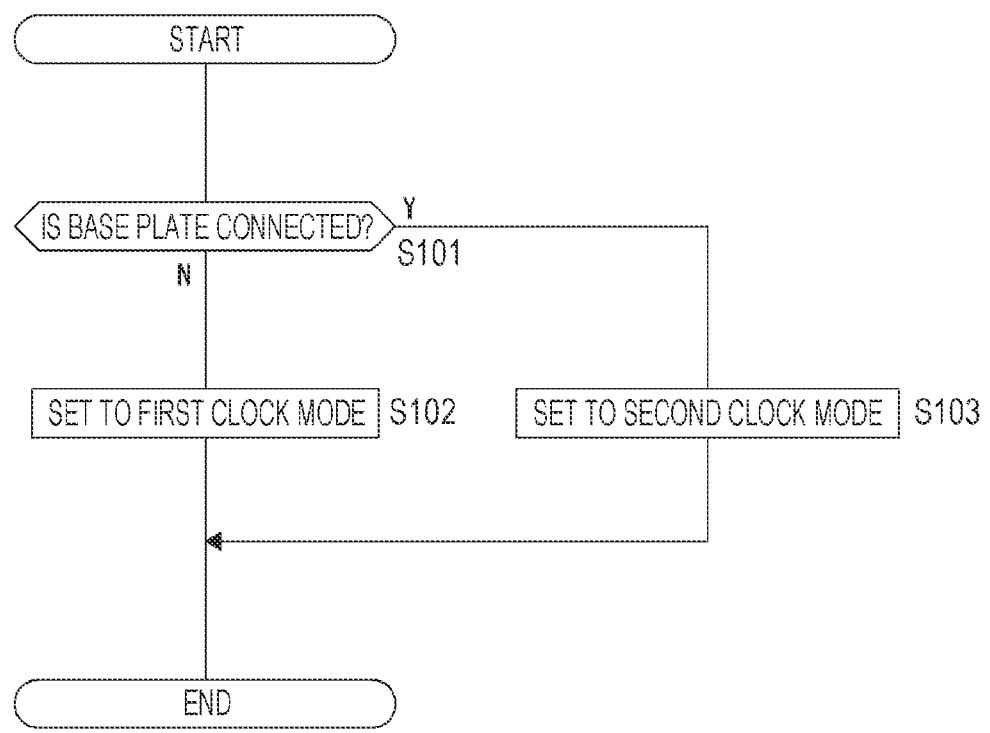
FIG. 20 is a flowchart of a clock control process according to the embodiment.

Thus, the control unit 200 performs a process as illustrated in FIG. 20.

At step S101, the control unit 200 determines whether or not the base plate 50 is connected at the moment.

Confirmation of the connection of the base plate 50 at step S101 may be carried out as below.

As illustrated in FIGS. 15 and 16, the determining terminal PS4 is used in the connector 50b of the base plate 50, and for example, a voltage of "L" level is applied on this determining terminal PS. For example, the determining terminal PS4 is connected to the ground.

The determining terminal PS4 joints with the determining terminal PS5 of the connector 2a of the main unit 2.

It should be noted that, terminals not used for the other signal transmission are used as the determining terminals PS4 and PS5.

The control unit 200 monitors a terminal state of the determining terminal PS5 of the connector 2a while the determining terminal PS5 is connected with a particular input port.

In a case where the base plate 50 is not connected, the terminal state is left open.

When the base plate 50 is connected, the terminal state is at the L level.

In this way, the control unit 200 can confirm whether or not the base plate 50 is connected.

If it is determined that the base plate 50 is not connected, the control unit 200 goes to step S102 in FIG. 20 where the control unit 200 sets the mode to the first clock mode.

That is, because it is determined that the connection state is in the basic state in which the camera head unit 3 is connected directly with the main unit 2, the control unit 200 sets the clock frequency to a high value.

On the other hand, if it is determined that the base plate 50 is connected, the control unit 200 goes to step S103, where the control unit 200 sets the mode to the second clock mode.

That is, because it is determined that the connection state is in the extension state or the additional extension state in which the camera head unit 3 is detached and the base plate 50 is attached, that is, the extension cable 20 (or the additional extension cable 30) is connected with the main unit 2, the control unit 200 sets the clock frequency to a lower value.

The control unit 200 performs, for example, the process as above, thereby switching over the clock frequency depending on whether the connection state is in the basic state or in the extension state (or the additional extension state).

In a case of the basic state, the control function is carried out with good responsiveness by using the high clock frequency. In a case of the extension state or the additional extension state, the lower clock frequency is used to realize a stable control operation despite of the long transmission path even though the responsiveness of the control function is deteriorated to some extent.

Moreover, this configuration makes it possible to realize appropriate operation without providing a control device such as microcomputer on the camera head unit 3 side.

It should be noted that the switching-over of the clock frequency can be carried out by the other manners.

For example, the switching-over of the clock frequency may be such that a high frequency is used for the basic state and the extension state and a lower frequency is used for the additional extension state.

Moreover, it can be so conceived that the frequency is switched over by three stages, so that a highest frequency is used for the basic state, a medium frequency is used for the extension state, and a lowest frequency is used for the additional extension state.

By the way, the configuration in which the camera head unit 3 side does not include a microcomputer or the like, and the operation of the camera head unit 3 side is controlled by the main unit 2 is preferable for tandem operation of a plurality of the image capturing devices 1.

For example, for three-dimensional (3D) image capturing, it is necessary to synchronize two image capturing devices 1 including their main units. Even if each of the image-capturing devices 1 is in the extension state (or the additional extension state), the control unit 200 of the main unit 2 of each of the image capturing devices 1 controls the overall image capturing device 1, so that synchronizing configurations of the control units 200 can be utilized as it is for the synchronization of the two image capturing devices 1.

That is, if a function for synchronizing the two image capturing devices 1 is available in the basic state, the operation can be synchronized similarly even when the two image-capturing devices 1 are in the extension state.

Therefore, the two image-capturing devices 1 with the camera head units 3 used with extension can be operated in synchronization as usual, which is very convenient for the 3D image-capturing or the like.

It should be noted that in a case where a plurality of image capturing devices 1 is operated in synchronization, the synchronization may be carried out in such a manner that a control signal or a clock signal from one of the image capturing devices 1 is received by the other one(s) of the image capturing devices 1 to synchronize the image capturing devices 1, or that the plurality of image-capturing devices 1 operates in synchronization according to a synchronization signal from a leader device.

<8. Power Supply Control in Connection State>

The image capturing device 1 according to the present embodiment is so configured that the extension state (3-m extension) and the additional extension state (6-m extension) are possible but further extension is prohibited.

That is, by using two additional extension cables 30, it becomes possible to attain such 9-m extension that the main unit 2, the base plate 50, the additional extension cable 30, the additional extension cable 30, the extension cable 20, and the camera head unit 3 are connected in this way. In this case, the power supply for activating the main unit 2 (camera system) cannot be turned on in the configuration.

This is because, if the transmission path length becomes excessively long, the deterioration of the transmission signal becomes significant, and this deterioration of the transmission signal and the clock frequency problem as described above would possibly make it difficult to attain stable operation.

Figure 21:
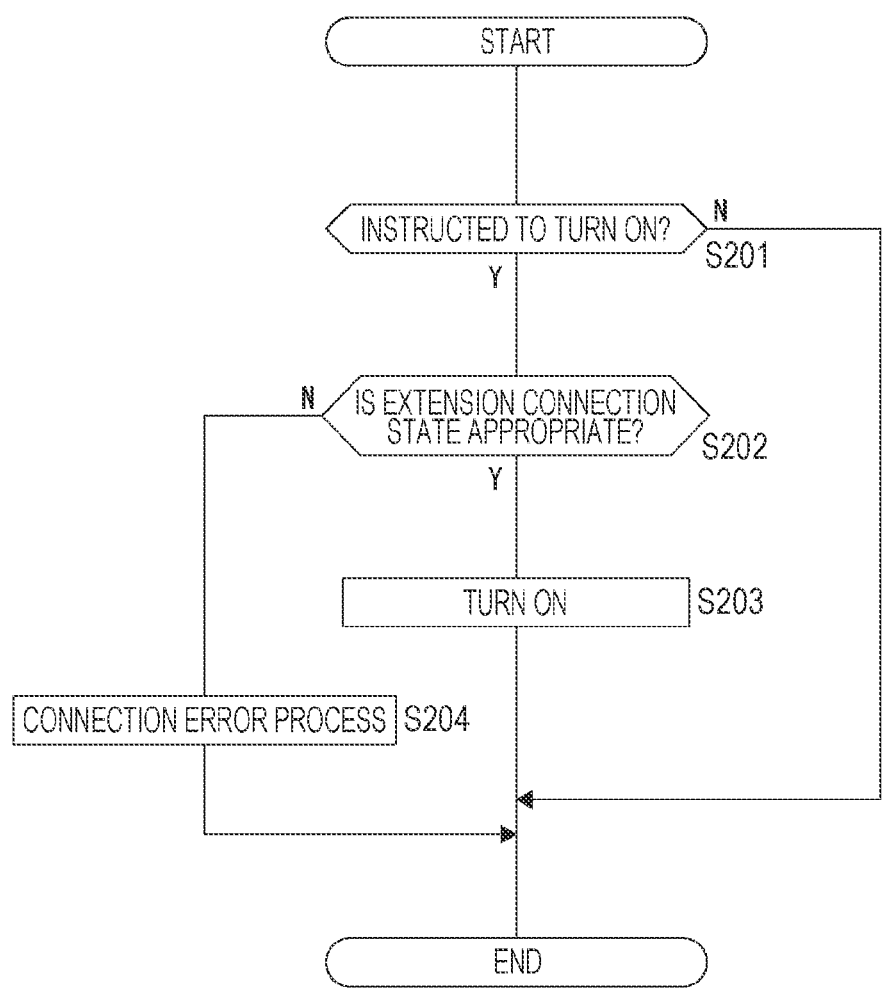
FIG. 21 is a flowchart of power supply control in the connection state according to the embodiment.

Therefore, the control unit 200 performs a process as illustrated in FIG. 21.

When detecting the operation of turning on the power supply, the control unit 200 proceeds the process from step S201 to step S202 and determines whether or not the extension connection state is appropriate. In this determination, the extension connection state is regarded as appropriate if extension connection state is either the basic state, the extension state, or the additional extension state with the single additional extension cable 30, and the extension connection state in which the extension connection length is longer than the above is regarded as not appropriate. How to make the determination will be described later.

In a case where it is determined that the extension connection state is appropriate, the control unit 200 goes to step S203 in which the control unit 200 performs the control for turning on the power supply. That is, the control unit 200 starts the power supply voltage supply performed by the power supply circuit 205.

On the other hand, in a case where it is determined that the extension connection state is not appropriate, the control unit 200 goes to step S204 in which the control unit 200 determines the state as a connection error, and will not perform the control for turning on the power supply. That is, even if the user performs the operation for turning on the power supply, the power supply will not be turned on.

It should be noted that in this case it may be more preferable to configure that the control unit 200 performs such a connection error process that notifies the user, by displaying, sound, or the like, that the connection state is inappropriate and therefore the power supply will not be turned on.

With this configuration, it becomes possible to prevent the use of the image capturing device 1 with, for example, 9-m extension or 12-m extension, thereby preventing defective operation caused due to such use.

Figure 22A:
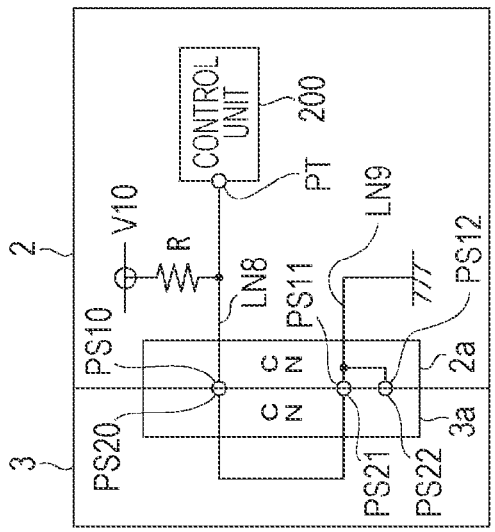
FIGS. 22A and 22B are an explanatory view illustrating power supply controls in the basic state and the extension state according to the embodiment.

A configuration at step S202 for determining whether or not the connection state is appropriate or not will be described, referring to FIGS. 22A, 22B, 23A and 23B. FIG. 22A illustrates the basic state of the main unit 2 and the camera head unit 3. For the connection state detection, the lines LN8 and LN9 are used. The line LN8 is a line formed via a terminal PS10 of the connector 2a and a terminal PS20 of the connector 3a. Moreover, in the connector 2a, a terminal PS20 and a terminal PS21 are electrically connected with each other. The terminal PS21 of the connector 3a joints with a terminal PS11 of the connector 2a. Furthermore, the line LN9 formed via the terminal PS21 and the terminal PS11 is a ground line. It should be noted that a terminal PS11 and a terminal PS12 are electrically connected with each other in the connector 2a. A terminal PS22 of the connector 3a corresponds to the terminal PS12 and is left open. Moreover, the line LN8 is connected with a line of voltage V10 via a resistor R. The control unit 200 causes the line LN8 to be connected with a certain port PT.

In the state illustrated in FIG. 22A, a ground loop is formed with the main unit 2 and the camera head unit 3 via the lines LN8 and LN9.

Accordingly, a voltage at the port PT of the control unit 200 is at the ground level.

Figure 22B:
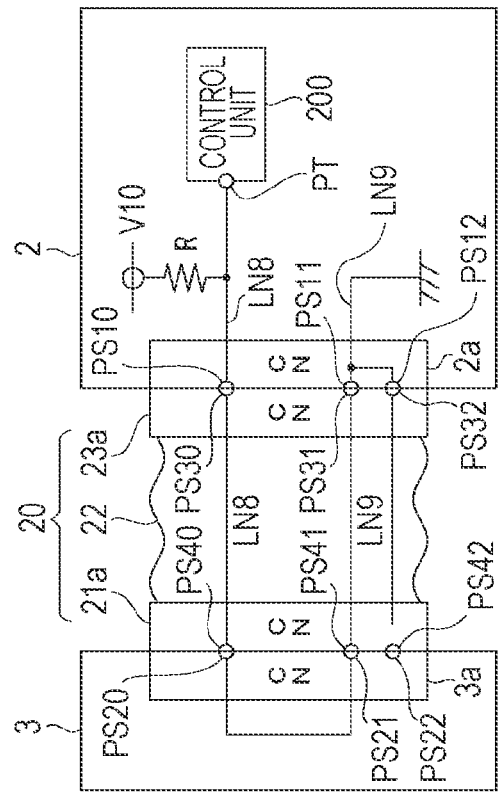

FIG. 22B illustrates the extension state attained by the main unit 2, the extension cable 20, and the camera head unit 3.

In this case, the line LN8 is formed via a terminal PS10 of the connector 2a, a terminal PS30 of the connector 23a, a terminal PS40 of the connector 21a, and a terminal PS20 of the connector 3a.

Further, the line LN9 is formed via a terminal PS21 of the connector 3a, a terminal PS41 of the connector 21a, a terminal PS31 of the connector 23a, and a terminal PS11 of the connector 2a.

Here, a terminal PS32 of the connector 23a of the extension cable 20, which is to joint with a terminal PS12 is left open. Moreover, a terminal PS42 of the connector 21a, which is to joint with the terminal PS22 is left open.

Again, in this state illustrated in FIG. 22B, a ground loop is formed via the lines LN8 and LN9, and accordingly the voltage at the port PT of the control unit 200 is at the ground level.

Figure 23A:
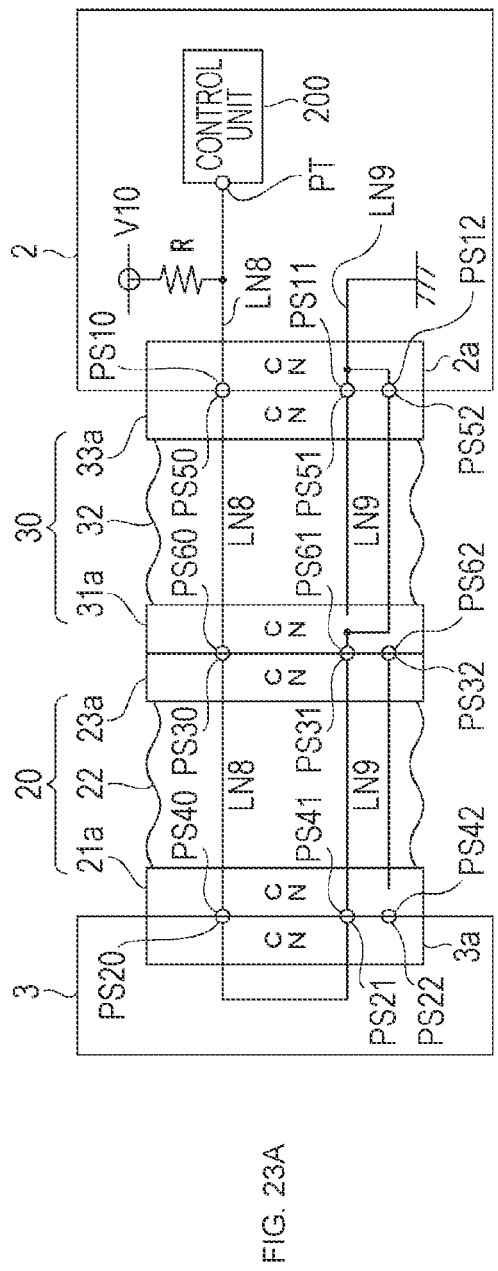
FIGS. 23A and 23B are an explanatory view illustrating power supply controls in the additional extension state and a prohibition state according to the embodiment.

FIG. 23A illustrates the additional extension state attained by the main unit 2, the additional extension cable 30, the extension cable 20, and the camera head unit 3.

In this case, the line LN8 is formed via a terminal PS10 of the connector 2a, a terminal PS50 of the connector 33, a terminal PS60 of the connector 31a, a terminal PS30 of the connector 23a, a terminal PS40 of the connector 21a, and a terminal PS20 of the connector 3a.

Here, in the additional extension cable 30, a terminal PS51, which is to joint with the terminal PS11, is left open, and a terminal PS52, which is to joint with the terminal PS12, is connected with a terminal PS61. The terminal PS61 joints with a terminal PS31. Moreover, a terminal PS62, which is to joint with the terminal PS32, is left open.

As a result, the line LN9 is formed via the terminal PS21, the terminal PS41, the terminal PS31, the terminal PS61, the terminal PS52, and the terminal PS12.

Again, even in this state illustrated in FIG. 23A, a ground loop is formed via the lines L8 and L9, and accordingly the voltage at the port PT of the control unit 200 is at the ground level.

Figure 23B:
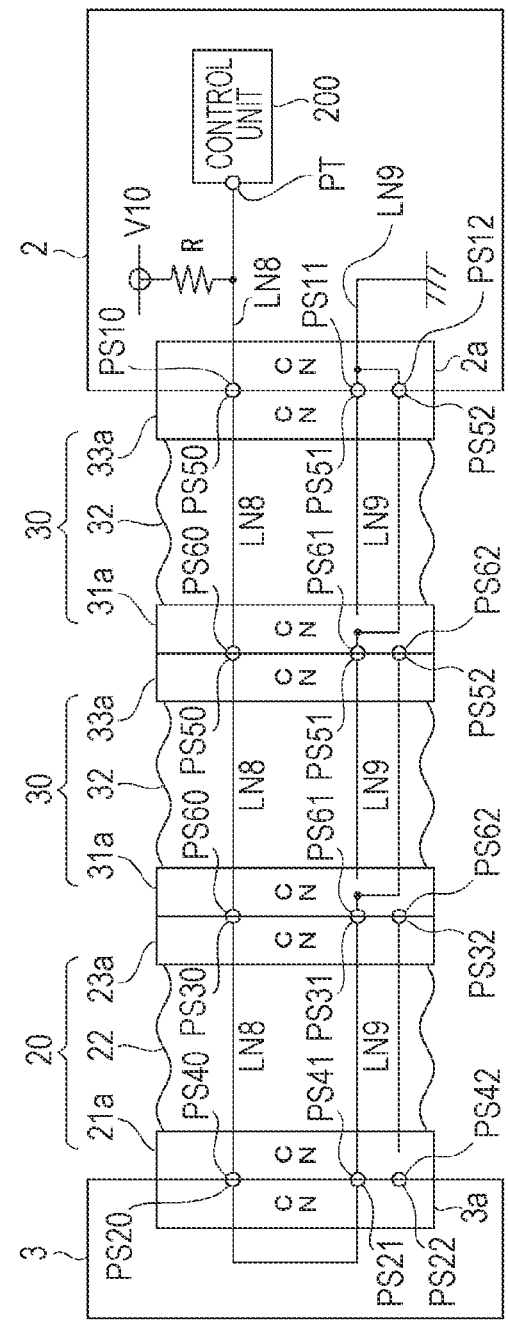

FIG. 23B illustrates a prohibited connection state in which two additional extension cables 30 are used.

In this case, the line LN8 is formed via the terminal PS10, the terminal PS50, the terminal PS60, the terminal PS50, the terminal PS60, the terminal PS30, the terminal PS40, and the terminal PS20.

On the other hand, a line starting from the terminal PS21 of the camera head unit 3 is formed via the terminal PS21, the terminal PS41, the terminal PS31, the terminal PS61, and the terminal PS52, but the terminal jointing with the terminal PS52 is the terminal 62 is left open, thereby not forming the line LN9.

Therefore, in the state illustrated in FIG. 23B, a ground loop is not formed via the lines LN8 and LN9, thereby causing the voltage at the port PT of the control unit 200 to be at a pull-up level (H level) of voltage V10.

That is, the control unit 200 can perform the determination at step S202 by detecting the voltage level (H/L) at the port PT.

It should be noted that even in the case where more additional extension cables 30 such as three or four cables are used, the configuration as above will prevent the formation of a ground loop, thereby enabling detection of such an inappropriate connection state.

<9. Summary and Modifications>

Some effects, which the present embodiment described so far can bring about, are as below.

The camera system according to the embodiment (the image capturing devices 1) includes the camera head unit 3 including the image sensor 300 configured to generate an image signal, and the main unit 2 configured to perform a signal process to the image signal. The camera system further includes a determining section configured to determine whether a connection state is in the first connection state (the extension state) in which the camera head unit 3 and the main unit 2 are connected with each other via the first cable without the second cable or the second connection state (the additional extension state) in which the camera head unit 3 and the main unit 2 are connected with each other via the first cable and the second cable, and a transmission section configured to transmit the image signal between the camera head unit 3 and the main unit 2 at least via the first cable according to a determination result determined by the determining section.

More specifically, an image capturing device 1 includes: an extension cable 20 having one end side being connectable with a camera head unit 3 and the other end side being compatible with both a main unit 2 side and an additional extension cable 30 and capable of connecting with either the main unit 2 side or an additional extension cable 30; a determining section (a post/pre-processing unit 25 and a control unit 200) configured to determine a connection state of the connection cable 20, a main unit 2, and the additional extension cable 30; and a transmission section (the post/pre-processing unit 25 and the control unit 200) configured to transmit an image signal according to a determination result determined by the determining section.

According to this camera system, it is possible to switch over the extension state (3-m extension) and the additional extension state (6-m extension) as needed at image-capturing.

The extension state and the additional extension state result in a significant change in the transmission path length. Therefore, various changes occurring in the signal level, signal waveform, and frequency characteristics, and the like during the transmission occur in different manners. Thus, the process for the transmission signals is switched over according to the determination result. With this configuration, it becomes possible to perform appropriate transmission always regardless of the connection state of the units and sections.

Needless to say, the 3-m lengths of the extension cable 30 and the additional extension cable 30 are merely one example. Different lengths may be possible.

In the present embodiment, the determining section determines whether or not the connection state is in the first connection state or in the second connection state by detecting whether or not the first cable is connected with the second cable. That is, the present embodiment describes one example in which the determining section (the switch control circuit 125 of the post/pre-processing unit 25 functioning as the determining section) is configured to determine whether the other end side (second connector section 23) of the extension cable 20 is connected to the main unit 2 side or to the additional extension cable 30.

In the extension state (3-m extension) of the camera system, the signal transmitted through the extension cable 20 is inputted into the main unit 2. In the additional extension state (6-m extension), the signal transmitted through the extension cable 20 further travels through the additional extension cable 30 before input into the main unit 2. Especially, in view of the signal transmission that is as long as 3 m, the use of the long cable results in different signal fading and frequency characteristic changes between the extension state and the additional extension state. Therefore, with the configuration in which the signal process is switched over according to the current connection state, an appropriate signal transmission for the current connection state can be realized.

In the embodiment, in a case where the determining section determines that the connection state is in the additional extension state (second connection state) in which the extension cable 20 is connected with the additional extension cable, the transmission section (the pre-emphasis circuit 124 of the post/pre-processing unit 25 functioning as the transmission section) amplifies the image signal and transmits the image signal thus amplified to the main unit 2.

The post/pre-processing unit 25 configured to transmit the signal to the main unit 2 should let the signal to travel further through the additional 3-m transmission in the case of the additional extension state (6-m extension). Therefore, in a case where the additional extension cable 30 is connected, the transmission is carried out after the signal is amplified in advance in consideration of the additional fading through the additional extension cable 30. With this configuration, it becomes possible to transmit a signal to the main unit 2 without large fading.

The embodiment describes one example in which the determining section (the switch control circuit 125) determines whether the connector 23a of the extension cable 20 is connected to the main unit 2 side (base plate 50) or the additional extension cable 30, according to the logic level at the determining terminal PS1 of the second connector section 23 at the other end side of the extension cable 20. That is, whether the connection state is in the first connection state (extension state) or the second connection state (additional extension state) is determined.

It is configured that the determining terminal PS1 will attain a different logic value between when connected with the main unit 2 side and when connected with the additional extension cable 30, by referring to the open state in which no connection is made. With this configuration, the connection determination can be easily performed by utilizing the connector 23a, for example without employing a connection determining mechanical structure.

The embodiment is configured such that the base plate 50 attachable to the main unit 2 is provided and the second connector section 23 of the extension cable 20 is detachably attachable to the base plate 50. Further, the embodiment describes one example where the base plate 50 is configured to supply a voltage of a first logic level (for example, the L level) to the determining terminal PS1, and the additional extension cable 30 is configured to supply a voltage of a second logic level (for example, the H level) to the determining terminal PS.

In a case where the base plate 50 is provided as the structure for attaching the extension cable 20 or the additional extension cable 30 to the main unit 2, the connector 23a of the second connector section 23 of the extension cable 20 is connected with either the base plate 50 or the additional extension cable 30. Accordingly, it is configured that, the voltage of the logic level "H" or "L" is supplied to the determining terminal PS1 of the connector 23a via the determining terminal PS3 of the connector 31a of the additional extension cable 30 and the determining terminal PS2 of the connector 50a of the base plate 50. With this configuration, even when the main unit 2 does not have a special structure for connecting an extension cable, the use of the base plate 50 makes it possible to connect the extension cable thereto, and also realizes the connection determination using the terminal of the connector 23a of the extension cable 20.

The embodiment describes one example where the transmission section (post/pre-processing unit 25) is provided inside the second connector section 23 of the extension cable 20. That is, the transmission section is a transmission section configured to transmit the image signal from the second connector section 23 to the main unit 2 or to the additional extension cable 30 connected thereto.

For this configuration, the transmission section is configured to switch over the signal process according to whether the signal transmitted from the extension cable 20 is to be transmitted to the main unit 2 or the additional extension cable 30.

Especially, in a case where the signal is to be transmitted to the additional extension cable 30, the connection terminals of the connector 23a of the second connector section 23 and the connector 31a of the third connector section 31 are included in the transmission path. It is possible to be configured such that the amplification assuming both the signal fading at the connector portions and the signal fading through the 3-m additional transmission cable is performed. That is, the configuration makes the amplification more advantageous than amplification carried out in the third connector section 31 after the signal is received at the connector 31a.

The embodiment is configured such that the post/pre-processing unit 25 as the transmission section is provided in the second connector section 23 of the extension cable 20 and includes the compensation processing unit (compensation circuit 122) configured to perform the compensation with respect to the signal characteristic changes through the cable transmission and the amplification processing unit (pre-emphasis circuit 124) configured to amplify the signal in advance in consideration of the fading through the cable transmission (see FIG. 18). Thus, in a case where it is determined that the extension cable 20 is connected to the main unit 2 side, the transmission section performs the process of the compensation circuit 122 and outputs the transmission signal. In a case where it is determined that the extension cable 20 is connected to the additional extension cable 30, the transmission section performs the processes of the compensation circuit 122 and the pre-emphasis circuit 124 and outputs the transmission signal.

Because the transmission section (post/pre-processing unit 25) is provided in the second connector section 23, it is preferable to perform the compensation process to the signal transmitted through the cable 22 of the extension cable 20, that is, the process such as waveform rectification (equalizing) for compensating the frequency characteristics. Moreover, considering that the signal is further transmitted through the additional extension cable 30, it is preferable to perform the amplification (pre-emphasis) assuming the fading through the additional extension cable 30. Thus, the compensation circuit 122 and the pre-emphasis circuit 124 are provided.

Here, the process of the pre-emphasis circuit 124 is necessary In a case of the connection with the additional extension cable 30. The switch circuit 123 is controlled by the switch control circuit 125, so that in a case where it is determined that the extension cable 20 is connected with main unit side (that is, base plate 50), the transmission signal is outputted after subjected to the process of the compensation circuit 122 but not to the process of the pre-emphasis circuit 124. In this way, the signal process suitable for the connection state is carried out.

The embodiment describes one example where the determining section is provided in the second connector section 23 of the extension cable 20.

For example, the switch control circuit 125 is provided as the determining section. With this configuration, it becomes possible to switch over the process of the transmission section (post/pre-processing unit 25) with a simple configuration realized by hardware inside the second connector section 23.

The embodiment describes one example where in a case where the determining section (the control unit 200 functioning as the determining section) determines that the connection state is a third connection state (basic state) where the camera head unit 3 is directly attached to the main unit 2, the main unit 2 sets the frequency of the clock signal to be higher than in a case where the determining section determines that the connection state is in the first connection state (extension state) or the second connection state (additional extension state), and causes the clock signal to be transmitted to the camera head unit 3.

That is, the camera head unit 3 is detachably attached to the main unit 2, and the main unit 2 is configured to transmit the clock signal to the camera head unit 3, and the determining section (the control unit 200 functioning as the determining section) is configured to determine whether the extension cable 20 or the additional extension cable 30 is attached to the main unit 2, or the camera head unit 3 is attached to the main unit 2. Further, if the extension cable 20 or the additional extension cable 30 is attached to the main unit 2, the main unit 2 sets the frequency of the clock signal CK to be lower than in a case where the camera head unit 3 is attached to the main unit 2.

That is, the frequency of the clock signal CK is switched over between the state in which the camera head unit 3 is attached to the main unit 2 and the state in which the camera head unit 3 is detached from the main unit 2 with the extension cable 20 used therebetween.

The transmission path length for data such as the control signal and the clock signal CK is changed between the basic state in which the camera head unit 3 is attached to the main unit 2, and the extension state or the additional extension state. In a case of the extension state and the additional extension state with longer transmission path lengths, the delay of data would more likely occur, thereby deteriorating the stability of the control signal transmission with respect to the frequency of the clock signal CK. Thus, in the extension state and the additional extension state, the clock frequency is lowered. This realizes stable transmission of the control signal.

Moreover, it may be so configured that in a case where the determining section (the control unit 200 functioning as the determining section) determines that the connection state is in the first connection state, the frequency of the clock signal is set lower than in a case where the determining section determines that the connection state is in the second connection state, and such a clock signal is transmitted to the camera head unit 3.

That is, as illustrated in the embodiment, for example, it may be so configured that the frequency is set to a high frequency in the basic state and the extension state and the frequency is set to a low frequency in the additional extension state, or it may be so configured that the frequency is switched over by three stages in such a way that the frequency is set to a highest frequency for the basic state, a medium frequency for the extension state, and to a lowest frequency for the additional extension state. With these configurations, it becomes possible to realize stable transmission of the control signal.

The embodiment describes one example where the determining section (control unit 200) configured to control the clock signal CK is provided in the main unit 2. That is, the determining section in this case is configured to detect, in the main unit 2, the connection state of the camera head unit 3, the extension cable 20, and the like. With this configuration, it becomes possible to appropriately perform the clock control by detecting, in the main unit 2, whether the connection state is the basic state or the extension state (or the additional extension state).

The embodiment is configured such that the base plate 50 supplies the voltage of a particular logic level to the determining terminal PS5 of the connector 2*a* of the main unit 2, and the determining section (control unit 200) determines, on the basis of the voltage detection at the particular terminal PS5, whether the main unit 2 is connected with the extension cable 20 or the additional extension cable 30.

The connector 2*a* of the main unit 2 is connected to either the connector 50*b* of the base plate 50 or the connector 3*a* of the camera head unit 3. In this configuration, it is configured such that the base plate 50 supplies the voltage of a particular logic level "H" or "L" to the determining terminal of the connector 2*a*. With this configuration, it becomes possible for the control unit 200 functioning as the determining section to detect that the base plate 50 is attached to the main unit 2 (that is, the extension cable 20 or the additional extension cable 30 is used), or that the camera head unit 3 is directly attached to the main unit 2. With this configuration, appropriate switching-over control of the clock signal is realized.

The embodiment is configured such that the main unit 2 further transmits forwards, to the camera head unit 3, the driving power (power supply voltage V1) for the camera head unit 3.

For example, even in the case where the camera head unit 3 is detached from the main unit 2 and the extension cable 20 is used, the power is supplied to the camera head unit 3 via the power supply line LN5 just as in the case where the camera head unit 3 is mounted on the main unit 2.

With this configuration, the camera head unit 3 does not need to include an individual power supply function for itself, and the camera head unit 3 can operate in a same power supply state in the basic state in which the camera head unit 3 is attached to the main unit 2 and in the extension state or the additional extension state.

The embodiment is configured such that one of the signal processes that the main unit 2 performs to the image signal is a process for generating a monitor image signal, and the main unit 2 is capable of transmitting the monitor image signal to the camera head unit 3 side. That is, the monitor image signal generated by the main unit is transmitted to the camera head unit 3 side detached from the main unit 2, so that the monitor image can be viewed on the camera head unit 3 side.

With this configuration, even in a case where the camera head unit 3 is used at a location distanced from the main unit 2 by using the extension cable 20 or the additional extension cable 30, it becomes possible for the user on the camera head unit 3 side to view the monitor image, so that appropriate image-capturing of an object can be performed.

In the embodiment, the monitor image signal outputted from the video output terminal 14a of the main unit 2 is inputted in the video input terminal 53 provided on the base plate 50, so as to be transmitted to the camera head unit 3 side at least via the extension cable 20 from the base plate 50.

The base plate 50 is provided with the video input terminal 53 and the main unit 2 includes the video output terminal 14a as one of the connection terminals 14. Moreover, the extension cable 20 and the additional extension cable 30 include the signal line LN2 for transmitting the monitor image signal. With this configuration, the monitor image signal is supplied to the video output terminal 121 of the first connector section 21 attached as the camera head unit 3 side. Therefore, even with a main unit 2 not configured especially assuming the extension state or the additional extension state, this configuration makes it possible to realize such transmission configuration that enables the user on the camera head unit 3 side to view the monitor image.

In addition, in the basic state in which the main unit 2 and the camera head unit 3 are integrated together, it is not necessary to transmit the monitor image signal to the camera head unit 3 side from the main unit 2. Thus, the main unit 2 usually does not include such a transmission path. The embodiment is configured to form a transmission path newly using the base plate 50, in order to avoid such a case that the user on the camera head unit 3 side cannot view the monitor image in the case of image-capturing with the extension cable 20 or the additional extension cable 30. With this configuration, even with a camera system configured assuming the basic state, it becomes possible for the user to monitor in the extension state.

The embodiment is configured such that the first connector section 21 of the extension cable 20 attachable to the camera head unit 3 is provided with the video output terminal 121 configured to output the monitor image signal.

By connecting a monitor device to the video output terminal 121, it becomes possible for the user to view the monitor image on the camera head unit 3 side.

The embodiment is so configured that the base plate 50 and the camera head unit 3 include the assignable buttons 52 and 302 as input sections to which a predetermined same function is assigned, and the main unit 2 detects the input information of the assignable button 52 of the base plate 50 and the input information of the assignable button 302 of the camera head unit 3 as an input signal of a same function.

That is, in order to configure such that an input on the input section of the camera head unit 3 can be made on the main unit 2 side as well, a same input section is provided to the base plate 50.

In the extension state or the additional extension state, the assignable button 302 provided on the camera head unit 3 cannot be operated by the user on the main unit 2 side. Thus, the identical assignable button 52 is provided on the base plate 50. The assignable buttons 302 and 52 are connected with the wired-or configuration, so that the operation made by either of the assignable buttons 302 and 52 is recognized by the control unit 200 as a same operation. Therefore, the operation assigned to the assignable button 302 can be operated on the assignable button 52 by the user on the main unit 2 side in the extension state or the additional extension state. This configuration improves usability and operability in the extension state or the additional extension state.

Moreover, with the configuration in which the assignable button 52 is provided in the base plate 50 used in the extension state and the additional extension state, the assignable button 52 can be an operation input element that becomes available only when needed. The assignable button 52 is not available as the operation button when the connection sate is the basic state and the button is unnecessary, and therefore, the user will not confuse as to the operation.

The embodiment is so configured that one of the signal processes that the main unit 2 performs to the image signal is a process for compressing the image signal, and therefore the recording unit 203 configured to record the image signal thus compressed is provided.

With this configuration, even in a case where the camera head unit 3 is used at a location distanced from the main unit 2 via the extension cable 20 or the additional extension cable 30, the image recording operation of the camera system can be carried out as in the basic state.

The embodiment is so configured that the main unit 2 cannot be turned on in such a connection state in which connection is established between the main unit 2 and the camera head unit 3 via the extension cable 20 and a predetermined number or more of the additional extension cables 30 (see FIGS. 21, 22A, 22B, 23A and 23B).

For example, the main unit 2 is so configured that the main unit 2 cannot be turned on in such a connection state that the camera head unit 3, the extension cable 20, the additional extension cable 30, the additional extension cable 30, the base plate 50, and the main unit 2 are connected in this order. In a case where the extended transmission path using the extension cable 20 and the additional extension cable(s) 30 is too long, there is a concern that the appropriate signal transmission or signal recognition becomes impossible as a result of the signal delay. Thus, the extendable transmission path length is limited, so that the main unit 2 cannot be turned on if the length of the transmission path is equal to or longer than a certain length. This configuration prevents image-capturing with the unstable operation is carried out by the user.

The camera system according to the present embodiment includes, a first cable including a first connector section and a second connector section and being capable of connecting between a camera head unit 3 and a main unit 2 via the first cable, and a second cable including a third connector section and a fourth connector section and being capable of connecting the camera head unit 3 and the main unit 2 via the second cable and the first cable connected with the second cable, the second connector section and the fourth connector section having an identical structure. More specifically, the camera system according to the embodiment includes a main unit 2, a camera head unit 3, an extension cable 20 being provided between the camera head unit 3 and the main unit 2 and including a first connector section 21 connectable with a camera head unit 3 side and a second connector section 23 connectable with a main unit 2 side, and an additional extension cable 30 being provided between the extension cable 20 and the main unit 2 and including a third connector section 31 connectable with the second connector section 23 of the extension cable 20 and a fourth connector section 33 connectable with the main unit 2 side. Here, the camera system according to the embodiment is further configured such that the second connector section 23 and the fourth connector section 33 have an identical structure.

According to this camera system, it is possible to switch over the extension state (3-m extension) and the additional extension state (6-m extension) as needed at image-capturing.

That is, it is configured that the second connector section 23 of the extension cable 20 and the fourth connector section 33 of the additional extension cable 30 have a same structure, and the second connector section 23 of the extension cable 20 is contactable with the third connector section 33 of the additional extension cable 30. With this configuration, the extension cable 20 and the additional extension cable 30 are both attachable to the main unit 2 side (base plate 50), and the extension state and the additional extension state can be easily realized by attaching and detaching the extension cable 30 and the additional extension cable 30 at the middle of the extension. That is, the connection can be flexibly carried according to a situation.

Moreover, like the extension cable 20 of substantially 3 m in length, the additional extension cable 30 provided is substantially 3 m in length. This reduces a total amount of cables than, for example, a case where a 3-m extension cable and a 6-m extension cable are provided, thereby facilitating portability and usability of the cables.

Moreover, the first connector section 21 is compatible with the camera head unit 3, and the third connector section 31 is compatible with the second connector section 23. With this configuration, the extension cable 20 and the additional extension cable 30 are clearly different in structure and cannot be confused. In other words, it will not happen that the additional extension cable 30 is connected with the camera head unit 3 erroneously.

Moreover, the extension cable 20 and the additional extension cable 30 can be manufactured in such a way that the second connector section 23 and the fourth connector section 33 can be manufactured as same parts in common, thereby facilitating improvement of manufacturing efficiency and cost reduction.

The embodiment is so configured that the base plate 50 attachable to the main unit 2 is provided and the second connector section 23 and the fourth connector section 33 are detachably attachable to the base plate 50.

With this configuration, even if the main unit 2 is not specially configured to be connectable with the extension cable, the use of the base plate 50 enables the extension cable connection.

Moreover, with the configuration in which the main unit 2 is attached with the detachable base plate 50 for the extension by the cable connection, it is possible to adopt a configuration compatible with the extension state or the additional extension state by using the base plate 50. That is, in order to provide the operability and convenience attainable in a state where the camera head unit 3 is detached from the main unit 2, the structure for monitoring the captured image (video input terminal 53), the structure for operation (assignable button 52), the structure for power supply (power supply input terminal 51), and the like can be provided by using the base plate 50.

The base plate 50 of the embodiment is configured to be detachably attachable to the mounting section 9 configured to mount the camera head unit 3 on the main unit 2.

That is, it is so configured that the base plate 50, in replacement of the camera head unit, can be mounted on the mounting section 9 exposed when the camera head unit 3 is detached from the main unit 2 3.

The base plate 50 is used in the extension state or the additional extension state with the camera head unit 3 detached. Thus, using the mounting section 9 for both mounting the base plate 50 and mounting the camera head unit 3 is structurally acceptable and eliminates the need of providing the main unit 2 with an additional mounting section for the base plate 50. Therefore, this configuration can realize simplification and efficiency of the structure of the main unit 2.

Moreover, in the extension state and the additional extension state in which the camera head unit 3 is detached from the main unit 2, the portion to which the camera head unit 3 has been attached comes to be exposed (the mounting section 9) by the detaching in this case. As a matter of course, this does not provide good appearance and causes such problems that more dusts and debris enter the main unit 2 and further the protection function for the internal structure is weakened. In the case of the embodiment, attaching the base plate 50 to the mounting section 9 makes it possible to prevent such problems from occurring in the extension state or the additional extension state.

The embodiment is configured such that the second connector section 23 and the fourth connector section 33 are attachable by being embedded in the recess section 54 provided in the base plate 50.

For the second connector section 23 and the fourth connector section 33 having a same structure, the base plate 50 is provided with the recess section 54 for mounting, so that either of the second connector section 23 and the fourth connector section 33 can be embedded therein.

By providing the recess section 54, it becomes easier to find where to attach the second connector section 23 or the fourth connector section 33. Moreover, by embedded the second connector section 23 or the fourth connector section 33, an impact or the like is hardly applied to the connector section rightwardly and leftwardly, thereby attaining the function (terminal protection) for protecting the joint portion between the connector 23a or 33a and the connector 50a inside.

The embodiment is configured such that the second connector section 23 and the fourth connector section 33 are provided with the handles 23H and 33H on the rear surfaces 23BK and 33BK opposite to the connector mounting surface (terminal surfaces 23FR and 33FR), respectively.

This configuration makes it easier to handle the extension cable 20 and the additional extension cable 30.

Especially, In a case of the structure in which the second connector section 23 or the fourth connector section 33 is attached by being embedded in the recess section 54 provided in the base plate 50, the handles 23H and 33H thus provided make it much easier to embed or detach the second connector section 23 or the fourth connector section 33 to/from base plate 50.

The embodiment is so configured that the third connector section 31 of the additional extension cable 30 is provided with the handles 31H on the rear surface 31BK opposite to the connector mounting surface (terminal surface 31FR).

With this configuration, it becomes easier to handle the additional extension cable 30.

The embodiment is so configured that pairs of these handles 23H, 31H, and 33H are provided at positions located on both sides of the position at which the cable ends 22E2, 32E1, and 32E2 will be attached, respectively. The pairs of handles (23H, 31H, and 33H) are provided as if the handles sandwich the cable end rightwardly and leftwardly.

This configuration gives the pair of handles another function for protecting the cable end 22E2. For example, by providing a pair of handles (23H, 31H, and 33H) protruding on both sides as illustrated in FIGS. 8 and 10, an external stress is hardly applied onto the cable ends 22E2, 32E1, and 32E2 rightwardly and leftwardly. Furthermore, the internal between the pair of handles is relatively narrow, and an external stress is thus hardly applied upwardly and downwardly.

Moreover, by providing such a pair of handles (23H, 31H, or 33H) to all or part of the second connector section 23, the third connector section 31, and the fourth connector section 33, the protection function for protecting the overall cable can be improved and the handling of the cable can be improved as well.

The first connector section 21 of the embodiment is such that the cable 22 is attachable thereto with the cable end 22E1 extending downwardly.

With this configuration, the cable 22 naturally extends downwardly with the first connector section 21 attached to the camera head unit 3, and the flexibility of the cable 22 will not disturb the standing state of the first connector section 21. If the cable end 22E1 was protruded from the rear surface of the first connector section 21, or protruded rightwardly or leftwardly or upwardly, the weight of the cable 22 is easily applied to the first connector section 21 thereby making it difficult to maintain the standing state of the first connector section 21. With the configuration in which the cable end 22E1 is attached downwardly as illustrated in FIG. 7, the standing state of the first connector section 21 can be maintained with ease. This makes it easier to place the camera head unit 3 at a desired position stably. Thus, this is a preferable structure in consideration of the case where the camera head unit 3 is placed somewhere in order to carry out the image-capturing.

Moreover, the structure in which the cable 22 is extended downwardly makes the cable 22 possible to arbitrary extend away to any directions under various image-capturing circumstances. The cable 22 is thus less likely to disturb the image-capturing using the camera head unit 3 detached from the main unit 2.

Moreover, because the cable 22 is not protruded toward the rear surface 21BK side of the first connector section 21, it is possible to utilize the rear surface 21BK side of the first connector section 21 as a mounting surface for mounting some device thereon. For example, in a case where the camera head unit 3 with the first connector section 21 is attached to a flying object such as a drone, an automobile, or a person, the rear surface 21BK can be utilized without being disturbed by the cable 22.

The second connector section 23 and the third connector section 31 of the embodiment are such that the cables 22 and 32 are attached in such a way that the cable ends 22E2 and 32E1 are protruded from the rear surfaces 23BK and 31BK opposite to the terminal surfaces 23FR and 31FR.

The second connector sections 23 and the third connector section 31 are connected in connecting the extension cable 20 and the additional extension cable 30. In the connecting, the second connector section 23 and the third connector section 31 are mutually positioned the cables 22 and 32 are protruded to the rear surfaces 23BK and 31BK. Accordingly, a middle portion of the 6-m extension state will not be curved unnecessarily, thereby maximizing the utilization of the cable length. Moreover, the not-curving the cables 22 and 32 can be protection for the cables as well.

Moreover, either the second connector section 23 or the third connector section 31 is connected to the main unit 2 side. In this case, the configuration in which the cables 22 and 32 are positioned to protrude to the rear surfaces 23BK and 31BK makes it possible to let the cables extend forwardly with respect to the main unit 2, thereby making it possible to effectively utilize the cable length.

The embodiment is configured such that the first connector section 21 is provided with the video output terminal 121.

With this configuration, it becomes possible to monitor the captured image on the camera head unit 3 side detached from the main unit 2. Especially, by providing the video output terminal 121 to the first connector section 21, the video output terminal 121 necessary only in the extension state or the additional extension state can be available only in a case where the video output terminal 121 is needed, and thus the video output terminal 121 can be located at a position suitable for the function thereof.

Moreover, the embodiment is so configured that the base plate 50 is provided with the video input terminal 53.

With this configuration, it becomes possible to attain such a configuration that the base plate 50 receives the video signal for monitoring, for example, outputted from the connection terminal 14 of the main unit 2, and transmits the camera head unit 3 side.

The embodiment is configured such that the first connector section 21 is provided with the video output terminal 121 for outputting the video signal inputted through the video input terminal 53.

As described above, the use of the video output terminal 121 makes it possible to monitor the captured image on the camera head unit 3 side detached from the main unit 2 By configuring such that the video output terminal 121 is especially compatible with the video input terminal 53 of the base plate 50, the video output terminal 121 can be a video output terminal functioning only in the extension state or the additional extension state. Furthermore, the video input terminal 53 of the base plate 50 is capable of receiving various video signal, and therefore, this configuration makes it possible to transmit various images from the main unit 2 side to the camera head unit 3 side, apart from the monitoring image taken in the image-capturing.

The embodiment is so configured that the first connector section 21 is provided with the power supply output terminal 120.

With this configuration, it becomes possible to provide the power supply voltage to the camera head unit 3 side as needed, while the camera head unit 3 side is detached from the main unit 2. For example, this configuration is useful for a case where a lens unit requiring the external power supply is used. Moreover, when the power supply output terminal 120 is provided in the first connector section 21 of the extension cable 20 used in the extension state and the additional extension state, the power supply output terminal becomes 120 is available only when needed. As the terminal is unavailable when not needed, it will not be used erroneously.

The embodiment is so configured that the base plate 50 is provided with the power supply input terminal 51 for supplying the power supply voltage to the power supply output terminal 120.

That is, the base plate 50 attached to the main unit 2 is provided with the power supply input terminal 51, so that the power supply from the power supply input terminal 51 is supplied to the power supply output terminal 120 of the first connector section 21 via the external power supply line LN7.

With this configuration, it is possible to realize such a configuration that, for example in the extension state or the additional extension state in which the main unit 2 and the camera head unit 3 are detached and used, the power is supplied form the main unit 2 side, and the camera head unit 3 side can receive and use the power thus supplied.

Moreover, by being provided on the base plate 50, the power supply input terminal 51 becomes a terminal available only when needed (in the case of the extension state and the additional extension state), which can prevent erroneous use of the power supply input terminal 51 when not needed, and thus this configuration is preferable.

The configurations, the transmission signal paths, and the like described in the embodiments are merely examples, and the present technology is not limited to these configurations illustrated herein.

Moreover, regarding each of the connection between the first connector section 21 and the camera head unit 3, the connection between the second connector section 23 and the third connector section, the connection between the second connector section 23 and the base plate 50, the connection between the fourth connector section 33 and the base plate 50, the connection between the camera head unit 3 and the main unit 2, and the connection between the base plate 50 and the main unit 2, connection mechanisms other than the connector connection are not exemplified herein, but needless to say, the other engagement mechanisms or the like for maintaining the connection state may be provided.

Moreover, even though the embodiment describes that the main unit 2 (base plate 50), the extension cable 20, and the camera head unit 3 are connected in this order in the extension state, the present technology is not limited to this. For example, it is conceivable that, for example, the main unit 2 and the camera head unit 3 are connected via the additional extension cable 30.

This can be attained by, for example, configuration that the camera head unit 3 is provided with the base plate 50, so that the third connector section 31 can be connected with the camera head unit 3, or that by configuring the third connector section 31 with a same size as the first connector section 21 such that the third connector section 31 is connectable with the head unit without the base plate 50.

Moreover, even though the embodiment describes that the main unit 2 (base plate 50), the additional extension cable 30, the extension cable 20, and the camera head unit 3 are connected in this order in the additional extension state, the present technology is not limited to this.

That is, it may be configured such that the main unit 2 (base plate 50), the extension cable 20, the additional extension cable 30, and the camera head unit 3 are connected in this order in the additional extension state.

That is, it is conceivable that the additional extension cable 30 is configured to be connectable with the camera head unit 3 side, and the extension cable 20 is configured to be connectable with the main unit 2 side. It is only required to be so configured that the base plate 50 or equivalent member is used as needed.

For example, in a case where the main unit 2 (base plate 50), the extension cable 20, the additional extension cable 30, and the camera head unit 3 are connected in this order in the additional extension state, the connector connection form explained in FIGS. 13A, 13B, 13C and the like are modified as appropriate. As an example, it is only required that the following configuration for connection can be made.

The connector 3a of the camera head unit 3 is configured to be connectable with either of the connectors 2a and 31a.

The connector 21a of the first connector section 21 of the extension cable 20 is configured to be connectable with the connectors 3a and 33a.

The connector 23a of the second connector section 23 of the extension cable 20 is configured to be connectable with the connector 50a.

The connector 31a of the third connector section 31 of the additional extension cable 30 is configured to be connectable with the connector 3a.

The connector 33a of the fourth connector section 33 of the additional extension cable 30 is configured to be connectable with the connectors 21a and 50a.

The connector 50a on the terminal surface 50Ta of the base plate 50 is configured to be connectable with either of the connectors 23a and 33a.

The connector 50b on the terminal surface 50Tb of the base plate 50 is configured to be connectable with either of the connector 2a.

The connector 2a of the main unit 2 is connectable with either of the connectors 3a and 50b.

In this way, the additional extension state is formed with the connection in the above order.

Moreover, assuming the additional extension state 30 with such an order, it is conceivable that the post/pre-processing unit 35 of the fourth connector section performs a switching-over process as the post/pre-processing unit 25 described above performs.

It should be noted that in any connection state, it is preferable that a circuit configured to perform the amplification is provided inside a connector closer to the camera head unit 3 between the connectors at the connection portions between the extension cable 20 and the additional extension cable 30. This is because the level reduction through the transmission between the connectors is large.

Moreover, in a case where the main unit 2 (base plate 50), the extension cable 20, the additional extension cable 30, and the camera head unit 3 are connected in this order in the additional extension state, the extension cable 20 and the additional extension cable 30 are connected in an order reverse to the order in the embodiment. Thus, the following configurations are preferable in this case.

For example, it may be so configured that handles are provided on the rear surface opposite to the connector mounting surface of the first connector section 21. This configuration facilitates easy handling in connecting the fourth connector section 33 and the first connector section 21 in the additional extension state.

Moreover, the first connector section 21 and the fourth connector section 33 may be so configured that the cables are attachable in such a way that the cable ends of the cables are protruded from the rear surface opposite to the connector terminal surface. This configuration provides a protection function to the cable ends 22E1 and 32E2, and facilitates easy handling of the connector connection portion.

Moreover, the third connector section 31 may be configured such that the cable 32 is attachable thereto with the cable end extending downwardly. This configuration facilitates stabilization of standing and the like of the camera head unit 3 attached with the third connector section 31.

Moreover, it may be configured such that the third connector section 31 is provided with the video output terminal 121. This configuration positions the video output terminal 121 at the camera head unit 3 side when the third connector section 31 is attached to the camera head unit 3.

Moreover, it may be configured such that the third connector section 31 is provided with the external power supply output terminal 120. This configuration positions the external power supply output terminal 120 at the camera head unit 3 side when the third connector section 31 is attached to the camera head unit 3.

Note that the effects described in this specification are merely non-limiting examples, and there may be other effects.

Note that the present technology may be also configured as (1) to (20) below.

(1)

A camera system including:

a camera head unit including an image sensor configured to generate an image signal;

a main unit configured to perform a signal process to the image signal;

a determining section configured to determine whether a connection state is in a first connection state in which the camera head unit and the main unit are connected with each other via a first cable without a second cable or a second connection state in which the camera head unit and the main unit are connected with each other via the first cable and the second cable; and a transmission section configured to transmit the image signal between the camera head unit and the main unit at least via the first cable according to a determination result determined by the determining section.

(2)

The camera system according to (1), in which depending on whether or not the first cable is connected with the second cable, the determining section performs the determination as to whether the connection state is in the first connection state or in the second connection state.

(3)

The camera system according to (1) or (2), in which in a case where the determining section determines that the connection state is in the second connection state, the transmission section amplifies the image signal and transmits the image signal to the main unit.

(4)

The camera system according to any one of (1) to (3), in which according to a logic level at a determining terminal of a connector section of the first cable, the determining section performs the determination as to whether the connection state is in the first connection state or in the second connection state.

(5)

The camera system according to (4) including:

a base plate attachable to the main unit, in which the connector section of the first cable is detachably attachable to the base plate, the base plate is configured to supply a voltage of a first logic level to the determining terminal, and the second cable is configured to supply a voltage of a second logic level to the determining terminal if the second cable is connected with the connector section of the first cable.

(6)

The camera system according to any one of (1) to (5), in which the transmission section is provided inside a connector section of the first cable.

(7)

The camera system according to any one of (1) to (6), in which the transmission section is provided inside a connector section of the first cable, the transmission section includes:

a compensation processing unit configured to perform a compensation process with respect to a signal characteristic change caused through cable transmission; and an amplification processing unit configured to perform a process for amplifying a signal in advance in consideration of fading caused through the cable transmission, the transmission section performs the process of the compensation processing unit and outputs a transmission signal, in a case where it is determined that the connection state is in the first connection state, and the transmission section performs the processes of the compensation processing unit and the amplification processing unit and outputs a transmission signal in a case where it is determined that the connection state is in the second connection state.

(8)

The camera system according to any one of (1) to (7), in which the determining section is provided inside the connector section of the first cable.

(9)

The camera system according to (1), in which the main unit transmits a clock signal to the camera head unit in such a way that, in a case where the determining section determines that the connection state is in a third connection state in which the camera head unit is directly attached to the main unit, the main unit sets a frequency of the clock signal to be higher compared with a case where the determining section determines that the connection state is in the first connection state or the second connection state.

(10)

The camera system according to the (1), in which the main unit transmits a clock signal to the camera head unit in such a way that, in a case where the determining section determines that the connection state is in the first connection state, the main unit sets a frequency of the clock signal to be lower compared with a case where the determining section determines that the connection state is in the second connection state.

(11)

The camera system according to (9) or (10), in which the determining section is provided in the main unit.

(12)

The camera system according to any one of (9) to (11), including:

a base plate attachable to the main unit, in which the first cable and the second cable are detachably attachable to the base plate, the base plate is configured to supply a voltage of a particular logic level to a determining terminal of a connector of the main unit, and the determining section determines the connection state by voltage detection at the determining terminal.

(13)

The camera system according to any one of (1) to (12), in which the main unit is further configured to forward, to the camera head unit, driving power for the camera head unit.

(14)

The camera system according to any one of (1) to (13), in which the signal process is a process for generating a monitor image signal, and the main unit is capable of transmitting the monitor image signal to the camera head unit side.

(15)

The camera system according to (14), including:

a base plate attachable to the main unit, in which the first cable and the second cable are detachably attachable to the base plate, and the monitor image signal outputted from the video output terminal of the main unit is inputted in a video input terminal provided on the base plate, so as to be transmitted to the camera head unit side at least via the first cable from the base plate.

(16)

The camera system according to (14) or (15), in which the first cable attached to the camera head unit includes a video output terminal configured to output the monitor signal.

(17)

The camera system according to any one of (1) to (16), including a base plate attachable to the main unit, in which the first cable and the second cable are detachably attachable to the base plate, each of the base plate and the camera head unit includes an input section to which a same function predetermined is assigned, and the main unit detects, as an input signal for a same function, input information of the input section of the base plate and input information of the input section of the camera head unit.

(18)

The camera system according to any one of (1) to (17), in which the signal process is a process for compressing the image signal, and the system includes a recording unit configured to record the image signal thus compressed.

(19)

The camera system according to any one of (1) to (18), in which the main unit is configured such that it is not possible to turn on the main unit in a connection state in which connection is established between the main unit and the camera head unit via the first cable and a predetermined number or more of the second cables.

(20)

A cable for use in a camera system including a camera head unit including an image sensor configured to generate an image signal, and a main unit configured to perform a signal process to the image signal, the cable including a transmission section configured to transmit the image signal between the camera head unit and the main unit at least via the cable itself, according to a determination result determined by a determining section as to whether a connection state is in a first connection state in which the camera head unit and the main unit are connected via the cable itself without another cable, or a second connection state in which the camera head unit and the main unit are connected via the cable itself and the another cable.

Furthermore, the present technology may also be configured as the following (101) to (120).

(101)

A camera system including:

a camera head unit including an image sensor configured to generate an image signal;

a main unit configured to perform a signal process to the image signal;

an extension cable having one end side being connectable with the camera head unit and the other end side being compatible with both the main unit side and additional extension cable and connectable with either the main unit side and the additional extension cable;

a determining section configured to determine a connection state as to the extension cable, the main unit, and the additional extension cable; and a transmission section configured to transmit the image signal according to a determination result determined by the determining section.

(102)

The camera system according to (101), in which the determining section is configured to determine whether the other end side of the extension cable is connected with the main unit side or the additional extension cable.

(103)

The camera system according to (101) or (102), in which in a case where the determining section determines that the extension cable is connected with the additional extension cable, the transmission section amplifies the image signal and transmits to the main unit the image signal thus amplified.

(104)

The camera system according to any one of (101) to (103), in which the determining section determines, according to a logic level of a determining terminal of a connector of the other end side of the extension cable, whether the other end side of the extension cable is connected with the main unit side or the additional extension cable.

(105)

The camera system according to (104), including:

a base plate attachable to the main unit, in which the other end side of the extension cable is detachably attachable to the base plate, the base plate is configured to supply a voltage of a first logic level to the determining terminal, and the additional extension cable is configured to supply a voltage of a second logic level to the determining terminal.

(106)

The camera system according to any one of (101) to (105), in which the transmission section is provided inside a connector section of the other end side of the extension cable.

(107)

The camera system according to any one of (101) to (106), in which the transmission section is provided inside a connector section of the other end side of the extension cable, the transmission section includes:

a compensation processing unit configured to perform a compensation process with respect to a signal characteristic change caused through cable transmission; and an amplification processing unit configured to perform a process for amplifying a signal in advance in consideration of fading caused through the cable transmission, the transmission section performs the process of the compensation processing unit and outputs a transmission signal, in a case where it is determined that the extension cable is connected with the main unit side, and the transmission section performs the processes of the compensation processing unit and the amplification processing unit and outputs a transmission signal in a case where it is determined that the extension cable is connected with the additional extension cable.

(108)

The camera system according to any one of (101) to (107), in which the determining section is provided inside the connector section of the other end side of the extension cable.

(109)

The camera system according to (101), in which the camera head unit is detachably attachable to the main unit, the main unit is configured to transmit a clock signal to the camera head unit, the determining section is configured to determine whether the main unit is connected with either the extension cable or the additional extension cable, or the camera head unit is connected with the main unit, and if the main unit is connected with either the extension cable or the additional extension cable, the main unit sets a frequency of the clock signal to be lower compared with a case where the camera head unit is attached with the main unit.

(110)

The camera system according to (109), in which the determining section is provided in the main unit.

(111)

The camera system according to (109) or (110), including:

a base plate attachable to the main unit, in which the extension cable and the additional extension cable are detachably attachable to the base plate, the base plate is configured to supply a voltage of a particular logic level to a determining terminal of a connector of the main unit, and the determining section determines, according to voltage detection at the determining terminal, as to a state in which the main unit is connected with the extension cable or the additional extension cable.

(112)

The camera system according to any one of (101) to (111), in which the main unit is further configured to forward, to the camera head unit, driving power for the camera head unit.

(113)

The camera system according to any one of (101) to (112), in which the signal process is a process for generating a monitor image signal, and the main unit is capable of transmitting the monitor image signal to the camera head unit side.

(114)

The camera system according to (113), including:

a base plate attachable to the main unit, in which the extension cable and the additional extension cable are detachably attachable to the base plate, and the monitor image signal outputted from the video output terminal of the main unit is inputted in a video input terminal provided on the base plate, so as to be transmitted to the camera head unit side at least via the extension cable from the base plate.

(115)

The camera system according to (113) or (114), in which the one end side of the extension cable attachable to the camera head unit includes a video output terminal configured to output the monitor signal.

(116)

The camera system according to any one of (101) to (115), including a base plate attachable to the main unit, in which the extension cable and the additional extension cable are detachably attachable to the base plate, each of the base plate and the camera head unit includes an input section to which a same function predetermined is assigned, and the main unit detects, as an input signal for a same function, input information of the input section of the base plate and input information of the input section of the camera head unit.

(117)

The camera system according to any one of (1) to (16), in which the signal process is a process for compressing the image signal, and the system includes a recording unit configured to record the image signal thus compressed.

(118)

The camera system according to any one of (101) to (117), in which the main unit is configured such that it is not possible to turn on the main unit in a connection state in which in which connection is established between the main unit and the camera head unit via the extension cable and a predetermined number or more of the additional extension cables.

(119)

An extension cable for use in a camera system including a camera head unit including an image sensor configured to generate an image signal, and a main unit configured to perform a signal process to the image signal, the extension cable being for connecting the main unit and the camera head unit, the extension cable having:

one end side connectable with the camera head, and the other end side being compatible with both a main unit side and the additional extension cable and being connectable with either the main unit side or the additional extension cable; and a transmission section configured to transmit the image signal according to a determination result determined by a determining section configured to determine a connection state as to the extension cable, the main unit, and the additional extension cable.

(120)

The extension cable according to (119), further including: the determining section.

REFERENCE SIGNS LIST

1 Image capturing device
2 Main unit
2*a* Connector
3 Camera head unit
3*a* Connector
3T Terminal surface
4 External panel
5 External housing
6 Base panel section
7 Upper panel section
8 Rear panel section
9 Mounting section
10, 11 Side surface section
12 Operation section
13 Display section
14 Connection terminal 14a Video output terminal
15 Leveling mount
16 Groove section
17 Leveling section
20 Extension cable
21 First connector
21a Connector
21H Handle
21BK Rear surface
21FR Terminal surface
21K Housing
22 Cable
22E1, 22E2 Cable end
23 Second connector section
23a Connector
23H Handle
23BK Rear surface
23FR Terminal surface
23K Housing
24 Pre-processing unit
25 Post/pre-processing unit
26, 27 Buffer amplifier
28, 29, 39 DC/DC converter
30 Additional extension cable
31 Third connector section
31a Connector
31H Handle
31BK Rear surface
31FR Terminal surface
31K Housing
32 Cable
32E1, 32E2 Cable end
33 Fourth connector section
33a Connector
33H Handle
33BK Rear surface
33FR Terminal surface
33K Housing
35 Post/pre-processing unit
36, 37 Buffer amplifier
50 Base plate
50a, 50b Connector
50Ta, 50Tb Terminal surface
51 External power supply input terminal
52 Assignable button
53 Video input terminal
54 Recess section
55 Substrate
120 External power supply output terminal
121 Video output terminal
122 Compensation circuit
123 Switch circuit
124 Pre-emphasis circuit
125 Switch control circuit
126 Cutout portion
127, 131, 132 Recess section
200 Control unit
202 Signal processing unit
203 Recording unit
204 Communication unit
205 Power supply circuit
300 Image sensor
301 Lens system driving unit
302 Assignable button

The invention claimed is:

1. A camera system, comprising:
 a camera head unit including an image sensor configured to generate an image signal;
 a main unit configured to perform a signal process to the image signal;
 a determining section configured to determine a connection state is in a first connection state or a second connection state, wherein
  in the first connection state, the camera head unit and the main unit are connected via a first cable without a second cable, and
  in the second connection state, the camera head unit and the main unit are connected via each of the first cable and the second cable; and
 a transmission section configured to transmit, based on the determined connection state, the image signal between the camera head unit and the main unit at least via the first cable, wherein
  the transmission section is inside a connector section of the first cable,
  the transmission section includes:
   a compensation processing unit configured to perform a compensation process with respect to a signal characteristic change caused through cable transmission; and
   an amplification processing unit configured to perform an amplification process for the image signal in advance in consideration of fading caused through the cable transmission, and
  the transmission section is further configured to:
   perform the compensation process based on the determination that the connection state is in the first connection state;
   perform each of the compensation process and the amplification process based on the determination that the connection state is in the second connection state; and
   output a transmission signal based on at least one of the compensation process or the amplification process.

2. The camera system according to claim 1, wherein the determining section is further configured to determine the connection state based on a connection of the first cable with the second cable.

3. The camera system according to claim 1, wherein based on the determination that the connection state is in the second connection state, the transmission section is further configured to amplify the image signal and transmit the image signal to the main unit.

4. The camera system according to claim 1, wherein the determining section is further configured to determine the connection state based on a logic level at a determining terminal of the connector section of the first cable.

5. The camera system according to claim 4, further comprising:
 a base plate attachable to the main unit, wherein
  the connector section of the first cable is detachably attachable to the base plate,
  the base plate is configured to supply a voltage of a first logic level to the determining terminal, and
  the second cable is configured to supply a voltage of a second logic level to the determining terminal based on the second cable is connected with the connector section of the first cable.

6. The camera system according to claim 1, wherein the determining section is inside the connector section of the first cable.

7. The camera system according to claim 1, wherein
the determining section is further configured to determine that the connection state is in a third connection state,
the camera head unit is directly attached to the main unit in the third connection state, and
the main unit is further configured to:
set a frequency of a clock signal in the third connection state to be higher than a frequency of a clock signal in each of the first connection state and the second connection state; and
transmit the clock signal corresponding to the third connection state to the camera head unit.

8. The camera system according to the claim 1, wherein the main unit is further configured to:
set a frequency of a clock signal based on the determined connection state, wherein the frequency of the clock signal in the first connection state is lower than the frequency of the clock signal in the second connection state; and
transmit the clock signal to the camera head unit.

9. The camera system according to claim 7, wherein the determining section is in the main unit.

10. The camera system according to claim 7, further comprising:
a base plate attachable to the main unit, wherein
the first cable and the second cable are detachably attachable to the base plate,
the base plate is configured to supply a voltage of a particular logic level to a determining terminal of a connector of the main unit, and
the determining section is further configured to determine the connection state by voltage detection at the determining terminal.

11. The camera system according to claim 1, wherein the main unit is further configured to forward, to the camera head unit, driving power for the camera head unit.

12. The camera system according to claim 1, wherein
the signal process is a process to generate a monitor image signal, and
the main unit is further configured to transmit the monitor image signal to a camera head unit side.

13. The camera system according to claim 12, further comprising:
a base plate attachable to the main unit, wherein
the first cable and the second cable are detachably attachable to the base plate,
the main unit further includes a video output terminal configured to output the monitor image signal, and
the base plate includes a video input terminal configured to receive the outputted monitor image signal, wherein the received monitor image signal is transmitted to the camera head unit side at least via the first cable from the base plate.

14. The camera system according to claim 12, wherein the first cable attached to the camera head unit includes a video output terminal configured to output the monitor image signal.

15. The camera system according to claim 1, further comprising
a base plate attachable to the main unit, wherein
the first cable and the second cable are detachably attachable to the base plate,
each of the base plate and the camera head unit includes an input section,
the input section of each of the base plate and the camera head unit corresponds to a specific function, and
the main unit is further configured to detect, as an input signal for the specific function, input information of the input section of the base plate and input information of the input section of the camera head unit.

16. The camera system according to claim 1, wherein
the signal process is a process to compress the image signal, and
the camera system comprises a recording unit configured to record the compressed image signal.

17. The camera system according to claim 1, wherein the main unit is configured to not turn on in the connection state in which connection is established between the main unit and the camera head unit via the first cable and a specific number or more of second cables.

18. A camera system, comprising:
a camera head unit including an image sensor configured to generate an image signal;
a main unit configured to perform a signal process to the image signal;
a base plate attachable to the main unit, wherein
a first cable and a second cable are detachably attachable to the base plate,
each of the base plate and the camera head unit includes an input section, and
the input section of each of the base plate and the camera head unit corresponds to a specific function;
the main unit further configured to detect, as an input signal for the specific function, input information of the input section of the base plate and input information of the input section of the camera head unit;
a determining section configured to determine a connection state is in a first connection state or a second connection state, wherein
in the first connection state, the camera head unit and the main unit are connected via the first cable without the second cable, and
in the second connection state, the camera head unit and the main unit are connected via each of the first cable and the second cable; and
a transmission section configured to transmit, based on the determined connection state, the image signal between the camera head unit and the main unit at least via the first cable.

19. The camera system according to claim 18, wherein the determining section is further configured to determine the connection state based on a connection of the first cable with the second cable.

20. The camera system according to claim 18, further comprising a connector section in the first cable, wherein
the determining section is further configured to determine the connection state based on a logic level at a determining terminal of the connector section.

21. A camera system, comprising:
a camera head unit including an image sensor configured to generate an image signal;
a main unit configured to perform a signal process to the image signal;
a determining section configured to determine a connection state is in a first connection state or a second connection state, wherein
in the first connection state, the camera head unit and the main unit are connected via a first cable without a second cable, and in the second connection state, the camera head unit and the main unit are connected via each of the first cable and the second cable;

a transmission section configured to transmit, based on the determined connection state, the image signal between the camera head unit and the main unit at least via the first cable; and the main unit further configured to not turn on in the connection state in which connection is established between the main unit and the camera head unit via the first cable and a specific number or more of second cables.

22. The camera system according to claim 21, wherein the determining section is further configured to determine the connection state based on a connection of the first cable with the second cable.

23. The camera system according to claim 21, further comprising a connector section in the first cable, wherein the determining section is further configured to determine the connection state based on a logic level at a determining terminal of the connector section.

\* \* \* \* \*